US009071436B2

(12) United States Patent
Jung et al.

(10) Patent No.: US 9,071,436 B2
(45) Date of Patent: Jun. 30, 2015

(54) SECURITY-ACTIVATED ROBOTIC SYSTEM

(75) Inventors: Edward K.Y. Jung, Bellevue, WA (US);
Royce A. Levien, Lexington, MA (US);
Richard T. Lord, Tacoma, WA (US);
Robert W. Lord, Seattle, WA (US);
Mark A. Malamud, Seattle, WA (US);
John D. Rinaldo, Jr., Bellevue, WA (US); Clarence T. Tegreene, Bellevue, WA (US); Lowell L. Wood, Jr., Bellevue, WA (US)

(73) Assignee: The Invention Science Fund I, LLC, Bellevue, WA (US)

( * ) Notice: Subject to any disclaimer, the term of this patent is extended or adjusted under 35 U.S.C. 154(b) by 770 days.

(21) Appl. No.: 12/321,365

(22) Filed: Jan. 16, 2009

(65) Prior Publication Data

US 2009/0292389 A1    Nov. 26, 2009

Related U.S. Application Data

(63) Continuation-in-part of application No. 12/290,001, filed on Oct. 23, 2008, and a continuation-in-part of application No. 12/005,162, filed on Dec. 21, 2007, and a continuation-in-part of application No. 12/012,504, filed on Jan. 31, 2008, and a continuation-in-part of application No. 12/079,921, filed on Mar. 27, 2008, and a continuation-in-part of application No. 12/287,704, filed on Oct. 9, 2008, and a continuation-in-part of application No. 12/287,719, filed on Oct. 10, 2008, and a continuation-in-part of application No. 12/288,336, filed on Oct. 17, 2008.

(51) Int. Cl.
*G05B 19/04* (2006.01)
*H04L 9/32* (2006.01)
*G05B 19/042* (2006.01)

(52) U.S. Cl.
CPC .............. *H04L 9/32* (2013.01); *G05B 19/0426* (2013.01); *G05B 2219/24167* (2013.01)

(58) Field of Classification Search
None
See application file for complete search history.

(56) References Cited

U.S. PATENT DOCUMENTS

| 5,204,055 | A | 4/1993 | Sachs et al. |
| 5,644,493 | A | 7/1997 | Motai et al. |
| 5,762,125 | A | 6/1998 | Mastrorio |
| 5,892,900 | A | 4/1999 | Ginter et al. |
| 6,170,060 | B1 | 1/2001 | Mott et al. |
| 6,207,876 | B1 | 3/2001 | Kellems et al. |
| 6,438,457 | B1 * | 8/2002 | Yokoo et al. ................ 700/245 |

(Continued)

OTHER PUBLICATIONS

Dey, Anind K.; Abowd, Gregory D.; Salber, Daniel; "A Conceptual Framework and a Toolkit for Supporting the Rapid Prototyping of Context-Aware Applications"; Human-Computer Interaction; bearing a date of 2001; pp. 97-166 (print-out pp. 1-67); vol. 16; No. 2, 3 & 4.

(Continued)

*Primary Examiner* — Bhavesh V Amin
(74) *Attorney, Agent, or Firm* — Suiter Swantz pc llo

(57) ABSTRACT

Various methods and systems include exemplary implementations for a security-activated operational component involved in creating or producing or duplicating or processing or testing one or more objects. Possible embodiments include but are not limited to verifying an authorization code to control a task or function of a robotic operation system, and responsive to the verification, enabling or disabling one or more operational components of the robotic operation system.

35 Claims, 28 Drawing Sheets

(56) References Cited

U.S. PATENT DOCUMENTS

| | | | |
|---|---|---|---|
| 6,458,595 B1 | 10/2002 | Selinfreund | |
| 6,499,026 B1 | 12/2002 | Rivette et al. | |
| 6,539,283 B2 * | 3/2003 | Takagi | 700/245 |
| 6,560,511 B1 * | 5/2003 | Yokoo et al. | 700/245 |
| 6,584,376 B1 * | 6/2003 | Van Kommer | 700/245 |
| 6,637,013 B1 | 10/2003 | Li | |
| 6,658,316 B1 | 12/2003 | Mehta et al. | |
| 6,801,822 B1 | 10/2004 | Fujiwara et al. | |
| 6,830,643 B1 | 12/2004 | Hayes | |
| 6,859,782 B2 | 2/2005 | Harshaw | |
| 6,973,576 B2 | 12/2005 | Giobbi | |
| 6,976,163 B1 | 12/2005 | Hind et al. | |
| 7,013,190 B2 | 3/2006 | Fujieda | |
| 7,017,043 B1 | 3/2006 | Potkonjak | |
| 7,082,399 B2 | 7/2006 | Utsumi | |
| 7,099,742 B2 * | 8/2006 | Tajima et al. | 700/245 |
| 7,111,258 B2 | 9/2006 | Kato et al. | |
| 7,111,321 B1 | 9/2006 | Watts, Jr. et al. | |
| 7,120,932 B2 | 10/2006 | Lockhart et al. | |
| 7,203,966 B2 | 4/2007 | Abburi et al. | |
| 7,209,900 B2 | 4/2007 | Hunter et al. | |
| 7,212,574 B2 | 5/2007 | Abrams, Jr. et al. | |
| 7,213,157 B2 | 5/2007 | Dariel | |
| 7,296,015 B2 | 11/2007 | Poltorak | |
| 7,337,218 B2 * | 2/2008 | Arnold | 709/217 |
| 7,341,410 B2 | 3/2008 | Hill et al. | |
| 7,349,758 B2 * | 3/2008 | Miro et al. | 700/245 |
| 7,430,762 B2 | 9/2008 | Klinefelter et al. | |
| 7,474,932 B2 | 1/2009 | Geng | |
| 7,493,596 B2 | 2/2009 | Atkin et al. | |
| 7,793,353 B2 | 9/2010 | Klinefelter et al. | |
| 7,831,517 B1 | 11/2010 | Vijay et al. | |
| 7,904,187 B2 * | 3/2011 | Hoffberg et al. | 700/83 |
| 7,941,845 B2 | 5/2011 | Brunet et al. | |
| 7,957,824 B2 | 6/2011 | Boronvinskih et al. | |
| 8,065,741 B1 | 11/2011 | Coblentz et al. | |
| 2001/0025225 A1 | 9/2001 | Ota et al. | |
| 2002/0035450 A1 | 3/2002 | Thackston | |
| 2002/0040290 A1 | 4/2002 | Walacavage et al. | |
| 2002/0040291 A1 | 4/2002 | Walacavage et al. | |
| 2002/0052193 A1 | 5/2002 | Chetty | |
| 2002/0064759 A1 | 5/2002 | Durbin et al. | |
| 2002/0072821 A1 | 6/2002 | Baker | |
| 2002/0076682 A1 | 6/2002 | Herman et al. | |
| 2002/0099473 A1 * | 7/2002 | Amadeo et al. | 700/251 |
| 2002/0138745 A1 | 9/2002 | Cognigni et al. | |
| 2002/0199123 A1 | 12/2002 | McIntyre et al. | |
| 2003/0023337 A1 | 1/2003 | Godfrey et al. | |
| 2003/0033041 A1 | 2/2003 | Richey | |
| 2003/0036945 A1 | 2/2003 | Del Vecchio et al. | |
| 2003/0069658 A1 | 4/2003 | Yamazaki | |
| 2003/0095665 A1 | 5/2003 | Wheeler et al. | |
| 2003/0176939 A1 | 9/2003 | Yoshida et al. | |
| 2003/0217275 A1 | 11/2003 | Bentley et al. | |
| 2003/0224823 A1 | 12/2003 | Hurst et al. | |
| 2003/0226030 A1 | 12/2003 | Hurst et al. | |
| 2004/0030901 A1 | 2/2004 | Wheeler et al. | |
| 2004/0044901 A1 | 3/2004 | Serkowski et al. | |
| 2004/0054907 A1 | 3/2004 | Chateau et al. | |
| 2004/0084520 A1 | 5/2004 | Muehl et al. | |
| 2004/0093516 A1 | 5/2004 | Hornbeek et al. | |
| 2004/0098281 A1 | 5/2004 | Chien et al. | |
| 2004/0236876 A1 | 11/2004 | Kondratiev et al. | |
| 2005/0080799 A1 * | 4/2005 | Harnden et al. | 707/100 |
| 2005/0097332 A1 | 5/2005 | Imai | |
| 2005/0239445 A1 | 10/2005 | Karaoguz et al. | |
| 2005/0289072 A1 | 12/2005 | Sabharwal | |
| 2006/0026672 A1 * | 2/2006 | Braun | 726/9 |
| 2006/0036570 A1 | 2/2006 | Schaefer et al. | |
| 2006/0050634 A1 | 3/2006 | Gous | |
| 2006/0053478 A1 | 3/2006 | Horman et al. | |
| 2006/0064385 A1 | 3/2006 | Susnjara | |
| 2006/0082826 A1 | 4/2006 | Joly et al. | |
| 2006/0141107 A1 | 6/2006 | Schwimmer et al. | |
| 2006/0174346 A1 | 8/2006 | Carroll et al. | |
| 2006/0190564 A1 * | 8/2006 | Arnold | 709/219 |
| 2006/0259177 A1 | 11/2006 | Toyoshima et al. | |
| 2007/0006324 A1 * | 1/2007 | Osada et al. | 726/27 |
| 2007/0073433 A1 | 3/2007 | Froeschner et al. | |
| 2007/0143601 A1 | 6/2007 | Arroyo et al. | |
| 2007/0165508 A1 | 7/2007 | Kobayashi et al. | |
| 2007/0171801 A1 | 7/2007 | Kobayashi et al. | |
| 2007/0185815 A1 | 8/2007 | Boccon-Gibod et al. | |
| 2007/0191982 A1 | 8/2007 | Sullivan | |
| 2007/0211597 A1 | 9/2007 | Kobayashi et al. | |
| 2007/0218426 A1 | 9/2007 | Quadling et al. | |
| 2007/0250448 A1 | 10/2007 | Burkhart et al. | |
| 2007/0282480 A1 * | 12/2007 | Pannese et al. | 700/213 |
| 2008/0008348 A1 | 1/2008 | Metois et al. | |
| 2008/0047006 A1 | 2/2008 | Jeong et al. | |
| 2008/0082449 A1 | 4/2008 | Wilkinson et al. | |
| 2008/0086777 A1 | 4/2008 | Sanchez | |
| 2008/0091300 A1 | 4/2008 | Fletcher et al. | |
| 2008/0111816 A1 | 5/2008 | Abraham et al. | |
| 2008/0134319 A1 | 6/2008 | Baker et al. | |
| 2008/0168527 A1 | 7/2008 | Koved et al. | |
| 2008/0210747 A1 | 9/2008 | Takashima | |
| 2008/0271122 A1 | 10/2008 | Nolan et al. | |
| 2008/0276791 A1 | 11/2008 | Lemons | |
| 2008/0306874 A1 | 12/2008 | White | |
| 2009/0137408 A1 | 5/2009 | Jacobson | |
| 2009/0157452 A1 | 6/2009 | Arora et al. | |
| 2009/0164039 A1 * | 6/2009 | Jung et al. | 700/117 |
| 2009/0164379 A1 | 6/2009 | Jung et al. | |
| 2009/0165126 A1 | 6/2009 | Jung et al. | |
| 2009/0165127 A1 | 6/2009 | Jung et al. | |
| 2009/0165147 A1 | 6/2009 | Jung et al. | |
| 2009/0222914 A1 | 9/2009 | Ozawa | |
| 2009/0238362 A1 | 9/2009 | Kitani et al. | |
| 2010/0031351 A1 | 2/2010 | Jung et al. | |
| 2010/0031374 A1 | 2/2010 | Jung et al. | |

OTHER PUBLICATIONS

Garfinkel, Tal; Pfaff, Ben; Chow, Jim; Rosenblum, Mendel; Boneh, Dan; "Terra: A Virtual Machine-Based Platform for Trusted Computing"; 19th Symposium on Operating System Principles (SOSP 2003); bearing a date of Oct. 19-22, 2003; pp. 1-14; Bolton Landing; New York; USA.

Garfinkel, Tal; Rosenblum, Mendel; Boneh, Dan; "Flexible OS Support and Applications for Trusted Computing"; Proceedings of HotOS IX: The 9th Workshop on Hot Topics in Operating Systems; bearing a date of May 18-21, 2003; total pp. 7; The USENIX Association.

Kraljic, Ivan C.; Quenot, Georges M.; Zavidovique, Bertrand; "A Methodology for Rapid Prototyping of Real-Time Image Processing VLSI Systems"; pp. 1-7; located at http://clips.imag.fr/mrim/georges.quenot/articles/rsp95.pdf.

* cited by examiner

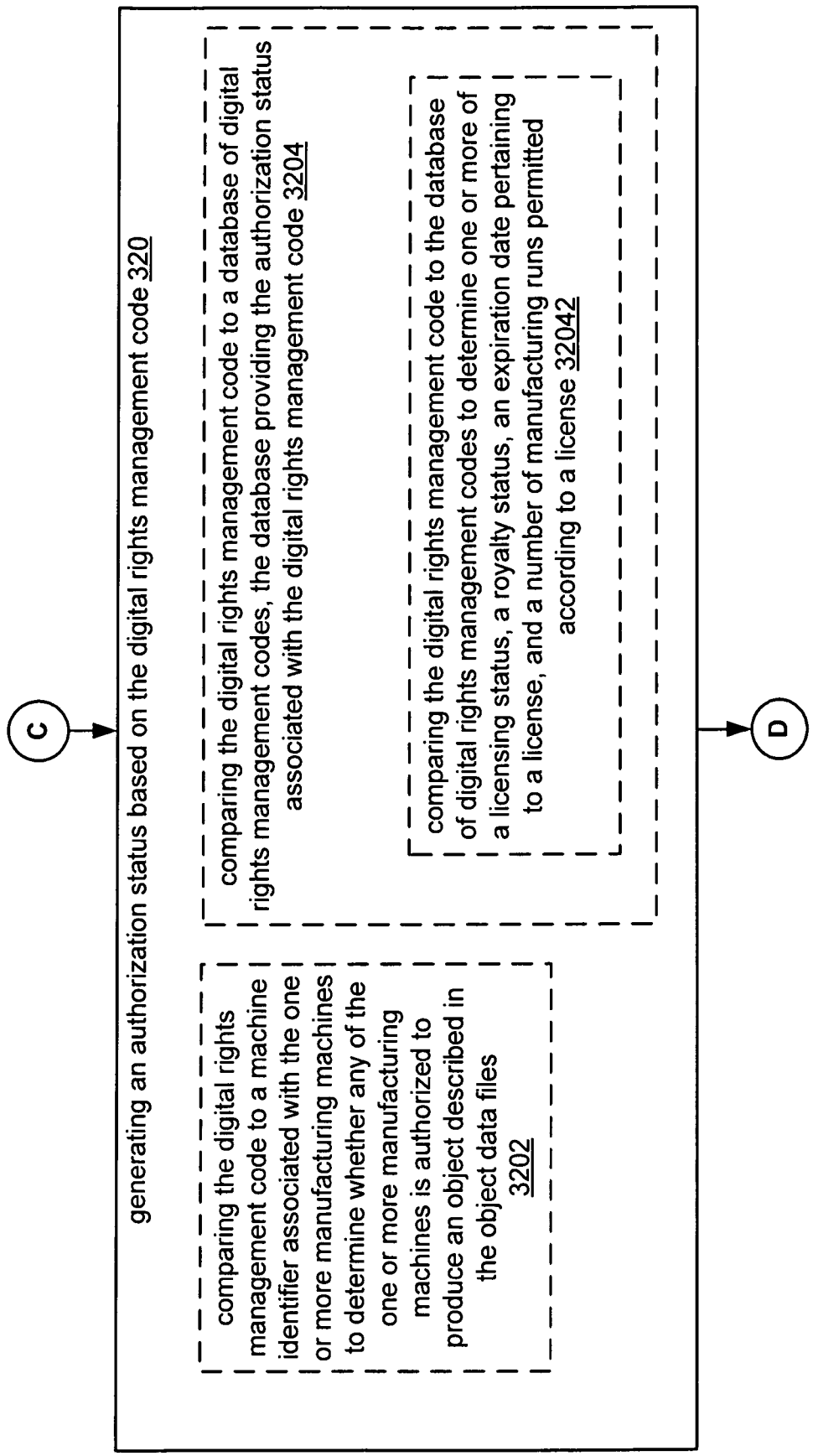

FIG. 3D

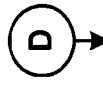

configuring one or more manufacturing machines to operate as a function of the authorization status 330 enabling the one or more manufacturing machines to operate if the authorization status provides permission for operation wherein the one or more manufacturing machines perform one or more of rapid prototyping, three-dimensional printing, two-dimensional printing, freeform fabrication, solid freeform fabrication, and seriolithography 3302 enabling the one or more manufacturing machines to operate if the authorization status provides permission for operation wherein the one or more manufacturing machines include a subtractive manufacturing machine, including machines adapted for drilling, milling, turning, laser cutting, waterjet cutting, plasma cutting, wire electrical discharge cutting, cold, warm and hot forging metal fabrication, computer numerical controlled fabrication machine, and/or an additive manufacturing machine, and/or an injection molding machine 3304 enabling the one or more manufacturing machines to operate if the authorization status provides permission for operation wherein the one or more manufacturing machines include one or more of an extrusion manufacturing machine, a melting manufacturing machine, a solidification manufacturing machine, an ejection manufacturing machine, a die casting manufacturing machine, a stamping process machine 3306

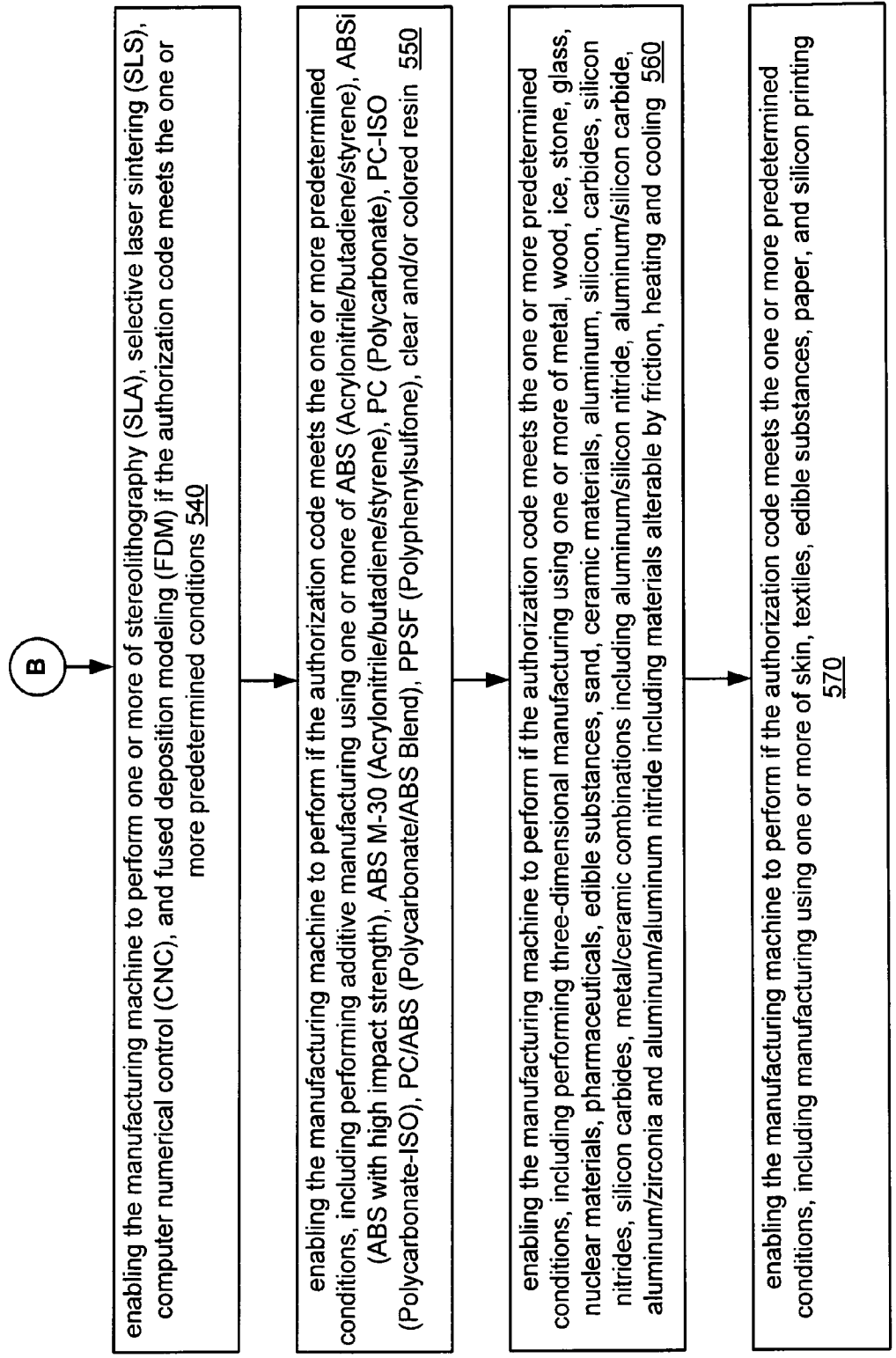

FIG. 7C

| enabling or preventing one or more of the following types of manufacturing in accordance with the authorization code: computer numerical controlled fabrication, micro-fabrication, injection molding, additive manufacturing, robotic production, packaging, engraving, casting, plating, coating, glazing, laminating, and bonding 7306 | enabling or preventing functioning of a physical component of the production device if the authorization code meets the one or more predetermined conditions 7307 | enabling or preventing a read function if the authorization code is accepted by a control system operably coupled to the production device 7308 | enabling or preventing a physical component of the production device to function if the authorization code matches a stored list of codes accessible by a control system operably coupled to the production device 7309 | enabling or preventing the object data file to become readable by the production device if the authorization code passes a compare function associated with a machine identifier 7310 | enabling or disabling production dependent on one or more of the following predetermined conditions: benchmark comparison, temporal milestone, time period restriction, production quantity limitation, production machine qualification, operator qualification, event occurrence, and quality certification 7311 | enabling or disabling one or more of the following types of production devices: chemical process apparatus, product packaging, injection molding unit, subtraction machine, additive manufacture unit, two-dimensional production technique, three-dimensional production technique, stamping machine, extrusion machine, melting machine, die-casting machine, solidifying machine, manufacturing system, rapid prototyping device, and robotic production line 7312 |

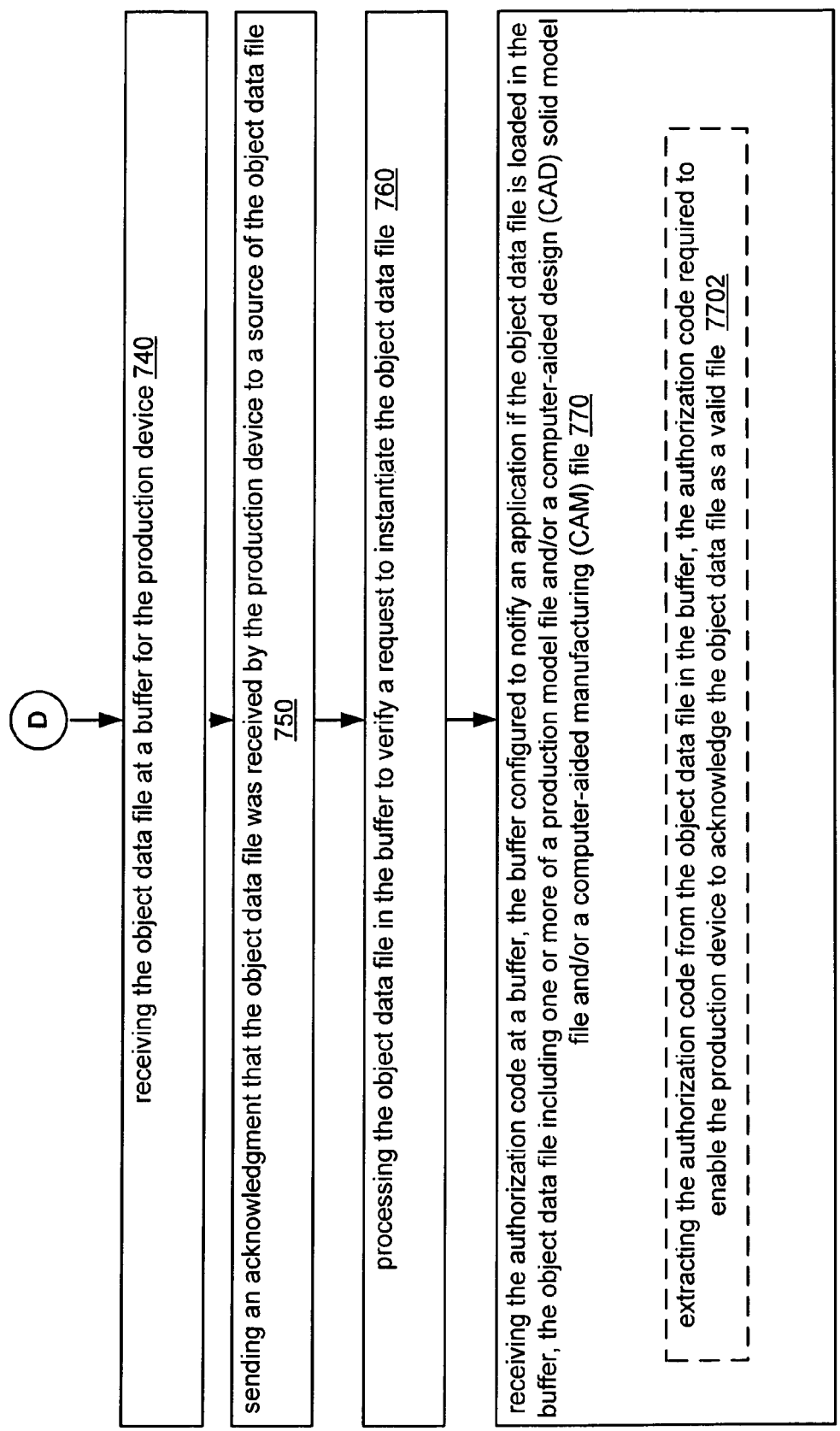

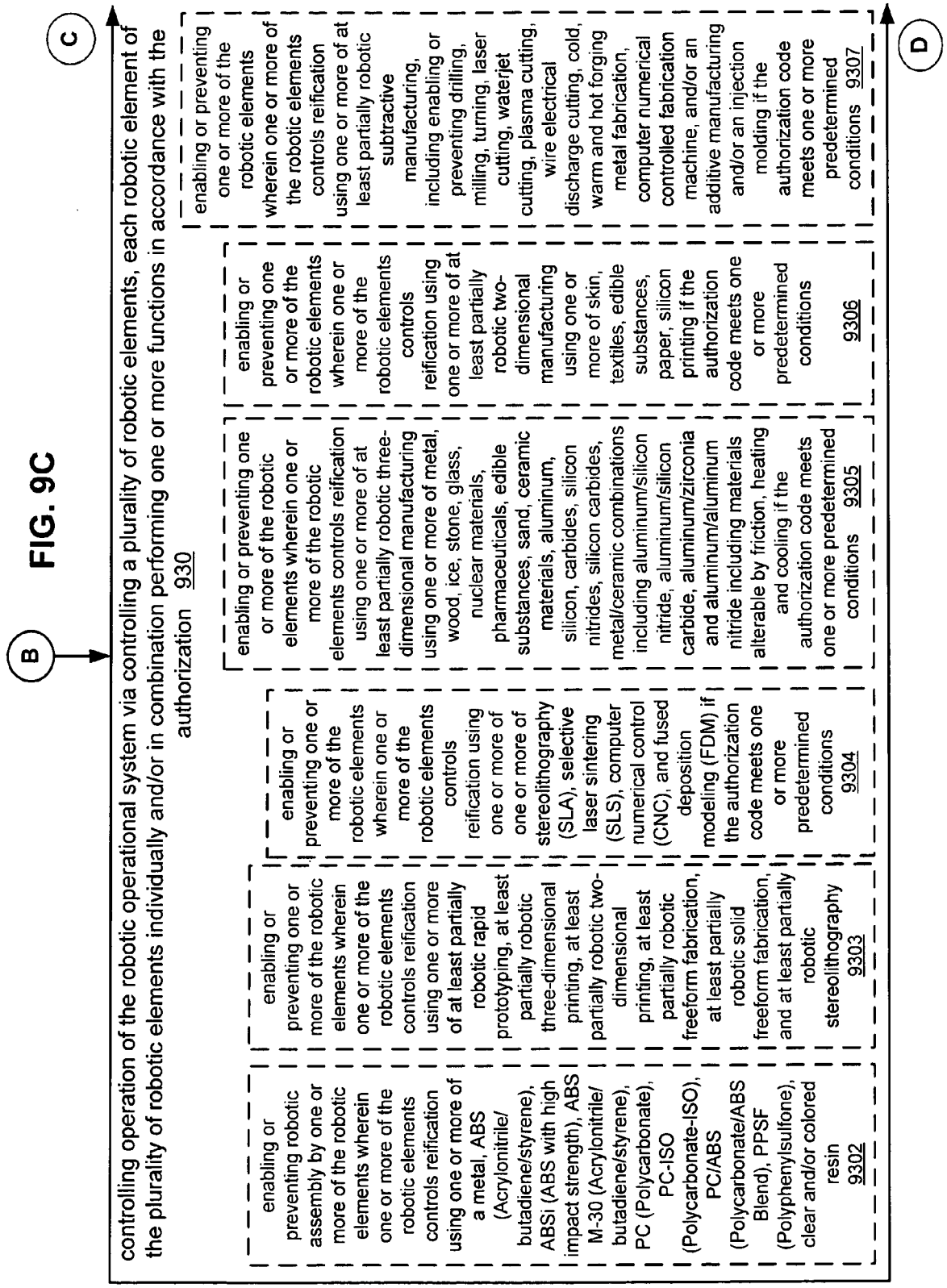

FIG. 12  SECURITY CONTROL SYSTEM 1010

FIG. 14 SECURITY CONTROL SYSTEM 1210

SECURITY-ACTIVATED ROBOTIC SYSTEM

CROSS-REFERENCE TO RELATED APPLICATIONS

The present application is related to and claims the benefit of the earliest available effective filing date(s) from the following listed application(s) (the "Related Applications") (e.g., claims earliest available priority dates for other than provisional patent applications or claims benefits under 35 USC §119(e) for provisional patent applications, for any and all parent, grandparent, great-grandparent, etc. applications of the Related Application(s)).

RELATED APPLICATIONS

For purposes of the USPTO extra-statutory requirements, the present application constitutes a continuation-in-part of U.S. patent application Ser. No. 12/290,001 entitled SECURE ROBOTIC OPERATIONAL SYSTEM, naming Edward K. Y. Jung, Royce A. Levien, Richard T. Lord, Robert W. Lord, Mark A. Malamud, John D. Rinaldo, Jr., Clarence T. Tegreene, and Lowell L. Wood, Jr. as inventors, filed 23 Oct. 2008, which is currently co-pending, or is an application of which a currently co-pending application is entitled to the benefit of the filing date.

For purposes of the USPTO extra-statutory requirements, the present application constitutes a continuation-in-part of U.S. patent application Ser. No. 12/005,162 entitled CONTROL TECHNIQUE FOR OBJECT PRODUCTION RIGHTS, naming Edward K. Y. Jung, Royce A. Levien, Robert W. Lord, Mark A. Malamud, John D. Rinaldo, Jr., Clarence T. Tegreene, and Lowell L. Wood, Jr. as inventors, filed 21 Dec. 2007, which is currently co-pending, or is an application of which a currently co-pending application is entitled to the benefit of the filing date.

The present application also constitutes a continuation-in-part of U.S. patent application Ser. No. 12/012,504 entitled MANUFACTURING CONTROL SYSTEM, naming Edward K. Y. Jung, Royce A. Levien, Robert W. Lord, Mark A. Malamud, John D. Rinaldo, Jr., Clarence T. Tegreene, and Lowell L. Wood, Jr. as inventors, filed 31 Jan., 2008, which is currently co-pending, or is an application of which a currently co-pending application is entitled to the benefit of the filing date.

The present application also constitutes a continuation-in-part of U.S. patent application Ser. No. 12/079,921 entitled SECURITY-ACTIVATED PRODUCTION DEVICE, naming Edward K. Y. Jung, Royce A. Levien, Robert W. Lord, Mark A. Malamud, John D. Rinaldo, Jr., Clarence T. Tegreene, and Lowell L. Wood, Jr. as inventors, filed 27 Mar. 2008, which is currently co-pending, or is an application of which a currently co-pending application is entitled to the benefit of the filing date.

The present application also constitutes a continuation-in-part of U.S. patent application Ser. No. 12/287,704 entitled SECURITY-ACTIVATED OPERATIONAL COMPONENTS, naming Edward K. Y. Jung, Royce A. Levien, Robert W. Lord, Mark A. Malamud, John D. Rinaldo, Jr., Clarence T. Tegreene, and Lowell L. Wood, Jr. as inventors, filed 9 Oct. 2008, which is currently co-pending, or is an application of which a currently co-pending application is entitled to the benefit of the filing date.

The present application also constitutes a continuation-in-part of U.S. patent application Ser. No. 12/287,719 entitled AUTHORIZATION RIGHTS FOR OPERATIONAL COMPONENTS, naming Edward K. Y. Jung, Royce A. Levien, Robert W. Lord, Mark A. Malamud, John D. Rinaldo, Jr., Clarence T. Tegreene, and Lowell L. Wood, Jr. as inventors, filed 10 Oct. 2008, which is currently co-pending, or is an application of which a currently co-pending application is entitled to the benefit of the filing date.

The present application also constitutes a continuation-in-part of U.S. patent application Ser. No. 12/288,336 entitled CONDITIONAL AUTHORIZATION FOR SECURITY-ACTIVATED DEVICE, naming Edward K. Y. Jung, Royce A. Levien, Robert W. Lord, Mark A. Malamud, John D. Rinaldo, Jr., Clarence T. Tegreene, and Lowell L. Wood, Jr. as inventors, filed 17 Oct. 2008, which is currently co-pending, or is an application of which a currently co-pending application is entitled to the benefit of the filing date.

The present application also constitutes a continuation-in-part of U.S. patent application Ser. No. 12/321,385 entitled SECURITY-ACTIVATED ROBOTIC TASKS, naming Edward K. Y. Jung, Royce A. Levien, Richard T. Lord, Robert W. Lord, Mark A. Malamud, John D. Rinaldo, Jr., Clarence T. Tegreene, and Lowell L. Wood, Jr. as inventors, filed 16 Jan. 2009, which is currently co-pending, or is an application of which a currently co-pending application is entitled to the benefit of the filing date.

The United States Patent Office (USPTO) has published a notice to the effect that the USPTO's computer programs require that patent applicants reference both a serial number and indicate whether an application is a continuation or continuation-in-part. Stephen G. Kunin, *Benefit of Prior-Filed Application*, USPTO Official Gazette Mar. 18, 2003, available at http://www.uspto.gov/web/offices/com/sol/og/2003/week 11/patbene.htm. The present Applicant Entity (hereinafter "Applicant") has provided above a specific reference to the application(s) from which priority is being claimed as recited by statute. Applicant understands that the statute is unambiguous in its specific reference language and does not require either a serial number or any characterization, such as "continuation" or "continuation-in-part," for claiming priority to U.S. patent applications. Notwithstanding the foregoing, Applicant understands that the USPTO's computer programs have certain data entry requirements, and hence Applicant is designating the present application as a continuation-in-part of its parent applications as set forth above, but expressly points out that such designations are not to be construed in any way as any type of commentary and/or admission as to whether or not the present application contains any new matter in addition to the matter of its parent application(s).

All subject matter of the Related Applications and of any and all parent, grandparent, great-grandparent, etc. applications of the Related Applications is incorporated herein by reference to the extent such subject matter is not inconsistent herewith.

BACKGROUND

The present application relates generally to a secure robotic operational system and related systems, devices and processes.

SUMMARY

In one aspect, an exemplary security control method for a robotic operation may include identifying a robotic operational system configured to create or produce or duplicate or process or test one or more objects; verifying an authorization code associated with a directive for controlling operation of the identified robotic operation system; and responsive to the verification, implementing the directive by enabling or disabling one or more operational components that individually and/or in combination perform one or more functions of the identified robotic operation system. In addition to the foregoing, other method aspects are described in the claims, drawings, and text forming a part of the present application.

Some embodiments may provide a robotic operational system subject to security control, wherein the system includes a robotic operational machine or device; and a verification module coupled to the robotic operational machine or device, wherein the verification module is capable of enabling or disabling one or more robotic elements, and wherein the verification module is configured to receive an authorization associated with a directive for controlling operation of the robotic operational system. Another possible feature may include a controller coupled to the robotic operational machine or device, the controller configured to receive the directive for controlling operation of a plurality of robotic elements, wherein each robotic element of the plurality of robotic elements individually and/or in combination performs one or more functions in accordance with the authorization.

In one or more various aspects, related systems include but are not limited to circuitry and/or programming for implementing the herein-referenced method aspects; the circuitry and/or programming can be virtually any combination of hardware, software, and/or firmware configured to effect the herein-referenced method aspects depending upon the design choices of the system designer.

In another aspect, an exemplary computer program product may include a computer-readable medium bearing encoded instructions for executing a method that includes accessing an authorization associated with a directive to perform a robotic operational task regarding one or more objects; verifying the authorization associated with the directive; and responsive to the verification, controlling operation of one or more operational components that individually and/or in combination perform the robotic operational task. Related process aspects may also include monitoring the robotic operational task; and responsive to the monitoring, determining compliance with an applicable predetermined condition.

Further exemplary process aspects may include determining compliance with a qualitative or quantitative aspect of the robotic operational task. Some embodiment features may further include determining compliance with the predetermined condition applicable to a security-controlled process and/or operational component and/or output of the robotic operational task. In addition to the foregoing, other computer program product aspects are described in the claims, drawings, and text forming a part of the present application.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE FIGURES

FIGS. 3A, 3B, 3C, and 3D illustrate a flow diagram of an exemplary method in accordance with an embodiment of the subject matter of the present application.

FIGS. 5A, 5B and 5C illustrate a flow diagram of an exemplary method in accordance with an embodiment of the subject matter of the present application.

FIGS. 7A, 7B, 7C, and 7D illustrate a flow diagram of an exemplary method in accordance with an embodiment of the subject matter of the present application.

FIGS. 9A, 9B, 9C and 9D illustrate a flow diagram of an exemplary method in accordance with an embodiment of the subject matter of the present application.

DETAILED DESCRIPTION

Figure 1:
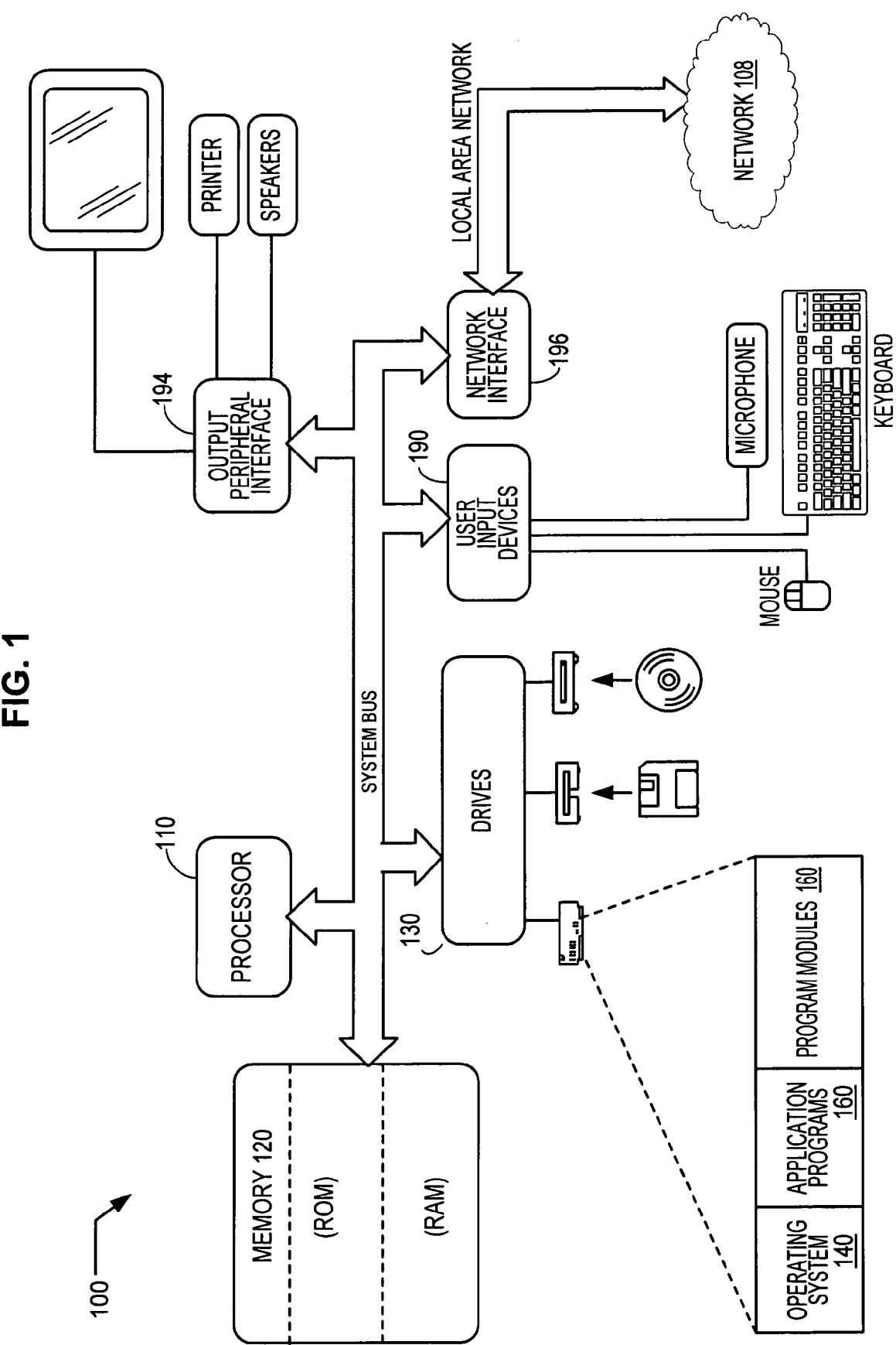
FIG. 1 is a block diagram of an exemplary computer architecture that supports the claimed subject matter of the present application.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here.

In the description that follows, the subject matter of the application will be described with reference to acts and symbolic representations of operations that are performed by one or more computers, unless indicated otherwise. As such, it will be understood that such acts and operations, which are at times referred to as being computer-executed, include the manipulation by the processing unit of the computer of electrical signals representing data in a structured form. This manipulation transforms the data or maintains it at locations in the memory system of the computer which reconfigures or otherwise alters the operation of the computer in a manner well understood by those skilled in the art. The data structures where data is maintained are physical locations of the memory that have particular properties defined by the format of the data. However, although the subject matter of the application is being described in the foregoing context, it is not meant to be limiting as those of skill in the art will appreciate that some of the acts and operations described hereinafter can also be implemented in hardware, software, and/or firmware and/or some combination thereof.

With reference to FIG. 1, depicted is an exemplary computing system for implementing embodiments. FIG. 1 includes a computer 100, including a processor 110, memory 120 and one or more drives 130. The drives 130 and their associated computer storage media, provide storage of computer readable instructions, data structures, program modules and other data for the computer 100. Drives 130 can include an operating system 140, application programs 150, and program modules 160. Computer 100 further includes user input devices 190 through which a user may enter commands and data. Input devices can include an electronic digitizer, a microphone, a keyboard and pointing device, commonly referred to as a mouse, trackball or touch pad. Other input devices may include a joystick, game pad, satellite dish, scanner, or the like.

These and other input devices can be connected to processor 110 through a user input interface that is coupled to a system bus, but may be connected by other interface and bus structures, such as a parallel port, game port or a universal serial bus (USB). Computers such as computer 100 may also include other peripheral output devices such as speakers, which may be connected through an output peripheral interface 194 or the like.

Computer 100 may operate in a networked environment using logical connections to one or more computers, such as a remote computer connected to network interface 196 The remote computer may be a personal computer, a server, a router, a network PC, a peer device or other common network node, and can include many or all of the elements described above relative to computer 100. Networking environments are commonplace in offices, enterprise-wide area networks (WAN), local area networks (LAN), intranets and the Internet. For example, in the subject matter of the present application, computer 100 may comprise the source machine from which data is being migrated, and the remote computer may comprise the destination machine or vice versa. Note however, that source and destination machines need not be connected by a network 108 or any other means, but instead, data may be migrated via any media capable of being written by the source platform and read by the destination platform or platforms. When used in a LAN or WLAN networking environment, computer 100 is connected to the LAN through a network interface 196 or an adapter. When used in a WAN networking environment, computer 100 typically includes a modem or other means for establishing communications over the WAN, such as the Internet or network 108. It will be appreciated that other means of establishing a communications link between the computers may be used.

According to one embodiment, computer 100 is connected in a networking environment or a manufacturing machine either directly or via network 108 such that processor 110 and/or program modules 160 can perform a control technique for object production rights system capable of instantiating a digital rights management module in accordance with embodiments herein.

Figure 2:
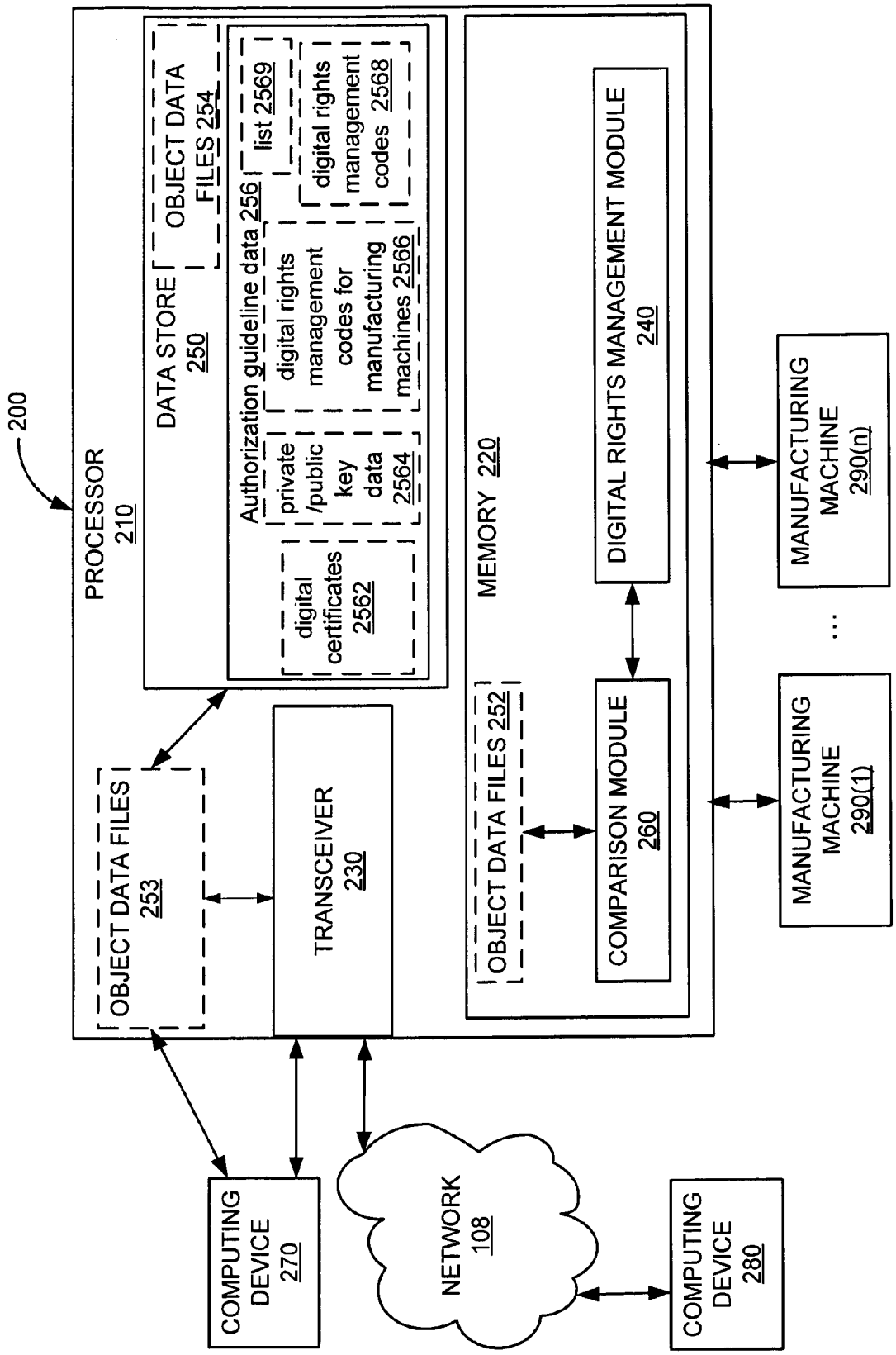
FIG. 2 is a block diagram of an exemplary system that supports the claimed subject matter of the present application.

Referring now to FIG. 2, illustrated is an exemplary block diagram for an embodiment of a duplication control system 200 for implementing a control technique for object production rights system. As shown, duplication control system 200 includes a processor 210, a memory 220, coupled to the processor 210. FIG. 2 also illustrates a transceiver 230 which can be configured to send and receive one or more object data files or directly interact with a computing device 270 for receiving object data files. FIG. 2 also illustrates digital rights management module 240 accessible by processor 210 and by network 108 (see FIG. 1). FIG. 2 further illustrates a data store 250 coupled to processor 210. Digital rights management module 240 is configured to control digital rights for object data files. In one embodiment, digital rights management module 240 is coupled to comparison module 260, which can also be disposed within memory 220. In one embodiment, comparison module 260 compares the digital rights management codes to a stored list of digital rights management codes to determine the authorization status as a function of the status of one or more previously compiled object data files. Comparison module 260 can further interact with object data files residing in memory 252, outside of memory 253, or in data store as object data files 254. In one embodiment, object data files 252, 253 and/or 254 include one or more computer-aided design (CAD) solid model files configured to create three dimensional physical objects.

Data store 250 is configured to include authorization guideline data 256. In one embodiment, the authorization guideline data can include one digital certificates 2562, private/public key data 2564, one or more digital rights management codes 2566 for manufacturing machines, and/or digital rights management codes 2568. In one embodiment, authorization guideline data includes list 2569 which can be a list of digital rights management codes, a list of object data files, or any list that could be, for example, associated with multiple manufacturing machines 290 that require multiple authorization rights to be analyzed or the like. In one embodiment, list 2569 includes globally unique identifiers (GUID) that can function as digital rights management codes and provide cryptographic control over the one or more object data files.

In the embodiment in which data store 250 includes object data files 254, the object data files can be files that previously existed in data store 250, or can be files that were previously received by the duplication control system 200 via transceiver 230, memory 220, network 108.

In one embodiment, data store 250 stores digital rights management codes separately from object data files, with the digital rights management codes decipherable with a public key, private key combination.

FIG. 2 further illustrates manufacturing machines 290(1-*n*) coupled to control system 200. The multiple manufacturing machines 290(1-*n*) can allow manufacture of an object described by the one or more object data files according to permissions provided in the one or more digital rights management codes.

In one embodiment, duplication control system 200 is coupled to each of the one or more manufacturing machines 290(1-*n*) to allow manufacture of an object described by the one or more object data files according to permissions provided in the one or more digital rights management codes.

In one embodiment, manufacturing machines 290(1-*n*) are three-dimensional additive manufacturing machines configured for rapid prototyping, three-dimensional printing, two-dimensional printing, freeform fabrication, solid freeform fabrication, and stereo lithography.

In another embodiment, manufacturing machines 290(1-*n*) can include a subtractive manufacturing machine, including machines adapted for drilling, milling, turning, laser cutting, waterjet cutting, plasma cutting, wire electrical discharge cutting, cold, warm and hot forging metal fabrication, computer numerical controlled fabrication machine, and/or an additive manufacturing machine, and/or an injection molding machine.

In another embodiment, manufacturing machines 290(1-*n*) can include an extrusion manufacturing machine, a melting manufacturing machine, a solidification manufacturing machine, an ejection manufacturing machine, a die casting manufacturing machine, a stamping process machine.

In another embodiment, manufacturing machines 290(1-*n*) can include a subtractive manufacturing machine, including machines adapted for drilling, milling, turning, laser cutting, waterjet cutting, plasma cutting, wire electrical discharge cutting, cold, warm and hot forging metal fabrication, computer numerical controlled fabrication machine, and/or an additive manufacturing machine, and/or an injection molding machine.

In another embodiment, manufacturing machines 290(1-*n*) can include a manufacturing machine configured to perform manufacturing using one or more of metal, wood, ice, stone, glass, nuclear materials, pharmaceuticals, edible substances, sand, ceramic materials, aluminum, silicon, carbides, silicon nitrides, silicon carbides, metal/ceramic combinations including aluminum/silicon nitride, aluminum/silicon carbide, aluminum/zirconia and aluminum/aluminum nitride including materials alterable by friction, heating and cooling.

It will be understood that the illustrated system embodiments of FIGS. 1-2 are provide by way of example only, and are not intended to be limiting. Furthermore, it will be understood that the various process features and system components disclosed herein may be incorporated in different embodiment combinations depending on the circumstances.

Referring now to FIGS. 3A, 3B, 3C and 3D an exemplary flow diagram illustrates the operation of a control technique for object production rights system according to one or more embodiments.

Figure 3A:
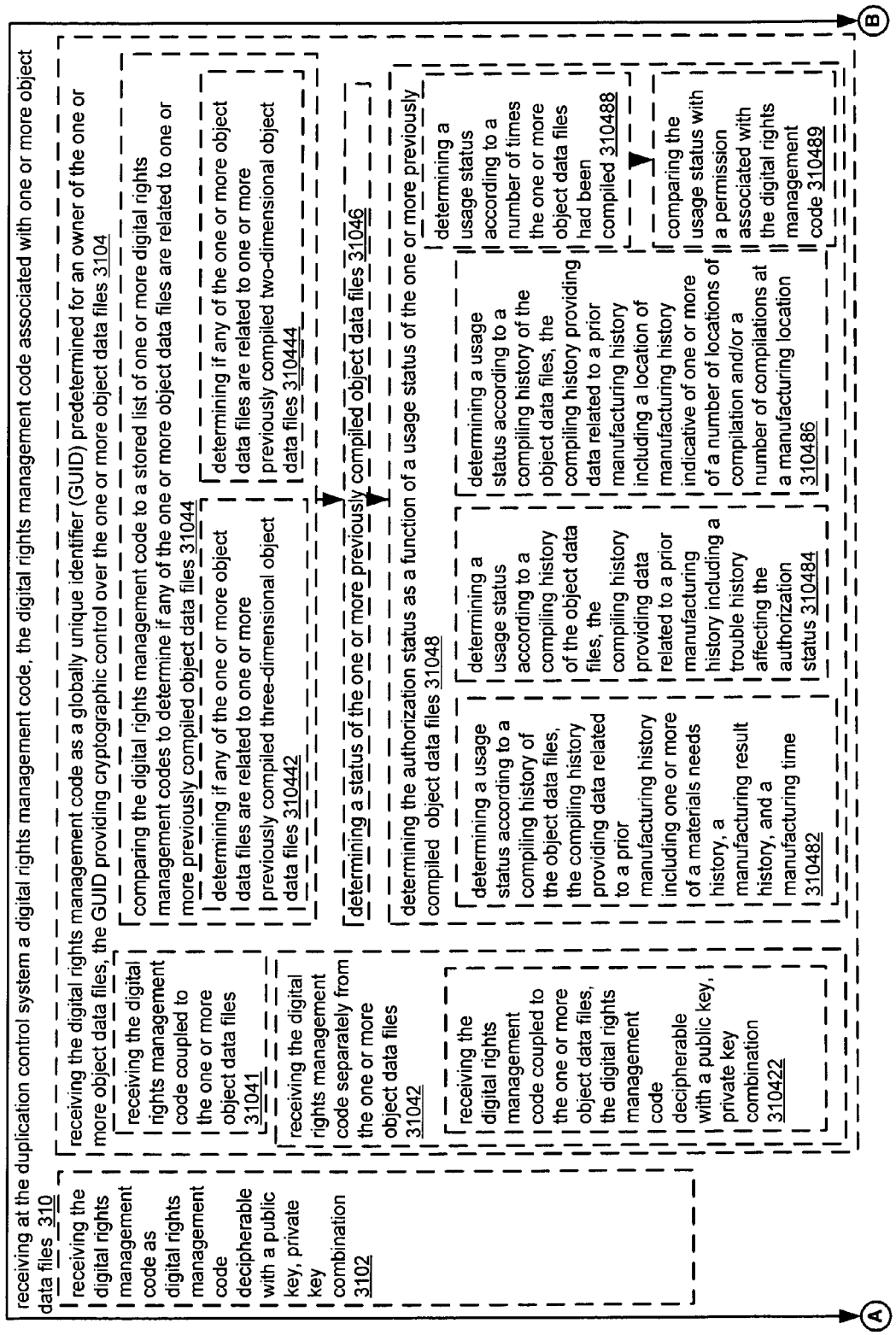

As illustrated in FIG. 3A, block 310 provides for receiving at the duplication control system a digital rights management code, the digital rights management code associated with one or more object data files (e.g., duplication control system 200 receiving digital rights management code associated with one or more object data file via computing device 270, network 108, and/or manufacturing machine(s) 290(1-*n*)). Depicted within block 310 is optional block 3102, which provides for receiving the digital rights management code as digital rights management code decipherable with a public key, private key combination (e.g., a duplication control system 200 receiving one or more digital rights management code as cryptographically sealed code requiring a public key, private key pair).

Depicted within block 310 is optional block 3104, which provides for receiving the digital rights management code as a globally unique identifier (GUID) predetermined for an owner of the one or more object data files, the GUID providing cryptographic control over the one or more object data files (e.g., a duplication control system 200 receiving digital rights management code as a globally unique identifier (GUID) predetermined for an owner of the one or more object data files, the GUID providing cryptographic control from a manufacturing machine 290, and/or computer 100).

Depicted within block 3104 is optional block 31041 which provides for receiving the digital rights management code coupled to the one or more object data files (e.g., duplication control system 200 receiving digital rights management code coupled to one or more object data files).

Depicted within block 3104 is optional block 31042 which provides for receiving the digital rights management code separately from the one or more object data files (e.g., duplication control system 200 receiving digital rights management code in a separate transaction over transceiver 230).

Depicted within block 30142 is optional block 310422 which provides for receiving the digital rights management code coupled to the one or more object data files, the digital rights management code decipherable with a public key, private key combination (e.g., duplication control system 200 receiving digital rights management code over network 108, from computing device 270 and/or from manufacturing machine 290(1-*n*) wherein the digital rights management code is protected by a public key, private key pair). In one embodiment the digital rights management codes can be globally unique identifier (GUID) predetermined for an owner of the one or more object data files, the GUID providing cryptographic control over the one or more object data files. In other embodiments, the GUID can be associated with a public/private key pair.

Also depicted within block 3104 is optional block 31044, which provides for comparing the digital rights management code to a stored list of one or more digital rights management codes to determine if any of the one or more object data files are related to one or more previously compiled object data files (e.g., comparison module 260 performing comparisons of the digital management code with a stored list in data store 250 of digital rights management codes to determine if the object data files are related to one more previously compiled object data files, the object data files can be received via manufacturing machine 290(1-*n*), computing device 270 and/or computing device 280 over network 109). Optional block 31044 is coupled to optional block 31046 which provides for determining a status of the one or more previously compiled object data files (e.g., digital rights management module 240 determining a status of the previously compiled object data files).

Optional block 31046 is further coupled to optional block 31048 which provides for determining the authorization status as a function of a usage status of the one or more previously compiled object data files (e.g., digital rights management module 240 determining a status as a function of a usage status of the previously compiled object data files).

Optional block 31048 includes optional block 310482 which provides for determining a usage status according to a compiling history of the object data files, the compiling history providing data related to a prior manufacturing history including one or more of a materials needs history, a manufacturing result history, and a manufacturing time (e.g., digital rights management module 240 determining a status of the previously compiled object data files received via network 108, computing device 270, manufacturing machines 290(1-*n*) and/or data store 250).

Block 31048 further depicts optional block 310484, which provides for determining a usage status according to a compiling history of the object data files, the compiling history providing data related to a prior manufacturing history including a trouble history affecting the authorization status (e.g., digital rights management module 240 determining a status of the previously compiled object data files compiling history and trouble history affecting an authorization status received via network 108, computing device 270, manufacturing machines 290(1-*n*) and/or data store 250).

Further depicted within block 31048 is optional block 310486 which provides for determining a usage status according to a compiling history of the object data files, the compiling history providing data related to a prior manufacturing history including a location of manufacturing history indicative of one or more of a number of locations of compilation and/or a number of compilations at a manufacturing location (e.g., digital rights management module 240 determining a number of locations of compilation and/or number of compilations of the previously compiled object data files received via network 108, computing device 270, manufacturing machines 290(1-*n*) and/or data store 250).

Optional block 31048 further depicts optional blocks 310488 and 310489. Optional block 310488 provides for determining a usage status according to a number of times the one or more object data files had been compiled (e.g., digital rights management module 240 determining a status of the previously compiled object data files received via network 108, computing device 270, manufacturing machines 290(1-*n*) and/or data store 250). Optional block 31049 provides for comparing the usage status with a permission associated with the digital rights management code (e.g., digital rights management module 240 determining a status of the previously compiled object data files received via network 108, computing device 270, manufacturing machines 290(1-n) and/or data store 250 and comparing via comparison module 260 a usage status with a permission associated with the digital rights management code).

Figure 3B:
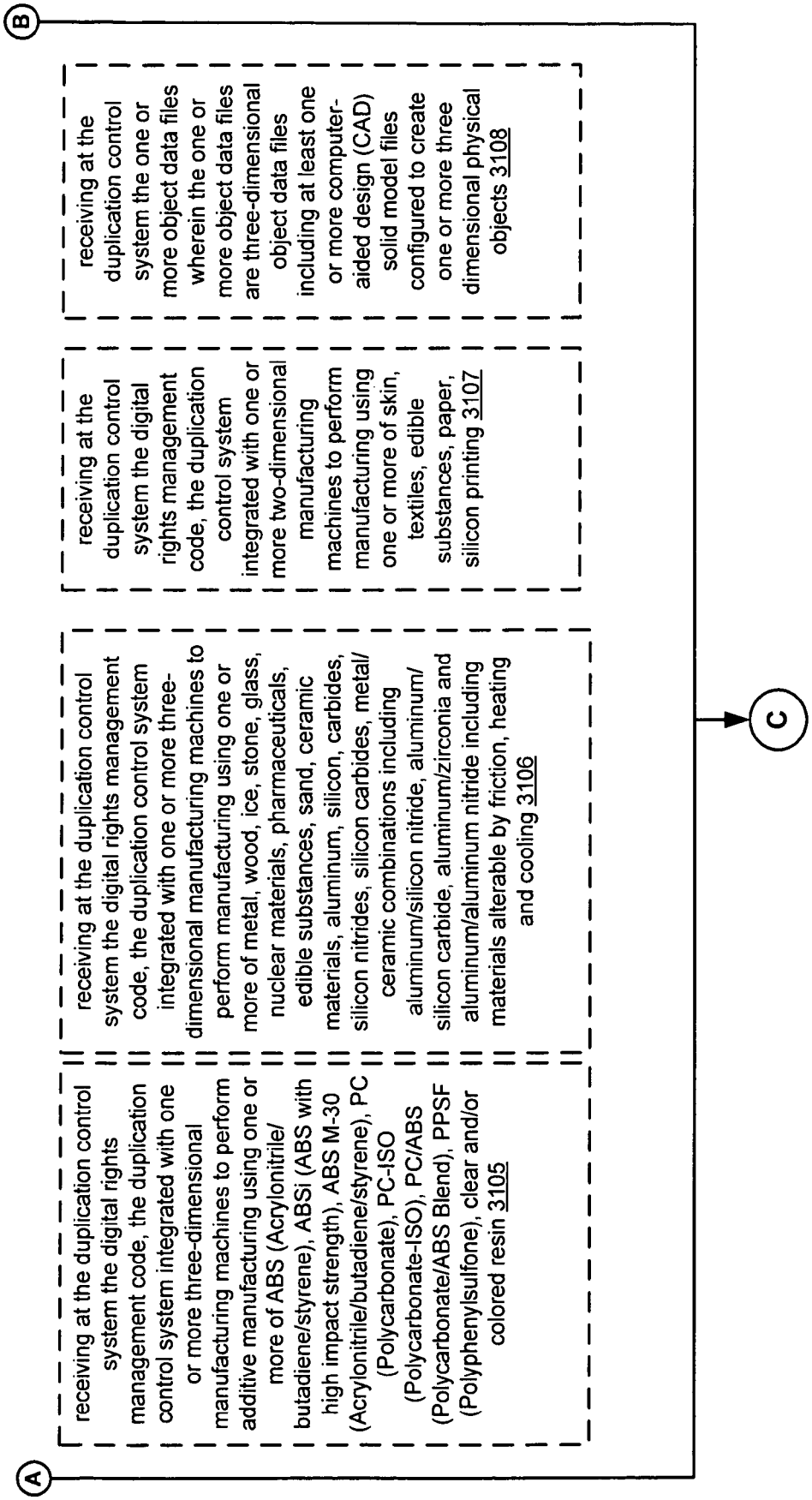

Referring now to FIG. 3B, the flow diagram depicting a method according to an embodiment continues. Specifically, block 310 further depicts optional block 3105, which provides for receiving at the duplication control system the digital rights management code, the duplication control system integrated with one or more three-dimensional manufacturing machines to perform additive manufacturing using one or more of ABS (Acrylonitrile/butadiene/styrene), ABSi (ABS with high impact strength), ABS M-30 (Acrylonitrile/butadiene/styrene), PC (Polycarbonate), PC-ISO (Polycarbonate-ISO), PC/ABS (Polycarbonate/ABS Blend), PPSF (Polyphenylsulfone), clear and/or colored resin (e.g., duplication control system 200 receiving digital rights management code, wherein duplication control system 200 is integrated with one or more of manufacturing machines 290(1-n) that perform three-dimensional manufacturing to perform additive manufacturing).

Block 310 further depicts optional block 3106, which provides for receiving at the duplication control system the digital rights management code, the duplication control system integrated with one or more three-dimensional manufacturing machines to perform manufacturing using one or more of metal, wood, ice, stone, glass, nuclear materials, pharmaceuticals, edible substances, sand, ceramic materials, aluminum, silicon, carbides, silicon nitrides, silicon carbides, metal/ceramic combinations including aluminum/silicon nitride, aluminum/silicon carbide, aluminum/zirconia and aluminum/aluminum nitride including materials alterable by friction, heating and cooling (e.g., duplication control system 200 receiving digital rights management code, wherein duplication control system 200 is integrated with one or more of manufacturing machines 290(1-n) that perform three-dimensional manufacturing to perform manufacturing of metal, wood, ice, stone, glass, nuclear materials, pharmaceuticals, edible substances, sand, ceramic materials, aluminum, silicon, carbides, silicon nitrides, silicon carbides, and/or metal/ceramic combinations).

Block 310 further depicts optional block 3107, which provides for receiving at the duplication control system the digital rights management code, the duplication control system integrated with one or more two-dimensional manufacturing machines to perform manufacturing using one or more of skin, textiles, edible substances, paper, silicon printing (e.g., duplication control system 200 receiving digital rights management code, wherein duplication control system 200 is integrated with one or more of manufacturing machines 290 (1-n) to perform two-dimensional manufacturing).

Block 310 further depicts optional block 3108, which provides for receiving at the duplication control system the one or more object data files wherein the one or more object data files are three-dimensional object data files including at least one or more computer-aided design (CAD) solid model files configured to create one or more three dimensional physical objects (e.g., duplication control system 200 receiving digital rights management code, wherein duplication control system 200 is integrated with one or more of manufacturing machines 290(1-n) to perform three-dimensional manufacturing of CAD files.

Referring now to FIG. 3C, the flow diagram depicting a method in accordance with an embodiment continues. Block 320 illustrates an aspect for generating an authorization status based on the digital rights management code (e.g., digital rights management module 240 generating the authorization status based on received or stored digital rights management code). Depicted within block 320 is optional block 3202 which provides for comparing the digital rights management code to a machine identifier associated with the one or more manufacturing machines to determine whether any of the one or more manufacturing machines is authorized to produce an object described in the object data files (e.g. comparison module 260 comparing the digital rights management code to a machine identifier supplied by one or more of manufacturing machines 290(1-n)).

Block 320 further depicts optional block 3204 which provides for comparing the digital rights management code to a database of digital rights management codes, the database providing the authorization status associated with the digital rights management code (e.g., comparison module 260 comparing the digital rights management code to a database in data store 250 storing digital rights management codes, including authorization status).

Depicted within optional block 3204 is optional block 32042 which provides for comparing the digital rights management code to the database of digital rights management codes to determine one or more of a licensing status, a royalty status, an expiration date pertaining to a license, and a number of manufacturing runs permitted according to a license (e.g., comparison module 260 comparing the digital rights management code to determine a licensing status, royalty status, expiration date, number of times a license permits a manufacturing run and the like).

Referring now to FIG. 3D, the flow diagram continues illustrating the method in accordance with an embodiment with block 330. Specifically, block 330 illustrates an aspect for configuring one or more manufacturing machines to operate as a function of the authorization status (e.g., processor 210 and digital rights management module configuring one or more manufacturing machines 290(1-n) to operate in accordance with the authorization status determined by comparison module 260).

Depicted within block 330 is optional block 3302 which provides for enabling the one or more manufacturing machines to operate if the authorization status provides permission for operation wherein the one or more manufacturing machines perform one or more of rapid prototyping, three-dimensional printing, two-dimensional printing, freeform fabrication, solid freeform fabrication, and stereolithography (e.g., digital rights management module 240 interacting with one or more of manufacturing machines 290(1-n) to operate according the authorization status).

Also depicted within block 330 is optional block 3304 which provides for enabling the one or more manufacturing machines to operate if the authorization status provides permission for operation wherein the one or more manufacturing machines include a subtractive manufacturing machine, including machines adapted for drilling, milling, turning, laser cutting, waterjet cutting, plasma cutting, wire electrical discharge cutting, cold, warm and hot forging metal fabrication, computer numerical controlled fabrication machine, and/or an additive manufacturing machine, and/or an injection molding machine (e.g., digital rights management module 240 interacting with the one or more manufacturing machines 290(1-n) to operate if the authorization status provides permission for operation, the one or more manufacturing machines 290(1-n) including subtractive manufacturing machines).

Further depicted within block 330 is optional block 3306 which provides for enabling the one or more manufacturing machines to operate if the authorization status provides permission for operation wherein the one or more manufacturing machines include one or more of an extrusion manufacturing machine, a melting manufacturing machine, a solidification manufacturing machine, an ejection manufacturing machine, a die casting manufacturing machine, a stamping process machine (e.g., digital rights management module 240 interacting with the one or more manufacturing machines 290(1-n) to operate if the authorization status provides permission for operation, the one or more manufacturing machines 290 (1-n) can include an extrusion manufacturing machine, a melting manufacturing machine, a solidification manufacturing machine, an ejection manufacturing machine, a die casting manufacturing machine, a stamping process machine or the like).

Figure 4:
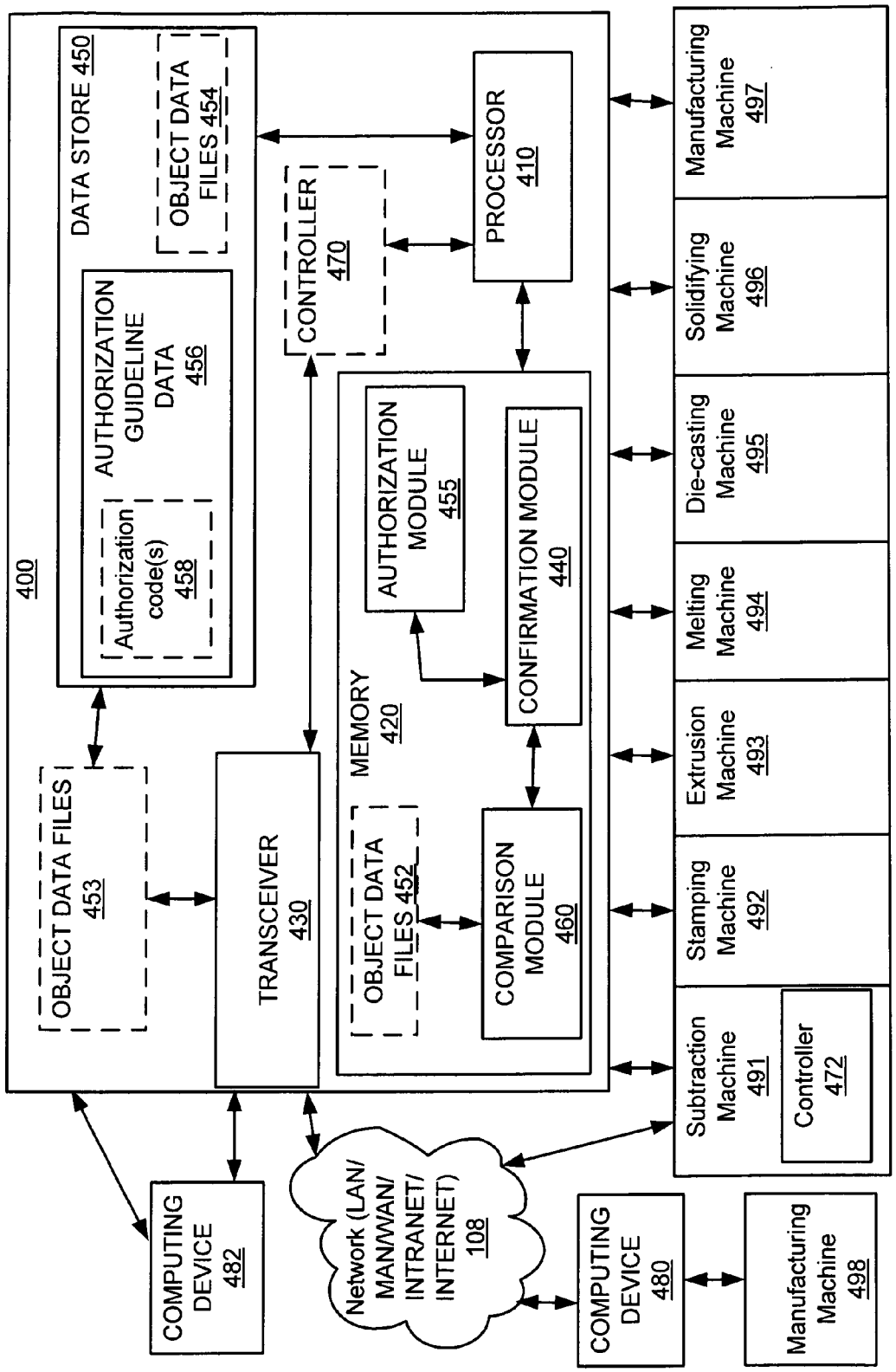
FIG. 4 is a block diagram of an exemplary system that supports the claimed subject matter of the present application.

Referring now to the schematic depiction of FIG. 4, illustrated is an exemplary block diagram for an embodiment of a manufacturing control system 400 for controlling digital production rights for producing a physical object. As shown, manufacturing control system 400 includes a memory 420 coupled to the processor 410. Manufacturing control system 400 further includes transceiver 430 that is shown to be coupled through optional controller 470 to processor 410. FIG. 4 also illustrates transceiver 430 which can be configured to send and receive one or more object data files or directly interact with a computing device 482 for receiving object data files. FIG. 4 also illustrates digital rights confirmation module 440 accessible by processor 410 and by network 108 (see FIG. 1). FIG. 4 further illustrates a data store 450 and an authorization module 455 coupled to processor 410.

Digital rights confirmation module 440 is configured to control digital rights for object data files 452, 453 and/or 454. Authorization module 455 is configured for enabling a manufacturing machine (e.g., manufacturing machines 497, 498) to interface with an object data file only if an authorization code 458 meets one or more predetermined conditions. In one embodiment, digital rights confirmation module 440 is coupled to authorization module 455 and to comparison module 460, which can also be disposed within memory 420. In one embodiment, comparison module 460 compares one or more authorization codes to a stored list of digital rights management codes to determine the authorization status as a function of the status of one or more previously compiled object data files. Comparison module 460 can further interact with object data files 452, object data files 453, or object data files 454. In one embodiment, object data files 452, 453 and/or 454 include one or more computer-aided design (CAD) solid model files configured to create three dimensional physical objects. In other embodiments the object data files are configured to create two-dimensional objects, renderings, prototypes and the like.

Data store 450 is configured to include authorization guideline data 456 such as authorization code(s) 458 or other digital rights authorization data. In the embodiment in which data store 450 includes object data files 454, the object data files can be files that previously existed in data store 450, or can be files that were previously received by the manufacturing control system 400 via transceiver 430, memory 420, network 108.

FIG. 4 further illustrates manufacturing machines coupled to control system 400. Specifically, manufacturing control system 400 is illustrated coupled to subtraction machine 491, stamping machine 492, extrusion machine 493, melting machine 494, die-casting machine 495, solidifying machine 496, and generic manufacturing machine 497. Manufacturing control system 400 is further coupled to manufacturing machine 498 via network 108 and computing device 480. In one embodiment, subtraction machine 491 can be configured with a controller 472 and be alternatively coupled to manufacturing control system via network 108 or directly. Subtraction machine 491 illustrates an exemplary manufacturing machine with a controller 472 to control digital production rights directly and/or over a network connection. Likewise, manufacturing machine 498 could be coupled to a controller located in computing device 480 or receive control directions from manufacturing control system 400. Each of manufacturing machines 491-498 can allow manufacture of an object described by the one or more object data files as directed by manufacturing control system 400 and controllers 470 and 472.

As shown, manufacturing machines 491-498 can be three-dimensional additive manufacturing machines configured for rapid prototyping, three-dimensional printing, two-dimensional printing, freeform fabrication, solid freeform fabrication, and stereolithography.

Manufacturing machines 491-498 include a subtractive manufacturing machine 491, which can be adapted for drilling, milling, turning, laser cutting, waterjet cutting, plasma cutting, wire electrical discharge cutting, cold, warm and hot forging metal fabrication, computer numerical controlled fabrication machine, and/or an additive manufacturing machine, and/or an injection molding machine.

Manufacturing machines 491-498 are shown including an extrusion manufacturing machine 493, a melting manufacturing machine 494, a solidification manufacturing machine 496, a die casting manufacturing machine 495, a stamping process machine 492, and a generic manufacturing machine 497 which can be configured as an ejection manufacturing machine.

In another embodiment, manufacturing machines 497 and/or 498 can be configured to perform manufacturing using one or more of metal, wood, ice, stone, glass, nuclear materials, pharmaceuticals, edible substances, sand, ceramic materials, aluminum, silicon, carbides, silicon nitrides, silicon carbides, metal/ceramic combinations including aluminum/silicon nitride, aluminum/silicon carbide, aluminum/zirconia, aluminum/aluminum nitride including materials alterable by friction, heating and cooling.

In another embodiment, manufacturing machines 497 and/or 498 can include a manufacturing machine configured as two-dimensional manufacturing machines configured to perform manufacturing of one or more of skin, textiles, edible substances, paper and/or silicon printing.

Figure 5A:
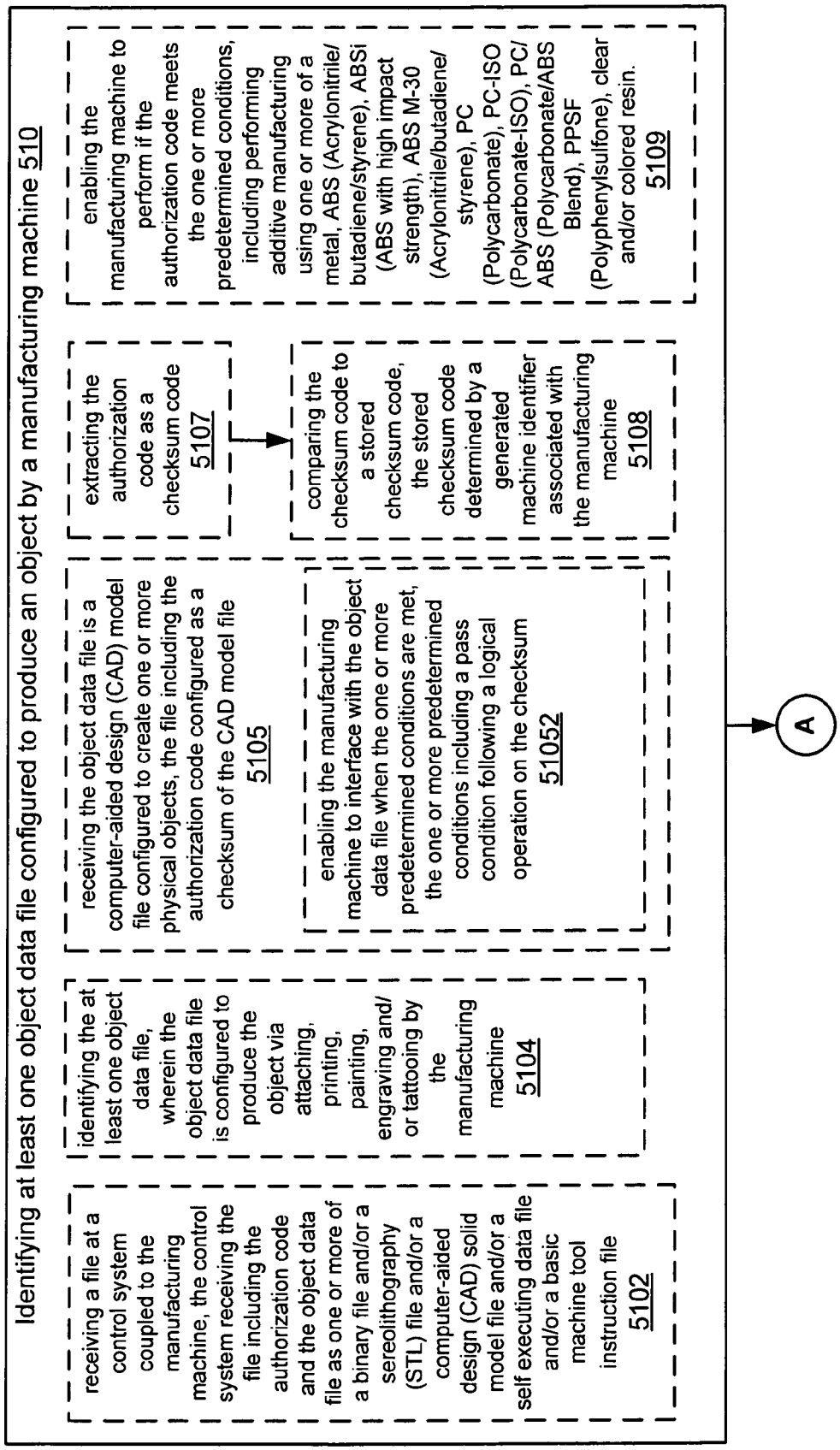
Figure 5B:
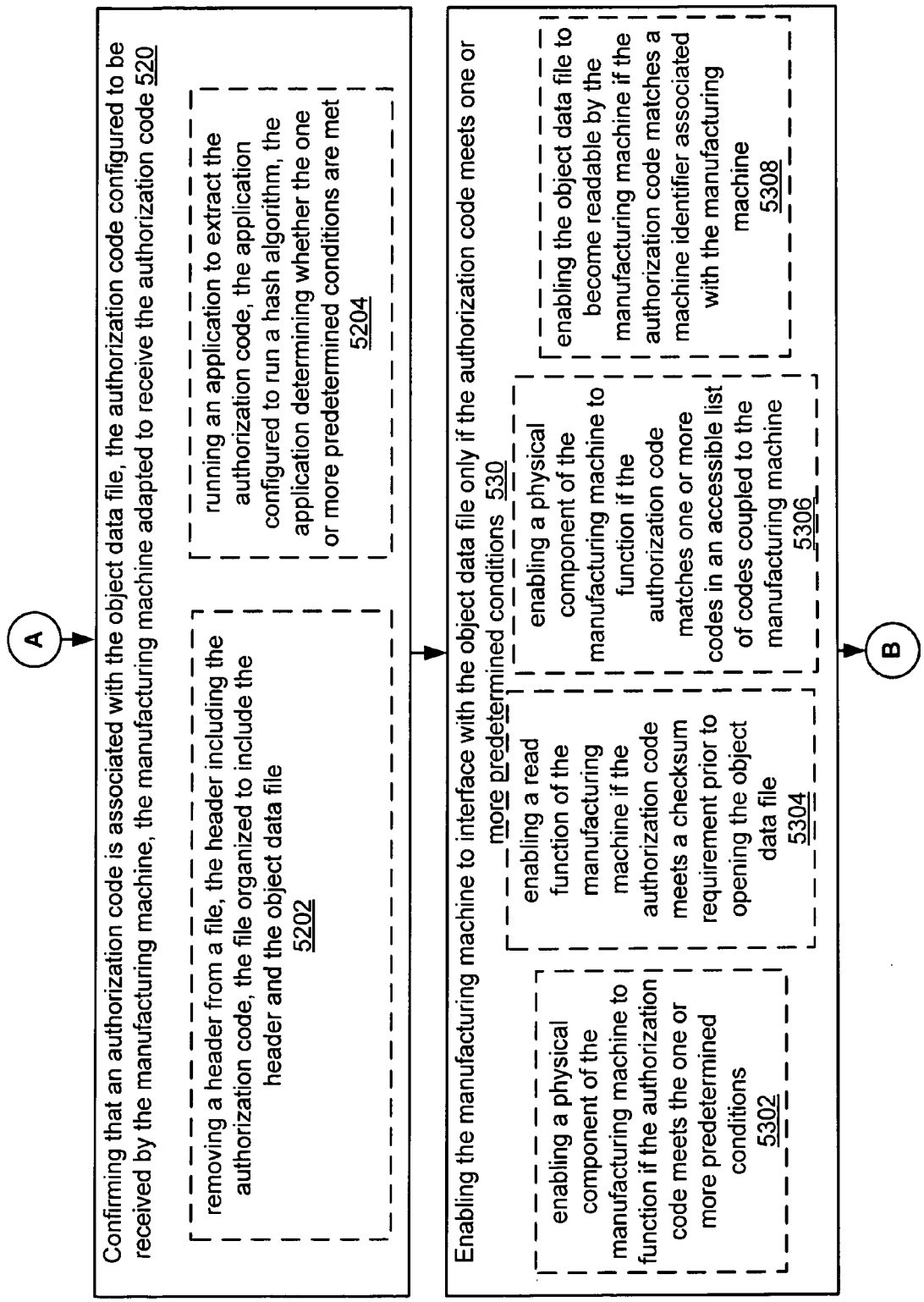

Referring now to FIGS. 5A, 5B and 5C, a flow diagram illustrates a method in accordance with an embodiment. Block 510 provides for identifying at least one object data file configured to produce an object by a manufacturing machine (e.g., controller 470 and/or 472 identifying object data files 452, 453, 454 to produce an object by manufacturing machines 497, 498, and/or subtraction machine 491, stamping machine 492, extrusion machine 493, melting machine 494, die-casting machine 495 and/or solidifying machine 496). Disposed within block 510 is optional block 5102 which provides for receiving a file at a control system coupled to the manufacturing machine, the control system receiving the file including the authorization code and the object data file as one or more of a binary file and/or a stereolithography (STL) file and/or a computer-aided design (CAD) solid model file and/or a self executing data file and/or a basic machine tool instruction file (e.g., transceiver 430 in control system 400 receiving object data files 452, 453, 454). Further disposed in block 510 is optional block 5104 which provides for identifying the at least one object data file, wherein the object data file is configured to produce the object via attaching, printing, painting, engraving and/or tattooing by the manufacturing machine (e.g., transceiver 430 and control system 400 identifying object data files 452, 453, 454). Further disposed in block 510 is block 5105 which provides for receiving the object data file as a computer-aided design (CAD) model file configured to create one or more physical objects, the object data file including the authorization code configured as a checksum of the CAD model file (e.g., transceiver 430 receiving object data files 452, 453, 454 including authorization code configured as a checksum of a CAD model file).

Disposed within block 5105 is optional block 51052, which provides for enabling the manufacturing machine to interface with the object data file when the one or more predetermined conditions are met, the one or more predetermined conditions including a pass condition following a logical operation on the checksum (e.g., controller 470, controller 472 and/or processor 410 enabling manufacturing machines 497, 498, and/or subtraction machine 491, stamping machine 492, extrusion machine 493, melting machine 494, die-casting machine 495 and/or solidifying machine 496 to interface with object data files 452, 453, and/or 454 when predetermined conditions are met, including a pass condition).

Further disposed in block 510 is optional block 5107 and optional block 5108. Optional block 5107 provides for extracting the authorization code as a checksum code (e.g., processor 410, controller 470 and/or controller 472 extracting authorization code from object data files 452, 453 and/or 454). Optional block 5108 provides for comparing the checksum code to a stored checksum code, the stored checksum code determined by a generated machine identifier associated with the manufacturing machine (e.g. comparison module 460 comparing checksum code to checksum code stored in data store 450 and/or manufacturing machines 497, 498, and/or subtraction machine 491, stamping machine 492, extrusion machine 493, melting machine 494, die-casting machine 495 and/or solidifying machine 496).

Further disposed in block 510 is optional block 5109 which provides for enabling the manufacturing machine to perform if the authorization code meets the one or more predetermined conditions, including performing additive manufacturing using one or more of a metal, ABS (Acrylonitrile/butadiene/styrene), ABSi (ABS with high impact strength), ABS M-30 (Acrylonitrile/butadiene/styrene), PC (Polycarbonate), PC-ISO (Polycarbonate-ISO), PC/ABS (Polycarbonate/ABS Blend), PPSF (Polyphenylsulfone), clear and/or colored resin (e.g., controller 470, 472 and/or control system 400 enabling manufacturing machines 497, 498, and/or subtraction machine 491, stamping machine 492, extrusion machine 493, melting machine 494, die-casting machine 495 and/or solidifying machine 496 to perform if the authorization code meets the one or more predetermined conditions).

Block 520 provides for confirming that an authorization code is associated with the object data file, the authorization code configured to be received by the manufacturing machine, the manufacturing machine adapted to receive the authorization code (e.g. controller 470 and/or 472 and/or manufacturing control system 400 confirming that an authorization code is associated with one or more of object data files 452, 453, and/or 454 to be received by one or more of manufacturing machines 491-498. Depicted within block 520 is optional block 5202 which provides for removing a header from a file, the header including the authorization code, the file organized to include the header and the object data file (e.g. processor 410 removing a header from one or more of object data files 452, 453 and/or 454, the header including the authorization code). Further depicted in block 520 is optional block 5204 which provides for running an application to extract the authorization code, the application configured to run a hash algorithm, the application determining whether the one or more predetermined conditions are met (e.g., processor 410 running an application (e.g., application 679) or an application stored in memory 420 to extract an authorization code from one or more of object data files 452, 453, and/or 454).

Block 530 provides for enabling the manufacturing machine to interface with the object data file only if the authorization code meets one or more predetermined conditions (e.g., controller 470, 472 and/or control system 400 enabling manufacturing machines 497, 498, and/or subtraction machine 491, stamping machine 492, extrusion machine 493, melting machine 494, die-casting machine 495 and/or solidifying machine 496 to interface with object data files 452, 453, and/or 454 only if the authorization code meets one or more predetermined conditions). Depicted within block 530 is optional block 5302 which provides for enabling a physical component of the manufacturing machine to function if the authorization code meets the one or more predetermined conditions (e.g., controller 470, 472 and/or control system 400 enabling physical component within or attached to manufacturing machines 497, 498, and/or subtraction machine 491, stamping machine 492, extrusion machine 493, melting machine 494, die-casting machine 495 and/or solidifying machine 496 to function if the authorization code meets predetermined conditions). Also depicted within block 530 is optional block 5304, which provides for enabling a read function of the manufacturing machine if the authorization code meets a checksum requirement prior to opening the object data file (e.g., controller 470, 472 and/or control system 400 enabling a read function of manufacturing machines 497, 498, and/or subtraction machine 491, stamping machine 492, extrusion machine 493, melting machine 494, die-casting machine 495 and/or solidifying machine 496 if the authorization code meets a checksum requirement). Further depicted within block 530 is optional block 5306 which provides for enabling a physical component of the manufacturing machine to function if the authorization code matches one or more codes in an accessible list of codes coupled to the manufacturing machine (e.g., controller 470, 472 and/or control system 400 enabling a physical component of manufacturing machines 497, 498, and/or subtraction machine 491, stamping machine 492, extrusion machine 493, melting machine 494, die-casting machine 495 and/or solidifying machine 496 if the authorization code matches an accessible list of codes). Further depicted within block 530 is optional 5308 which provides for enabling the object data file to become readable by the manufacturing machine if the authorization code matches a machine identifier associated with the manufacturing machine (e.g., controller 470, 472 and/or control system 400 enabling one or more of object data files 452, 453, and/or 454 to become readable by one or more of manufacturing machines 497, 498, and/or subtraction machine 491, stamping machine 492, extrusion machine 493, melting machine 494, die-casting machine 495 and/or solidifying machine 496 if the authorization code matches a machine identifier associated with the one or more manufacturing machines 491-498).

Block 540 provides for enabling the manufacturing machine to perform one or more of stereolithography (SLA), selective laser sintering (SLS), computer numerical control (CNC), and fused deposition modeling (FDM) if the authorization code meets the one or more predetermined conditions (e.g., controller 470, 472 and/or control system 400 enabling one or more of manufacturing machines 497, 498, and/or subtraction machine 491, stamping machine 492, extrusion machine 493, melting machine 494, die-casting machine 495 and/or solidifying machine 496 to perform one or more of stereolithography (SLA), selective laser sintering (SLS), computer numerical control (CNC), and fused deposition modeling (FDM) if the authorization code meets the one or more predetermined conditions).

Block 550 provides for enabling the manufacturing machine to perform if the authorization code meets the one or more predetermined conditions, including performing additive manufacturing using one or more of ABS (Acrylonitrile/butadiene/styrene), ABSi (ABS with high impact strength), ABS M-30 (Acrylonitrile/butadiene/styrene), PC (Polycarbonate), PC-ISO (Polycarbonate-ISO), PC/ABS (Polycarbonate/ABS Blend), PPSF (Polyphenylsulfone), clear and/or colored resin (e.g., controller 470, 472 and/or control system 400 enabling one or more of manufacturing machines 497, 498, and/or subtraction machine 491, stamping machine 492, extrusion machine 493, melting machine 494, die-casting machine 495 and/or solidifying machine 496 to perform if the authorization code meets the one or more predetermined conditions).

Block 560 provides for enabling the manufacturing machine to perform if the authorization code meets the one or more predetermined conditions, including performing three-dimensional manufacturing using one or more of metal, wood, ice, stone, glass, nuclear materials, pharmaceuticals, edible substances, sand, ceramic materials, aluminum, silicon, carbides, silicon nitrides, silicon carbides, metal/ceramic combinations including aluminum/silicon nitride, aluminum/silicon carbide, aluminum/zirconia and aluminum/aluminum nitride including materials alterable by friction, heating and cooling (e.g., controller 470, 472 and/or control system 400 enabling one or more of manufacturing machines 497, 498, and/or subtraction machine 491, stamping machine 492, extrusion machine 493, melting machine 494, die-casting machine 495 and/or solidifying machine 496 to perform if the authorization code meets the one or more predetermined conditions).

Block 570 provides for enabling the manufacturing machine to perform if the authorization code meets the one or more predetermined conditions, including manufacturing using one or more of skin, textiles, edible substances, paper, and silicon printing (e.g. controller 470, 472 and/or control system 400 enabling one or more of manufacturing machines 497, 498, and/or subtraction machine 491, stamping machine 492, extrusion machine 493, melting machine 494, die-casting machine 495 and/or solidifying machine 496 to perform if the authorization code meets the one or more predetermined conditions).

Figure 6A:
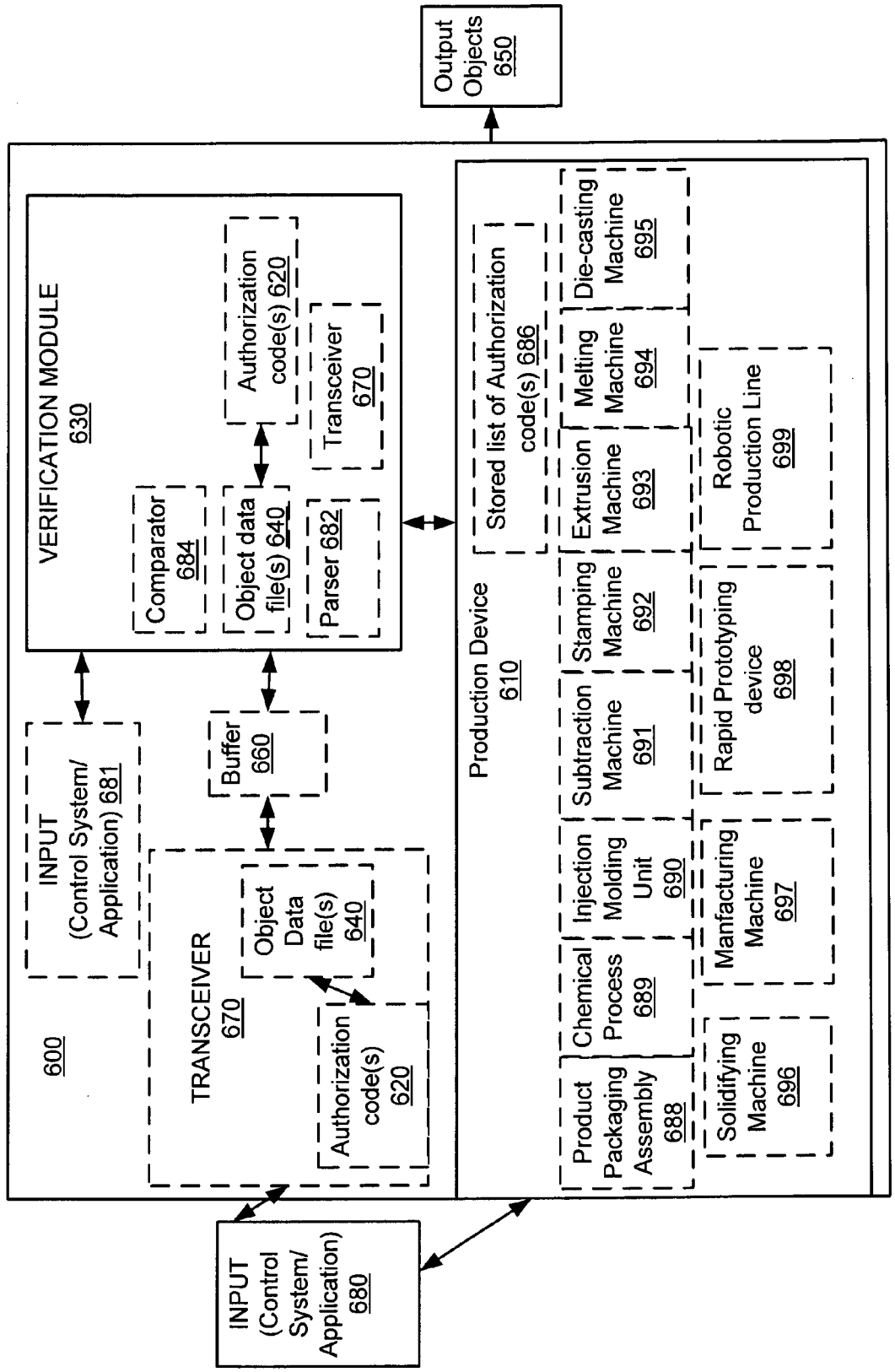
FIGS. 6A and 6B are block diagrams of further exemplary systems that support the claimed subject matter of the present application.

Referring now to FIG. 6A, an exemplary embodiment of a security-controlled production system 600 is illustrated. More particularly, FIG. 6A illustrates a production system 600 including production device 610; authorization code(s) 620 that requires one or more pre-conditions for controlling operation of production device 610, and verification module 630 capable of enabling or disabling production device 610. Verification module 630 is shown operably coupled to authorization code(s) 620, which can be received via buffer 660 and/or transceiver 670. The buffer 660 shown in dashed lines is coupled to the verification module 630 and to transceiver 670. It will be understood that the buffer 660 can be configured to send an acknowledgement that the object data file was received by the production system 600. In one embodiment, transceiver 670 can be configured to operate as a buffer. In other embodiments, transceiver 670 can function only as a transmitting device coupled to a separate buffer 660 as will be appreciated by one of skill in the art. In either case, according to an embodiment, buffer 660 or transceiver 670 configured as a buffer can be adapted for processing object data file(s) 640 to verify a request to instantiate the object data file 640 received from input 620.

Verification module 630 can include authorization codes 620 as a data store of authorization code(s) 620 within verification module 630 or as separately received authorization codes via an input module 680. In some instances an input module 681 may be incorporated as part of the production system 600. In one embodiment, inputs 680 and 681 can be associated with a production device for creating, producing, or duplicating an object in accordance with a security technique disclosed herein. For example, input 681 and/or input 680 could be adapted to enable creating, producing and/or duplicating in accordance with authorization code(s) 620. As one of skilled in the art with the benefit of the present application will appreciate, input 681 could be configured to serve as an internal source of object data, applications and the like.

As further illustrated in FIG. 6A, an exemplary production system 600 also includes object data file(s) 640, associated with authorization code(s) 620. Object data file(s) 640 are configured to enable production device 610 make or prevent production of one or more objects 650 based on confirmation or preventive indications from verification module 630 and/or authorization code(s) 620 in accordance with predetermined condition. Object data file(s) 640 can be configured as production model files and/or computer-aided design (CAD) solid model files or the like.

In one embodiment, production system 600 buffer 660 is adapted to receive the authorization code(s) 620 and notify validation module 630 that an object data file(s) 640 is loaded in buffer 660 and/or transceiver 670 configured to operate as a buffer.

In one embodiment, verification module 630 is configured to extract authorization code(s) 620 from object data file(s) 640 so that the authorization code(s) 620 can enable production device 610 to acknowledge the object data file as a valid file or invalid file. Alternatively or additionally, verification module 630 can be configured to extract the authorization code(s) 620 which could include various implementations such as, for example, a redundancy check, error checking algorithm, checksum, and/or cryptographic hash function code(s). In another embodiment, verification module 630 includes a parser 682 configured for removing a header from the object data file(s) 640. In one embodiment, the header can include authorization code(s) 620. Verification module 630 can also be configured to include transceiver 670 to transmit authorization code(s) 620 to control system 680. Transceiver 670 within verification module 630 can be coupled to both control system 680 and production device 610 to receive an enabling signal from the control system 680 to enable reification of the one or more objects 650.

In another embodiment, verification module 630 includes a comparator 684 to compare authorization code(s) 620 to a stored list of authorization codes 686 accessible to production device 610 via verification module 630 or by a stored list 686 within production device 610. The comparator 684 and/or another element outside verification module 630 can be configured to receive an indication from control system 680 operably coupled to production device 610 that authorization code(s) 620 are verified as valid.

In one embodiment, verification module 630 is configured for verifying authorization code(s) 620 that include data concerning copyright protection of the object data files) 640. For example, object data file(s) 640 can include reproducible object files to enable production device 210 to reify the one or more objects 650. In another embodiment, verification module 630 operates to verify that authorization code(s) 620 wherein the authorization code is associated with a licensing status associated with the one or more objects and/or object data file, the licensing status indicative of one or more of a royalty status, an expiration date pertaining to a license, and/or a number of manufacturing runs permitted according to the license. The license information, in one embodiment can be accessed via control system 680 or via an outside source. In another embodiment, verification module 630 is configured for verifying authorization code(s) 620 to determine a payment status and/or an authorization status under a reification agreement. A reification agreement can include an intellectual property licensing agreement, a private party ownership agreement, or any agreement associated with creating, producing or duplicating objects from an object data file 640.

FIG. 6A further illustrates various embodiments of a production system 600 that can include one or more production devices 610 having security control features to enable or prevent two-dimensional manufacturing techniques, three-dimensional manufacturing techniques, additive manufacturing units, and/or subtractive manufacturing using exemplary industrial or commercial production methods and/or components shown as product packaging assembly 688, chemical process 689, injection molding unit 690, subtraction machine 691, stamping machine 692, extrusion machine 693, melting machine 694, die-casting machine 695, solidifying machine 696, customized manufacturing machine 697, rapid prototyping device 698, and robotic production line 699. A production device 610 can, in one embodiment, interact with verification module 630 to enable or prevent a functioning of a physical component of production device 610, such as in one of the production machines or processes 688-699 if the authorization code(s) 620 meet one or more predetermined conditions, such as a code that cryptographically interacts with production device 610 to produce a binary output to a switch or the like. In another embodiment, verification module 630 can prevent or enable a read function in one or more of verification module 630 and/or production device 610 if the authorization code(s) 620 is accepted by a control system input 680 operably coupled to production device 610.

In a further embodiment, verification module 630 is configured for enabling or disabling the production device dependent on one or more predetermined conditions. Examples of such predetermined conditions may include but are not limited to one or more of the following: benchmark comparison, temporal milestone, time period restriction, production quantity limitation, production machine qualification, operator qualification, event occurrence, and quality certification.

In another embodiment, verification module 630 enables or prevents object data file(s) 640 to become readable by production device 610 if the authorization code(s) 620 passes a compare function performed by comparator 684 associated with a machine identifier passed to comparator 684 from production device 610.

Figure 6B:
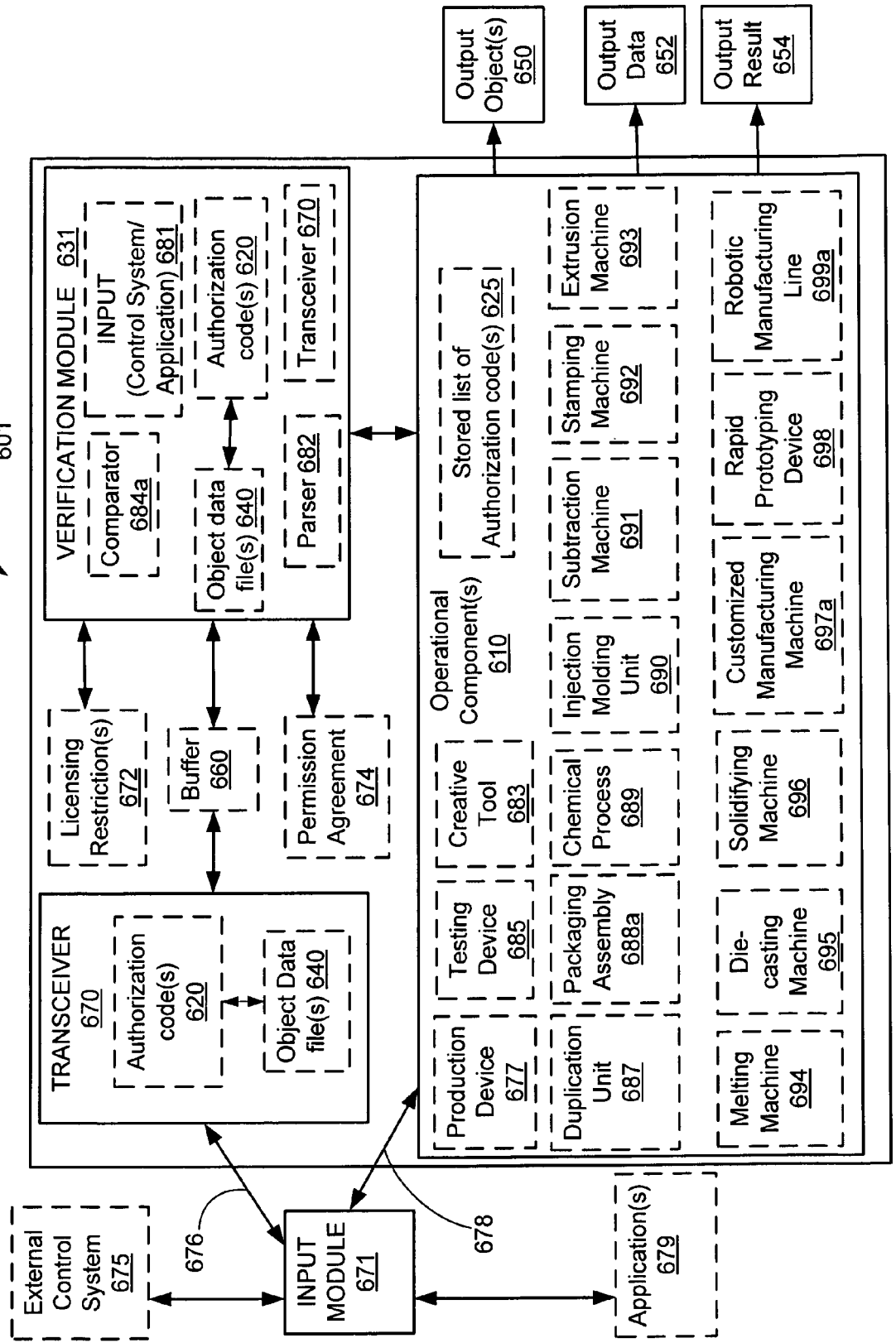

Referring now to FIG. 6B, another exemplary embodiment of a security control system 601 is illustrated. More particularly, FIG. 6B illustrates a security control system 601 including one or more operational components 611; authorization code(s) 620 that requires one or more pre-conditions for controlling operation of an operational component 611, and verification module 631 capable of enabling or disabling an operational component 611. Verification module 631 is shown operably coupled to authorization code(s) 620, which can be stored locally as well as received via buffer 660 and/or transceiver 670. The buffer 660 shown in dashed lines is coupled to the verification module 631 and to transceiver 670. It will be understood that the buffer 660 can be configured to send an acknowledgement that the object data file was received by the security control system 601. In one embodiment, transceiver 670 can be configured to operate as a buffer. In other embodiments, transceiver 670 can function only as a transmitting device coupled to a separate buffer 660 as will be appreciated by one of skill in the art. In either case, according to an embodiment, buffer 660 or transceiver 670 configured as a buffer can be adapted for processing object data file(s) 640 to verify a request to implement (e.g., instantiate) the object data file 640 received from input module 671.

Verification module 631 can include authorization codes 620 as a data store of authorization code(s) 620 within verification module 631 or as separately received authorization codes via input module 671. In some instances an input module 671 may be incorporated as part of the security control system 601. In one embodiment, inputs 676 and 678 received from an external control system 675 can be associated with an operational component for creating, producing, duplicating, processing, or testing an object in accordance with a security technique disclosed herein. For example, input 676 and/or input 678 could be adapted to enable creating, producing, duplicating, processing, and/or testing in accordance with authorization code(s) 620. As one of skilled in the art with the benefit of the present application will appreciate, input 676 could be configured to serve as an internal source of object data, applications (e.g., see 679) and the like.

Security control system 601 also includes object data file(s) 640, associated with authorization code(s) 620. Object data file(s) 640 are configured to enable an operational component 611 to initiate or prevent an operational function regarding an operational output (see output objects 650, output data 652, output result 654) based on confirmation or preventive indications from verification module 631 and/or authorization code(s) 620 in accordance with a predetermined condition. Object data file(s) 640 can be configured as operational instructions, production model files, computer-aided manufacturing (CAM) files, and/or computer-aided design (CAD) solid model files or the like.

In one embodiment, security control system 601 includes buffer 660 that is adapted to receive the authorization code(s) 620 and notify verification module 631 that an object data file(s) 640 is loaded in buffer 660 and/or transceiver 670 configured to operate as a buffer.

In one embodiment, verification module 631 is configured to extract authorization code(s) 620 from object data file(s) 640 so that the authorization code(s) 620 can enable the security control system 601 to acknowledge the object data file as a valid file or invalid file. Alternatively or additionally, verification module 631 can be configured to extract the authorization code(s) 620 which could include various security implementations such as, for example, a redundancy check, error checking algorithm, checksum, and/or cryptographic hash function code(s). In another embodiment, verification module 631 includes a parser 682 configured for removing a header from the object data file(s) 640. In one embodiment, the header can include authorization code(s) 620. Verification module 631 can also be configured to include transceiver 670 to receive authorization code(s) 620 via input module 671. In some instances, transceiver 670 can be coupled to both an external control system 675 and an operational component 611 to receive an enabling signal from the external control system 675 to enable implementation of an operational output (see output objects 650, output data 652, output result 654).

In another embodiment, verification module 631 includes a comparator 684a to compare authorization code(s) 620 to a stored list of authorization codes 625 accessible to an operational component 611 via verification module 631 or by a stored list 625 within an operational component 611. The comparator 684a and/or another element outside verification module 631 can be configured to generate an authorization code validation as well as to receive an indication from external control system 675 via input module 671 that authorization code(s) 620 are verified as valid.

In one embodiment, verification module 631 is configured for verifying authorization code(s) 620 that include data concerning copyright protection of the object data file(s) 640. For example, object data file(s) 640 can include reproducible object files to enable an operational component 611 to implement (e.g. reify) an operational output (see 650, 652, 654). In another embodiment, verification module 631 operates to verify authorization code(s) 620 wherein the authorization code is associated with a pre-condition that may include a licensing status associated with the one or more objects and/or object data file.

The licensing status may ins some embodiments be indicative of one or more of a royalty status, an expiration date pertaining to a license, and/or a number of manufacturing runs permitted according to the license, as well as other pertinent licensing requirements such as licensing restriction(s) 672. In one embodiment the license information including licensing requirements 672 can be accessed locally by security control system 601, or in some instances from an outside source via input module 671.

In another embodiment, verification module 631 is configured for verifying authorization code(s) 620 to determine a payment status and/or an authorization status under a permission agreement 674. The permission agreement 674 can include an intellectual property licensing agreement, a private party ownership agreement, or any other agreement associated with creating, producing, duplicating, processing, or testing objects to implement an exemplary functional operation involving one or more output objects 650, output data 652 and/or output result 654. In one embodiment the permission agreement 674 that includes various predetermined conditions can be accessed locally by security control system 601, or in some instances from an outside source via input module 671.

FIG. 6B further illustrates various embodiments of a security control system 601 that can include one or more an operational components 611 having security control features to enable or prevent various exemplary functional operations that may include two-dimensional manufacturing techniques, three-dimensional manufacturing techniques, additive manufacturing units, and/or subtractive manufacturing using exemplary industrial or commercial production methods and/or operational components shown as production device 677, testing device 685, creative tool 683, duplication unit 687, packaging assembly 688a, chemical process 689, injection molding unit 690, subtraction machine 691, stamping machine 692, extrusion machine 693, melting machine 694, die-casting machine 695, solidifying machine 696, customized manufacturing machine 697a, rapid prototyping device 698, and robotic manufacturing line 699a.

An operational component 611 can, in one embodiment, interact with verification module 631 to enable or prevent functioning of a physical aspect of an operational component 611 (e.g., one or more of the illustrated operational components such as 687-699a) if the authorization code(s) 620 meet one or more predetermined conditions, such as a code that cryptographically interacts with an operational component 611 to produce a binary output to a switch or the like. In another embodiment, verification module 631 can prevent or enable a read function in one or more of verification module 631 and/or an operational component 611 if the authorization code(s) 620 is accepted from external control system 675 via input module 671 or is validated locally by verification module 631.

In a further embodiment, verification module 631 is configured for enabling or disabling an operational component 611 dependent on one or more predetermined conditions. Examples of such predetermined conditions (e.g., licensing restrictions 672, permission agreement 674) applicable to one or more of the operational components 611 may include but are not limited to one or more of the following: benchmark comparison, temporal milestone, time period restriction, production quantity limitation, production machine qualification, operator qualification, event occurrence, and quality certification.

In another embodiment, verification module 631 enables (or in some instances prevents) object data file(s) 640 to become readable by an operational component 611 if the authorization code(s) 620 passes a compare function performed by comparator 684a associated with a machine identifier passed to comparator 684a from an operational component 611.

Figure 7A:
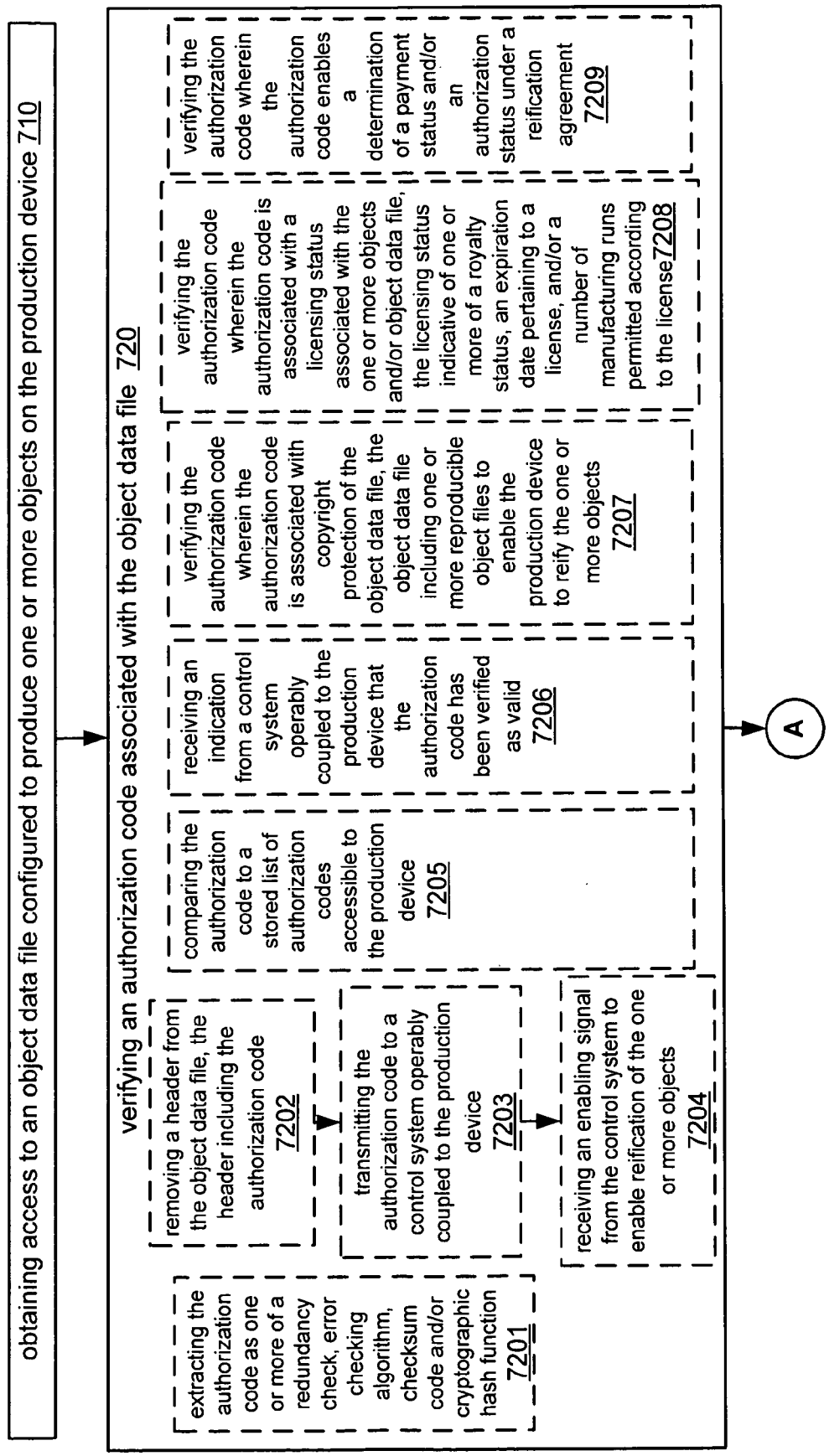

Referring now to FIGS. 7A, 7B, 7C, and 7D, a flow diagram illustrates a method in accordance with various embodiments for a security-activated operational component (e.g., described for illustration purposes in the flow diagrams as a production device). In that regard FIG. 7A illustrates block 710, which provides for obtaining access to an object data file configured to produce one or more objects by an operational component (e.g., an operational component 611, security control system 601, or an application 679 or the like accessing object data file(s) 640). Block 720 provides for verifying an authorization code associated with the object data file (e.g., verification module 631 verifying authorization code(s) 620 associated with object data file(s) 640).

Disposed within block 720 is optional block 7201, which provides for extracting the authorization code as one or more of a redundancy check, error checking algorithm, checksum code and/or cryptographic hash function (e.g., verification module 631 extracting authorization code(s) 620 wherein authorization code(s) 620 are checksum codes and/or cryptographic hash functions). Also disposed within block 720 is optional block 7202, which provides for removing a header from the object data file, the header including the authorization code (e.g., verification module 631 removing a header from object data file(s) 640 wherein the header includes authorization code(s) 620). Following optional block 7202 is optional block 7203 which provides for transmitting the authorization code to a control system operably coupled to the operational component (e.g., transceiver 670 transmitting authorization code(s) 620 to or from external control system 675 coupled to operational component 611). Following optional block 7203 is optional block 7204 which provides for receiving an enabling signal from the control system to enable reification of the one or more objects (e.g., external control system 675 or security control system 601 sending an enabling signal or disabling signal to enable or prevent reification of output objects 650).

Also included in block 720 is optional block 7205 which provides for comparing the authorization code to a stored list of authorization codes accessible to an operational component (e.g., comparator 684a comparing authorization code(s) 620 to stored list 625 of authorization codes accessible to an operational component 611).

Also included in block 720 is optional block 7206 which provides for receiving an indication from a control system operably coupled to an operational component that the authorization code has been verified as valid (e.g., transceiver 670 receiving an indication from external control system 675 coupled to an operational component 611 that authorization code(s) 620 are verified as valid). Also included in block 720 is optional block 7207 which provides for verifying the authorization code wherein the authorization code is associated with copyright protection of the object data file, the object data file including one or more reproducible object files to enable an operational component to implement a function (e.g., reify) regarding the one or more objects.

Also included in block 720 is optional block 7208 which provides for verifying the authorization code wherein the authorization code is associated with a licensing status associated with the one or more objects and/or object data file, the licensing status including licensing restrictions 672 indicative of one or more of a royalty status, an expiration date pertaining to a license, and/or a number of manufacturing runs permitted according to the license (e.g., verification module 631 verifying authorization code(s) 620 associated with a licensing status associated with objects 650 and/or object data file(s) 640, the licensing status indicating a royalty status, an expiration date for the license and/or a number of manufacturing runs under the license).

Also disposed in block 720 is optional block 7209 which provides for verifying the authorization code wherein the authorization code enables a determination of an applicable pre-condition such as payment status and/or an authorization status under a reification agreement (e.g., verification module 631 verifying authorization code(s) 620, wherein the authorization code(s) 620 enables a determination of a payment status and/or an authorization status under a permission agreement 674 to reify objects 650 described by an object data file(s) 640).

Figure 7B:
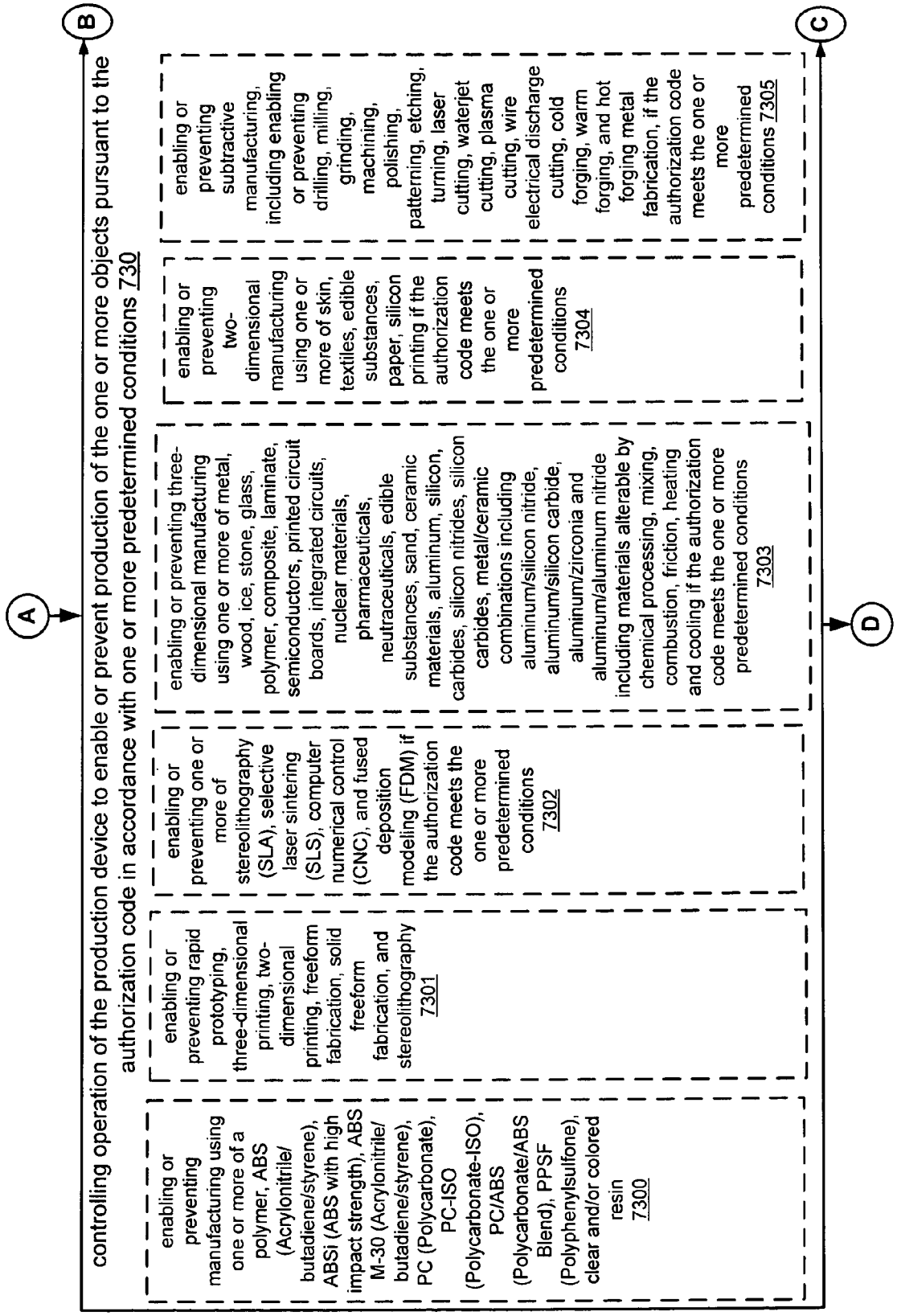

The method continues in FIG. 7B illustrating block 730, which provides for controlling operation of an operational component to enable or prevent an operational function regarding the one or more objects pursuant to the authorization code in accordance with one or more predetermined conditions (e.g., verification module 631 interacting with an operational component 611 to enable or prevent an operational function regarding output objects 650 or output data 652 or output result 654 in accordance with licensing restrictions 672 and/or permission agreement 674).

Disposed within block 730 is shown optional block 7300 which provides for enabling or preventing manufacturing using one or more of a polymer, ABS (Acrylonitrile/butadiene/styrene), ABSi (ABS with high impact strength), ABS M-30 (Acrylonitrile/butadiene/styrene), PC (Polycarbonate), PC-ISO (Polycarbonate-ISO), PC/ABS (Polycarbonate/ABS Blend), PPSF (Polyphenylsulfone), clear and/or colored resin (e.g. verification module 631 enabling or preventing manufacturing using one or more of a polymer, ABS (Acrylonitrile/butadiene/styrene), ABSi (ABS with high impact strength), ABS M-30 (Acrylonitrile/butadiene/styrene), PC (Polycarbonate), PC-ISO (Polycarbonate-ISO), PC/ABS (Polycarbonate/ABS Blend), PPSF (Polyphenylsulfone), clear and/or colored resin).

Also disposed within block 730 is optional block 7301 which provides for enabling or preventing rapid prototyping, three-dimensional printing, two-dimensional printing, freeform fabrication, solid freeform fabrication, and stereolithography (e.g., verification module 630 enabling or preventing rapid prototyping, three-dimensional printing, two-dimensional printing, freeform fabrication, solid freeform fabrication, and stereolithography in production embodiments 688-699).

Also disposed within block 730 is optional block 7302, which provides for enabling or preventing one or more of stereolithography (SLA), selective laser sintering (SLS), computer numerical control (CNC), and fused deposition modeling (FDM) if the authorization code meets the one or more predetermined conditions (e.g. verification module 630 enabling or preventing according to authorization code(s) 620 stereolithography (SLA), selective laser sintering (SLS), computer numerical control (CNC), and fused deposition modeling (FDM) in manufacturing production embodiments 688-699).

Also disposed within block 730 is optional block 7303, which provides for enabling or preventing three-dimensional manufacturing using one or more of metal, wood, ice, stone, glass, polymer, composite, laminate, semiconductors, printed circuit boards, integrated circuits, nuclear materials, pharmaceuticals, neutraceuticals, edible substances, sand, ceramic materials, aluminum, silicon, carbides, silicon nitrides, silicon carbides, metal/ceramic combinations including aluminum/silicon nitride, aluminum/silicon carbide, aluminum/zirconia and aluminum/aluminum nitride including materials alterable by chemical processing, mixing, combustion, friction, heating and cooling if the authorization code meets the one or more predetermined conditions (e.g., verification module 631 enabling or preventing three-dimensional manufacturing and the like if authorization code(s) 620 meet predetermined conditions).

Also disposed within block 730 is optional block 7304, which provides for enabling or preventing two-dimensional manufacturing using one or more of skin, textiles, edible substances, paper, silicon printing if the authorization code meets the one or more predetermined conditions (e.g., verification module 631 enabling or preventing two-dimensional manufacturing and the like according to predetermined conditions met or not met by authorization code(s) 620).

Also disposed within block 730 is optional block 7305, which provides for enabling or preventing subtractive manufacturing, including enabling or preventing drilling, milling, grinding, machining, polishing, patterning, etching, turning, laser cutting, waterjet cutting, plasma cutting, wire electrical discharge cutting, cold forging, warm forging, and hot forging metal fabrication, if the authorization code meets the one or more predetermined conditions (e.g., verification module 630 enabling or preventing subtractive and/or additive type manufacturing in production embodiments 688-699).

Block 730 continues in FIG. 7C illustrating optional block 7306 within block 730, which provides for enabling or preventing one or more of the following types of manufacturing in accordance with the authorization code: computer numerical controlled fabrication, micro-fabrication, injection molding, additive manufacturing, robotic production, packaging, engraving, casting, plating, coating, glazing, laminating, and bonding (e.g., verification module 630 enabling or preventing manufacturing production embodiments 688-699 in accordance with authorization code(s) 620).

Block 730 further includes optional block 7307, which provides for enabling or preventing functioning of a physical aspect of an operational component if the authorization code meets the one or more predetermined conditions (e.g., verification module 631 enabling or preventing functions of an aspect of an operational component 611 if authorization code(s) 620 meet predetermined conditions).

Block 730 further includes optional block 7308, which provides for enabling or preventing a read function if the authorization code is accepted by a control system operably coupled to the operational component (e.g., verification module 631 enabling or preventing a read function to enable reading object data file(s) 640 if authorization code(s) 620 are approved by external control system 675 coupled to operational component 611).

Block 730 further includes optional block 7309 which provides for enabling or preventing a physical aspect of the operational component to function if the authorization code matches a stored list of codes accessible by a control system operably coupled to the operational component (e.g., verification module 631 enabling or preventing a physical aspect of operational component 611 to function if authorization code(s) 620 matches a one or more codes in a stored list of codes 625 accessible by external control system 675 or security control system 601 coupled to operational component 611).

Further disposed within block 730 is optional block 7310 which provides for enabling or preventing the object data file to become readable by the operational component if the authorization code passes a compare function associated with a machine identifier (e.g., verification module 631 enabling or preventing readability of object data file(s) 640 by operational component 611 if authorization code(s) 620 passes a comparison function via comparator 684a with a machine identifier).

Further disposed within block 730 is optional block 7311, which provides for enabling or disabling an operational function dependent on one or more of the following predetermined conditions: benchmark comparison, temporal milestone, time period restriction, production quantity limitation, production machine qualification, operator qualification, event occurrence, and quality certification (e.g., enabling or disabling production embodiments such as 688-699 in accordance with predetermined conditions such as licensing restrictions 672 or permission agreement 674).

Further disposed within block 730 is optional block 7312, which provides for enabling or disabling one or more of the following types of operational components: chemical process apparatus, product packaging, injection molding unit, subtraction machine, additive manufacture unit, two-dimensional production technique, three-dimensional production technique, stamping machine, extrusion machine, melting machine, die-casting machine, solidifying machine, manufacturing system, rapid prototyping device, and robotic production line (e.g., enabling or disabling operational components and processes 611).

Referring now to FIG. 7D, the method continues with block 740, which provides for receiving the object data file at a buffer for the operational component (e.g., transceiver 670 receiving object data file(s) 640 at buffer 660 for operational component 611). Block 750 provides for sending an acknowledgment that the object data file was received by the operational component to a source of the object data file (e.g., transceiver 670 sending an acknowledgement that object data file(s) 640 was received by operational component 611 to a source of object data file(s) 640).

Block 760 provides for processing the object data file in the buffer to verify a request to instantiate the object data file (e.g., verification module 630 processing object data file(s) 640 in buffer 660 to verify a request to instantiate object data file(s) 640).

Block 770 provides for receiving the authorization code at a buffer, the buffer configured to notify an application if the object data file is loaded in the buffer, the object data file including one or more of a production model file and/or a computer-aided design (CAD) solid model file and/or a computer-aided manufacturing (CAM) file (e.g., buffer 660 receiving authorization code(s) 620, buffer 660 then notifying an application 679 that object data file(s) 640 is loaded). Disposed within block 770 is optional block 7702, which provides for extracting the authorization code from the object data file in the buffer, the authorization code required to enable the operational component to acknowledge the object data file as a valid file (e.g., buffer 660 extracting authorization code(s) 620 to enable operational component 611 to acknowledge object data file(s) 640 as a valid file).

Figure 8:
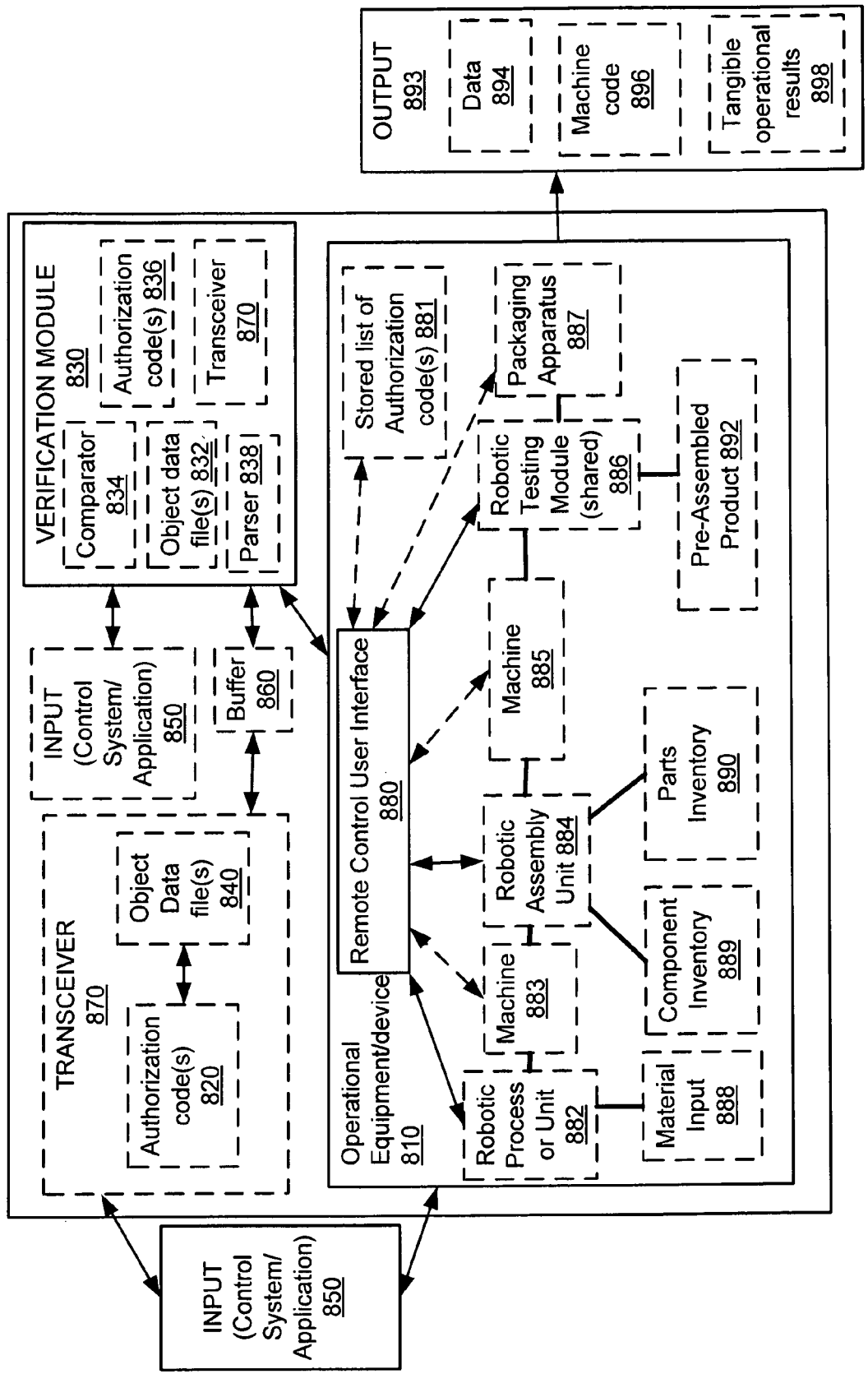
FIG. 8 is a block diagram of an exemplary system that supports the claimed subject matter of the present application.

Referring now to the schematic depiction of FIG. 8, illustrated is an exemplary block diagram for an embodiment of a robotic system 800 for controlling robotic operational tasks and/or robotic processes and/or robotic-related manufacturing rights. As shown, robotic system 800 further includes transceiver 870 that can be coupled to input 850 or optionally disposed within a verification module 830.

FIG. 8 also illustrates that transceiver 870 can be configured to send and receive one or more object data files 840 and/or authorization codes 820. Input 850 can be disposed within robotic system 800 or as an outside source 850. FIG. 8 further illustrates a buffer 860 that interacts with verification module 830 and transceiver 870.

Verification module 830 is illustrated including object data file(s) 840, which can also be disposed within transceiver 870. Verification module 830 further can include comparator 834, authorization codes 836, parser 838 and an optional transceiver 839. In an embodiment, verification module 830 operates by comparing received codes to authorization codes 820 and/or 836 and sending and/or receiving confirmation via transceiver 870.

Input control system/application 850 is optionally configured to robotic system 800 via both transceiver 870 and an operational device 810. Operational device 810 can be configured as equipment or other robotic device that interacts with components. In one embodiment, operational equipment/device 810 includes a remote control user interface 880 that can allow user control of various components included in operational equipment 810. Operational equipment 810 further includes robotic process or unit 882, which is shown coupled to material input 888. Operational equipment 810 also includes machine 883, which can be coupled to robotic process or unit 882. Machine 883 can be coupled to robotic assembly unit 884, which is shown optionally coupled to component inventory 889 and/or parts inventory 890. Robotic assembly is further shown coupled to machine 885, which is shown coupled to robotic testing module 886, which can be a shared module. In one embodiment, robotic testing module 886 is coupled to pre-assembled product 892. Robotic testing module 886 is optionally further coupled to packaging apparatus 887.

In one embodiment, remote control user interface 880 is coupled to robotic components, such as robotic process/unit 882, and/or robotic assembly unit 884 and/or robotic testing module 886. Further, remote control user interface is optionally coupled to interact with a stored list of authorization codes 881 to confirm secure permissions or the like prior to operational tasks being performed.

Robotic system 800 is further shown coupled to output 893. Output 893 optionally includes data 894, and/or machine code 896 and/or tangible operational results 898.

Figure 12:
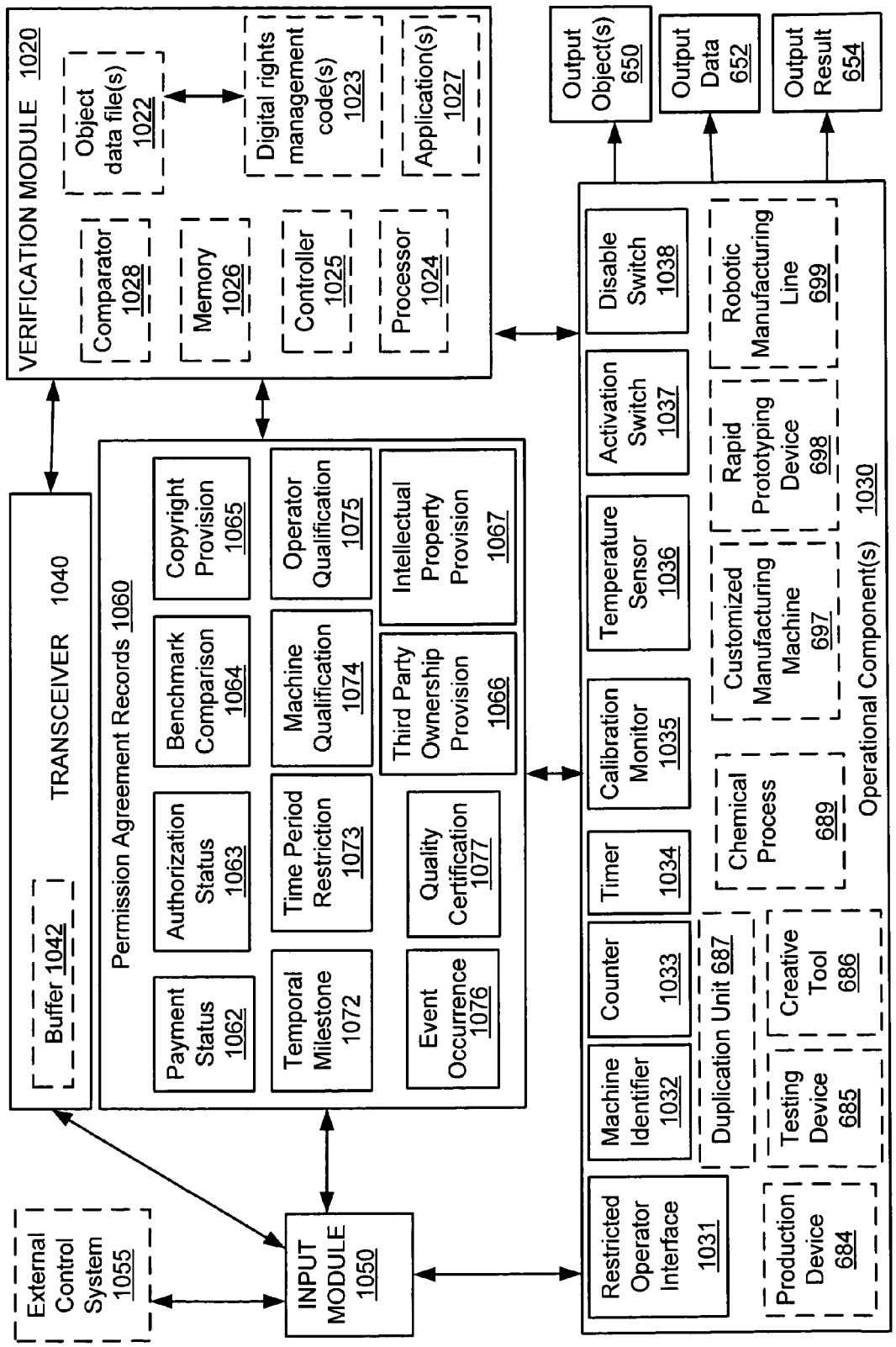
FIG. 12 is a block diagram of further exemplary system features that support the claimed subject matter of the present application.

FIG. 8 illustrates machines 883 and 885 which can be configured to be various types of operational machines such as those illustrated in, for example, FIGS. 6A-6B and FIG. 12. It will be understood that a robotic system 800 may be configured to provide operational control individually or collectively to components 882, 884, 886, and to machines 883, 885, as well as to other exemplary operational components 887, 888, 889, 890, 892. Such operational control may be implemented directly or indirectly by operative coupling with verification module 830 or perhaps implemented by an external control module via input 850. Accordingly the direct operational control illustrated in FIG. 8 with respect to robotic process/unit 882, robotic assembly unit 884, and robotic testing module 886 is shown for purposes of illustration only and is not intended to be limiting.

Specifically, in some embodiments machines 883 and 885 can be configured to be subtraction machine 691, stamping machine 692, extrusion machine 693, melting machine 694, die-casting machine 695, solidifying machine 696, or generic manufacturing machine 697. As discussed with relation to FIGS. 6A-6B and FIG. 12, manufacturing machines 691-697 can be three-dimensional additive manufacturing machines configured for rapid prototyping, three-dimensional printing, two-dimensional printing, freeform fabrication, solid freeform fabrication, and stereolithography. Subtractive manufacturing machine 691, can be adapted for drilling, milling, turning, laser cutting, waterjet cutting, plasma cutting, wire electrical discharge cutting, cold, warm and hot forging metal fabrication, computer numerical controlled fabrication machine, and/or an additive manufacturing machine, and/or an injection molding machine.

In other embodiments machines 883 and 885 can be configured to perform manufacturing using one or more of metal, wood, ice, stone, glass, nuclear materials, pharmaceuticals, edible substances, sand, ceramic materials, aluminum, silicon, carbides, silicon nitrides, silicon carbides, metal/ceramic combinations including aluminum/silicon nitride, aluminum/silicon carbide, aluminum/zirconia, aluminum/aluminum nitride including materials alterable by friction, heating and cooling.

In another embodiment, machines 883 and/or 885 can include a manufacturing machine configured as two-dimensional manufacturing machines configured to perform manufacturing of one or more of skin, textiles, edible substances, paper and/or silicon printing.

Of course, other types of robotic machines, robotic processes, and robotic devices may be configured to be incorporated as part of a security-controlled operation as disclosed herein, and the specific examples given are only provided for purposes of illustration.

Referring now to FIGS. 9A, 9B, 9C and 9D, a flow diagram illustrates a method in accordance with an embodiment. Block 910 provides for receiving an authorization associated with a directive to perform robotic operational tasks regarding one or more objects (e.g., transceiver 870 receiving an authorization and/or authorization code(s) associated with a directive). Disposed within block 910 is optional block 9102 which provides for receiving the authorization via an application configured to identify a user associated with the directive to perform robotic operational tasks (e.g., transceiver 870 receiving an authorization via an application such as via input 850, which can be configured to identify a user associated with a directive).

Disposed within optional block 9102 is optional block 91022 which provides for receiving the authorization via the application, the application applying a user credential to provide the authorization (e.g., transceiver 870 receiving an authorization and/or authorization code(s) associated with a directive via an application such as via input 850 applying a user credential, such as authorization codes 820 or stored list of authorization codes 881 to provide an authorization).

Further disposed within optional block 9102 is optional block 91024 which provides for receiving the authorization from a security device in communication with the robotic operational system, the security device providing one or more permissions to operate the robotic operational system (e.g., transceiver 870 receiving an authorization and/or authorization code(s) associated with a directive via a security device such as a device 810 or a device coupled to transceiver 870 and/or input 850 and/or a security device incorporating a verification module 830 wherein the security device provides one or more permissions, such as authorization codes 830/820/881 to operate robotic system 800).

Further disposed within optional block 9102 is optional block 91026 which provides for receiving the authorization from a security device in communication with the robotic operational system, the security device providing one or more permissions to operate the robotic operational system (e.g., transceiver 870 receiving an authorization and/or authorization code(s) associated with a directive via a security device such as a device 810 or a device coupled to transceiver 870 and/or input 850 and/or a security device incorporating a verification module 830 or the like in communication with the robotic system 800).

Disposed within block 91026 is optional block 910262 which provides for receiving the authorization from the security device configured as a dongle attached to the robotic operational system, the dongle providing one or more permissions to operate the robotic operational system (e.g., transceiver 870 receiving an authorization and/or authorization code(s) associated with a directive via a security device configured as a dongle, the dongle could incorporate a verification module 830 wherein the security device provides one or more permissions, such as authorization codes 830/836/881 to operate robotic system 800).

Further disposed within block 91026 is optional block 910264 which provides for receiving the authorization from the security device configured as a wireless communication device associated with the robotic operational system, the wireless communication device providing one or more permissions to operate the robotic operational system (e.g., transceiver 870 receiving an authorization and/or authorization code(s) associated with a directive via a security device such as a device 810 and remote control user interface 880 coupled to transceiver 870 wherein the security device provides one or more permissions, such as authorization codes 830/836/881 to operate robotic system 800).

Figure 9A:
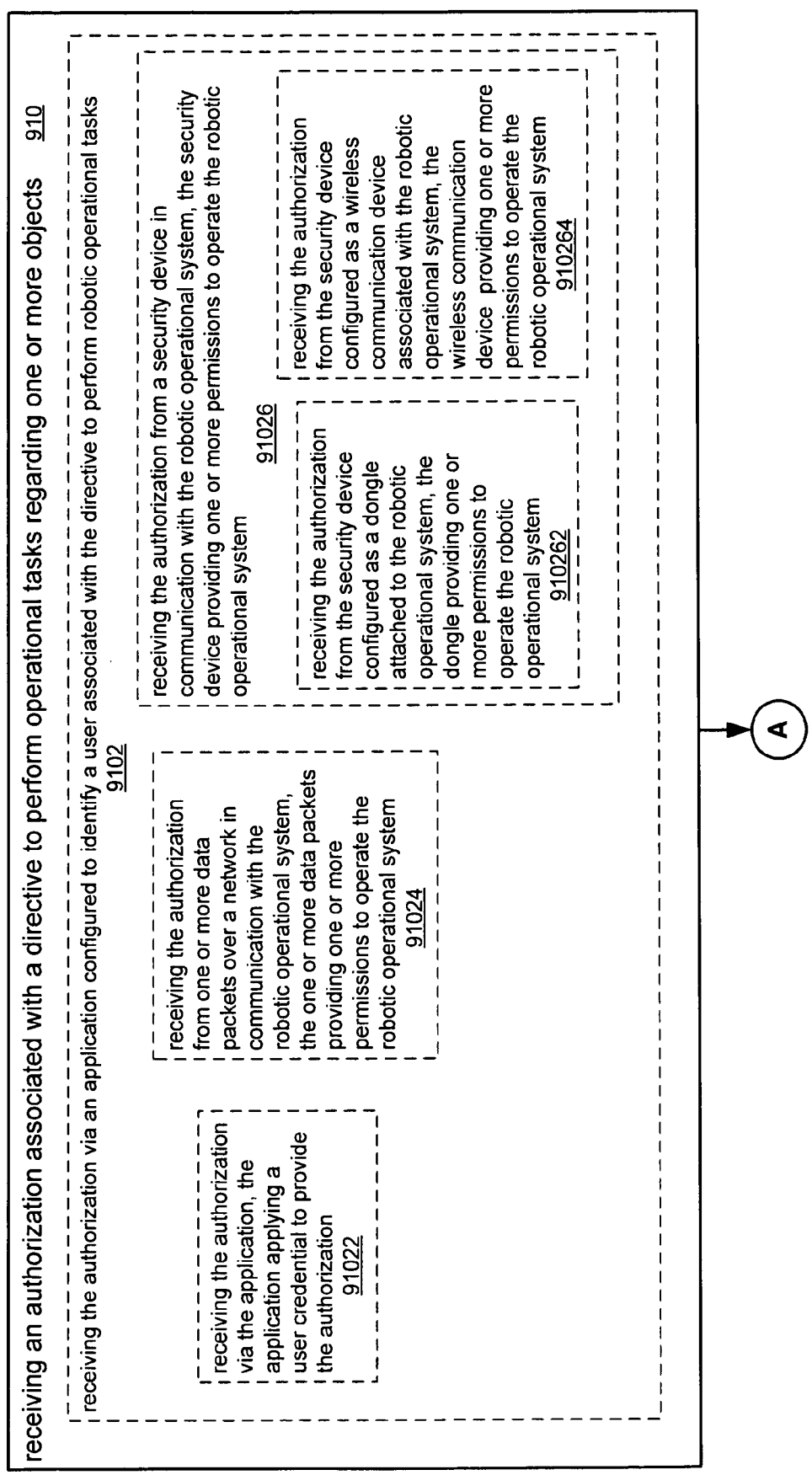
Figure 9B:
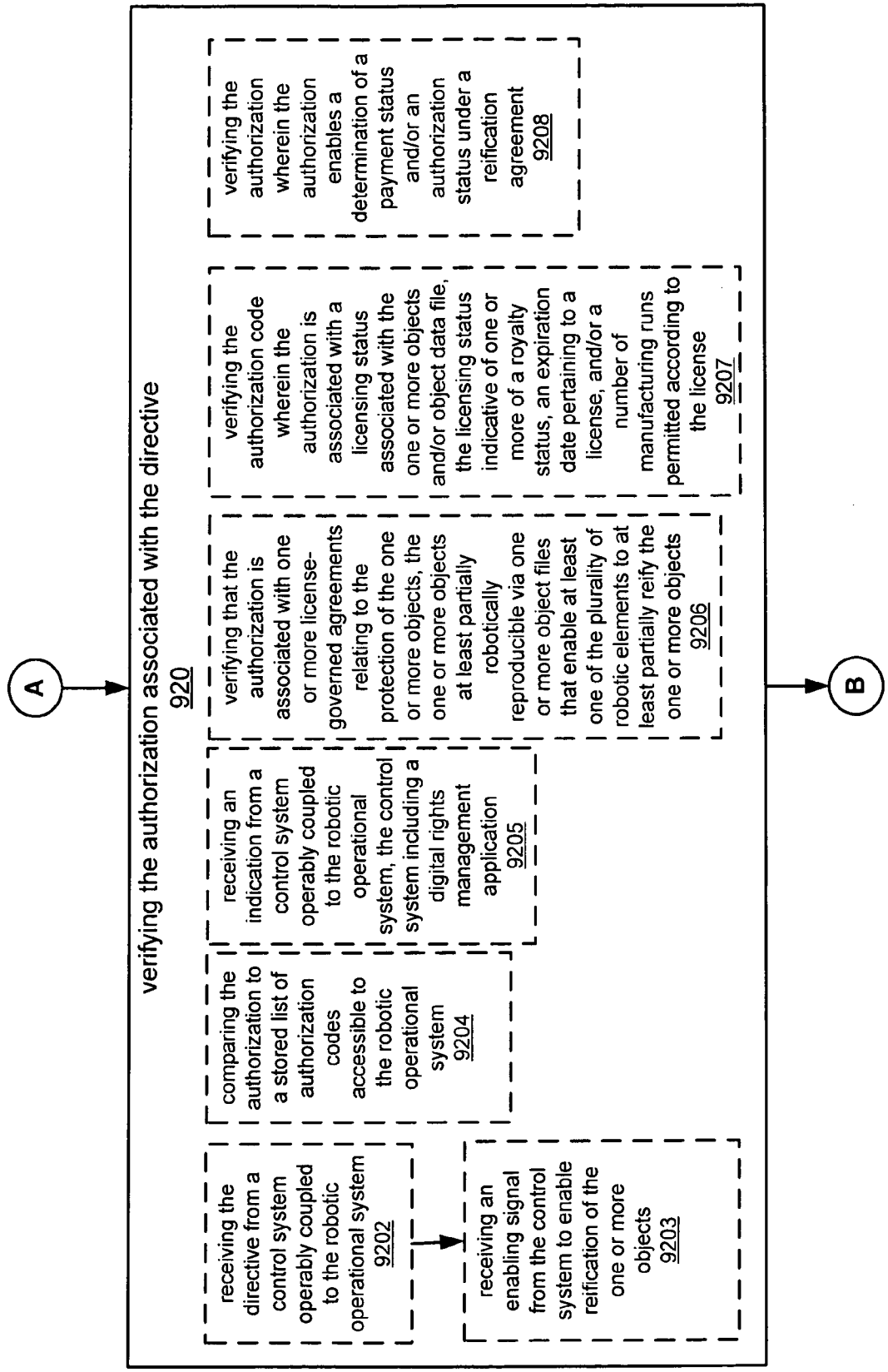

Referring to the exemplary embodiment features of FIG. 9B, block 910 is coupled to block 920 which provides for verifying the authorization associated with the directive (e.g., verification module 830 verifying one or more authorization codes 836 that are associated with a directive received via input 850 and/or transceiver 870).

Disposed within block 920 is optional block 9202 which provides for receiving the directive from a control system operably coupled to the robotic operational system (e.g., transceiver 870 receiving a directive via a control system input 850 coupled to robotic system 800).

Further disposed within block 920 is optional block 9203 which provides for receiving an enabling signal from the control system to enable reification of the one or more objects (e.g., transceiver 870 receiving an enabling signal from control system 850 to enable reification of objects within operational equipment/device 810).

Also disposed within block 920 is optional block 9204 which provides for comparing the authorization to a stored list of authorization codes accessible to the robotic operational system (e.g., comparator 834 comparing authorization codes 836 and/or stored list of authorization codes 881 that are accessible to robotic system 800).

Also disposed within block 920 is optional block 9205 which provides for receiving an indication from a control system operably coupled to the robotic operational system, the control system including a digital rights management application (e.g., verification module 830 and/or transceiver 870 receiving an indication from a control system 850 coupled to robotic operation system 800, wherein control system 850 includes an application that is a digital rights management application).

Block 920 further includes optional block 9206 which provides for verifying that the authorization is associated with one or more license-governed agreements relating to the protection of the one or more objects, the one or more objects at least partially robotically reproducible via one or more object files that enable at least one of the plurality of robotic elements to at least partially reify the one or more objects (e.g., verification module 830 verifying an authorization received from input 850 and/or transceiver 870 that are associated with license-governed agreements that relate to protection of one or more robotically reproducible objects via machines 883 and/or 885 or the like via one or more object files to enable robotic elements via robotic process 882, assembly unit 884 and/or robotic testing module 886).

Block 920 further includes optional block 9207 which provides for verifying the authorization code wherein the authorization is associated with a licensing status associated with the one or more objects and/or object data file, the licensing status indicative of one or more of a royalty status, an expiration date pertaining to a license, and/or a number of manufacturing runs permitted according to the license (e.g., verification module 830 verifying authorization codes 836 wherein the authorization codes 836 are associated with a licensing status of objects and/or object data files 840, the licensing status providing an indication of royalty status, expiration data of a license and/or a number of manufacturing runs permitted by the license).

Further included in block 920 is optional block 9208 which provides for verifying the authorization wherein the authorization enables a determination of a payment status and/or an authorization status under a reification agreement (e.g., verification module 830 verifying authorization and/or authorization code(s) 836/820 to enable a determination of a payment status of a user or authorization status under an agreement, such as a reification agreement). In one embodiment agreements can be received via transceiver 870 and stored for access via buffer 860 to be available to verification module 830.

Referring to exemplary embodiment features shown in FIG. 9C, block 920 is coupled to block 930 which provides for controlling operation of the robotic operational system via controlling a plurality of robotic elements, each robotic element of the plurality of robotic elements individually and/or in combination performing one or more functions in accordance with the authorization (e.g., operational equipment/device 810 and/or input control system 850 controlling operation of robotic system 800 via controlling robotic elements robotic process or unit 882, robotic assembly unit 884, and/or robotic testing module 886).

Block 930 includes optional block 9302, which provides for enabling or preventing robotic assembly by one or more of the robotic elements wherein one or more of the robotic elements controls reification using one or more of a metal, ABS (Acrylonitrile/butadiene/styrene), ABSi (ABS with high impact strength), ABS M-30 (Acrylonitrile/butadiene/styrene), PC (Polycarbonate), PC-ISO (Polycarbonate-ISO), PC/ABS (Polycarbonate/ABS Blend), PPSF (Polyphenylsulfone), clear and/or colored resin (e.g., control system 850 and/or remote control user interface 880 enabling robotic assembly unit 884).

Further disposed within block 930 is optional block 9303, which provides for enabling or preventing one or more of the robotic elements wherein one or more of the robotic elements controls reification using one or more of at least partially robotic rapid prototyping, at least partially robotic three-dimensional printing, at least partially robotic two-dimensional printing, at least partially robotic freeform fabrication, at least partially robotic solid freeform fabrication, and at least partially robotic stereolithography (e.g., e.g., control system 850 and/or remote control user interface 880 enabling robotic assembly unit 884 and/or robotic process or unit 882).

Further disposed within block 930 is optional block 9304 which provides for enabling or preventing one or more of the robotic elements wherein one or more of the robotic elements controls reification using one or more of one or more of stereolithography (SLA), selective laser sintering (SLS), computer numerical control (CNC), and fused deposition modeling (FDM) if the authorization code meets one or more predetermined conditions (e.g., control system 850 and/or remote control user interface 880 enabling robotic assembly unit 884 and/or robotic process or unit 882 to control reification if authorization codes 820/836 or stored list of authorization codes 881 meet one or more predetermined conditions). In one embodiment, the predetermined conditions can include conditions associated with a license agreement or the like.

Also disposed within block 930 is optional block 9305 which provides for enabling or preventing one or more of the robotic elements wherein one or more of the robotic elements controls reification using one or more of at least partially robotic three-dimensional manufacturing using one or more of metal, wood, ice, stone, glass, nuclear materials, pharmaceuticals, edible substances, sand, ceramic materials, aluminum, silicon, carbides, silicon nitrides, silicon carbides, metal/ceramic combinations including aluminum/silicon nitride, aluminum/silicon carbide, aluminum/zirconia and aluminum/aluminum nitride including materials alterable by friction, heating and cooling if the authorization code meets one or more predetermined conditions (e.g., control system 850 and/or remote control user interface 880 enabling or preventing robotic assembly unit 884 and/or robotic process or unit 882 using robotic three-dimensional manufacturing techniques according authorization codes 820, 836 and stored list 881).

Also disposed within block 930 is optional block 9306 which provides for enabling or preventing one or more of the robotic elements wherein one or more of the robotic elements controls reification using one or more of at least partially robotic two-dimensional manufacturing using one or more of skin, textiles, edible substances, paper, silicon printing if the authorization code meets one or more predetermined conditions (e.g., control system 850 and/or remote control user interface 880 enabling robotic assembly unit 884 and/or robotic process or unit 882 and/or robotic testing module 886 using at least partially robotic two-dimensional manufacturing if authorization codes 820, 836 and/or stored list 881 meet one or more predetermined conditions).

Further disposed within block 930 is optional block 9307 which provides for enabling or preventing one or more of the robotic elements wherein one or more of the robotic elements controls reification using one or more of at least partially robotic subtractive manufacturing, including enabling or preventing drilling, milling, turning, laser cutting, waterjet cutting, plasma cutting, wire electrical discharge cutting, cold, warm and hot forging metal fabrication, computer numerical controlled fabrication machine, and/or an additive manufacturing and/or an injection molding if the authorization code meets one or more predetermined conditions (e.g., control system 850 and/or remote control user interface 880 enabling robotic assembly unit 884 and/or robotic process or unit 882 and/or robotic testing module 886 to control reification using at least partially robotic subtractive manufacturing if authorization codes 820, 836 and/or stored list 881 meets predetermined conditions).

Figure 9D:
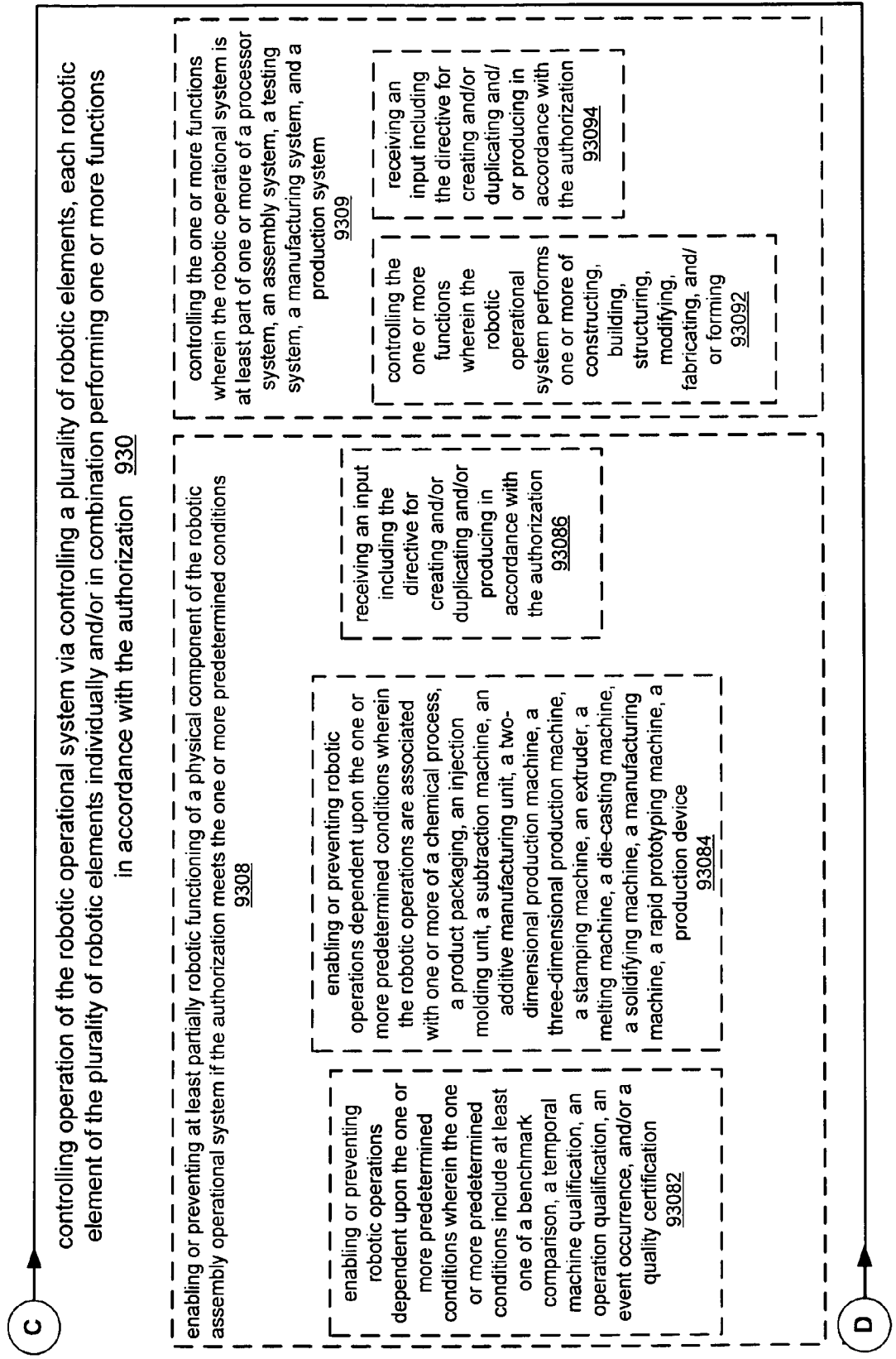

Referring to the exemplary embodiment features of FIG. 9D, further disposed within block 930 is optional block 9308 which provides for enabling or preventing at least partially robotic functioning of a physical component of the robotic operational system if the authorization meets one or more predetermined conditions (e.g., control system 850 and/or remote control user interface 880 enabling robotic assembly unit 884 and/or robotic process or unit 882 and/or robotic testing module 886 via a physical component of robotic system 800 of authorization codes 820, 836 and/or stored list 881 meet one or more predetermined conditions).

Disposed within optional block 9308 is optional block 93082 which provides for enabling or preventing robotic operations dependent upon the one or more predetermined conditions wherein the one or more predetermined conditions include at least one of a benchmark comparison, a temporal machine qualification, an operation qualification, an event occurrence, and/or a quality certification (e.g., control system 850 and/or remote control user interface 880 enabling robotic assembly unit 884 and/or robotic process or unit 882 and/or robotic testing module 886 according to predetermined conditions such as a benchmark comparison, a temporal machine qualification, an operation qualification, an event occurrence, and/or a quality certification provided via, for example, authorization codes 820, 836 and/or stored list 881).

Also disposed within optional block 9308 is optional block 93084, which provides for enabling or preventing robotic operations dependent upon the one or more predetermined conditions wherein the robotic operations are associated with one or more of a chemical process, a product packaging, an injection molding unit, a subtraction machine, an additive manufacturing unit, a two-dimensional production machine, a three-dimensional production machine, a stamping machine, an extruder, a melting machine, a die-casting machine, a solidifying machine, a manufacturing machine, a rapid prototyping machine, a production device (e.g., control system 850 and/or remote control user interface 880 enabling robotic assembly unit 884 and/or robotic process or unit 882 and/or robotic testing module 886 according to predetermined conditions wherein robotic process 882 or assembly unit 884 can include a chemical process, a product packaging, an injection molding unit, a subtraction machine, an additive manufacturing unit, a two-dimensional production machine, a three-dimensional production machine, a stamping machine, an extruder, a melting machine, a die-casting machine, a solidifying machine, a manufacturing machine, a rapid prototyping machine, or a production device such as those illustrated in FIGS. 6A-6B).

Further depicted in optional block 9308 is optional block 93086 which provides for receiving an input including the directive for creating and/or duplicating and/or producing in accordance with the authorization (e.g., control system 850 and/or remote control user interface 880 enabling robotic assembly unit 884 and/or robotic process or unit 882 and/or robotic testing module 886 via receiving an input via input 850 including a directive for creating, duplicating or producing according to authorization codes 820, 836 or stored list 881).

Referring back to block 930 as shown in FIG. 9D, further illustrated is optional block 9309 within block 930 which provides for controlling the one or more functions wherein the robotic operational system is at least part of one or more of a processor system, an assembly system, a testing system, a manufacturing system, and a production system (e.g., control system 850 and/or remote control user interface 880 controlling robotic system 800 wherein robotic system 800 is at least part of a processor system, assembly system, test system, manufacturing system and/or production system such as robotic process or unit 882, robotic assembly unit 884, robotic testing module 886 or machines 883 and/or 885 or the like).

Further depicted within block 9309 is optional block 93092 which provides for controlling the one or more functions wherein the robotic operational system performs one or more of constructing, building, structuring, modifying, fabricating, and/or forming. Additionally depicted within block 9309 is optional block 93094 which provides for receiving an input including the directive for creating and/or duplicating and/or producing in accordance with applicable authorization. (e.g., See control system 850 and/or remote control user interface 880 controlling the operational equipment/devices 810 pursuant to operational coupling with verification module 830.)

Figure 10:
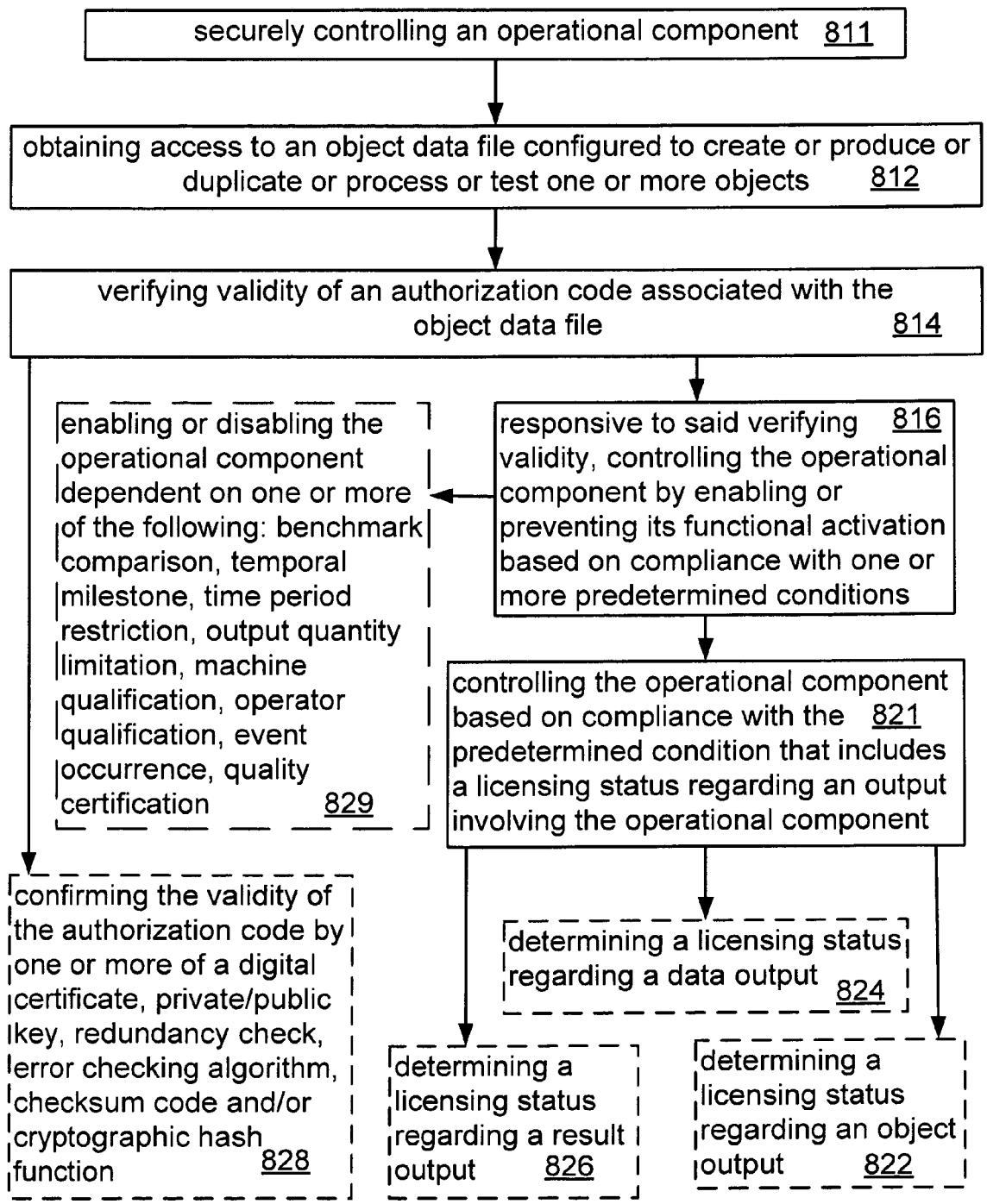
FIGS. 10-11 illustrate flow diagrams of other exemplary method features in accordance with additional embodiments of the subject matter of the present application.

Referring now to FIG. 10, a flow diagram illustrates a method in accordance with various embodiments for securely controlling an operational component (block 811). Another possible feature shown in block 812 includes obtaining access to an object data file configured to create or produce or duplicate or process or test one or more objects (e.g., an operational component 611 accessing an object data file 640). Further method features may include verifying validity of an authorization code associated with the object data file as shown in block 814 (e.g., verification module 631 confirming validity of authorization code 620 associated with an object data file 640); and responsive to said verifying validity, controlling the operational component by enabling or preventing its functional activation based on compliance with one or more predetermined conditions as shown in block 816 (e.g., verification module 631 accessing pre-conditions of licensing restriction 672 and/or permission agreement 674 before allowing activation of operational component 611).

A further method feature shown in block 828 may include confirming the validity of the authorization code by one or more of a digital certificate, private/public key, redundancy check, error checking algorithm, checksum code and/or cryptographic hash function (e.g., verification module 630 obtaining authorization code 620 with associated security features)

Yet another exemplary feature shown in block 821 may provide controlling the operational component based on compliance with the predetermined condition that includes a licensing status regarding an output involving the operational component. Related aspects are shown in optional block 822 which provides for determining a licensing status regarding an object output, and in block 824 which provides for determining a licensing status regarding a data output, and in block 826 which provides for determining a licensing status regarding a result output. An additional exemplary feature shown in block 829 provides for enabling or disabling the operational component dependent on one or more of the following predetermined conditions: benchmark comparison, temporal milestone, time period restriction, output quantity limitation, machine qualification, operator qualification, event occurrence, and quality certification. (e.g., verification module 631 confirming applicable preconditions 672, 674 associated with a machine identifier for operational component 611).

Figure 11:
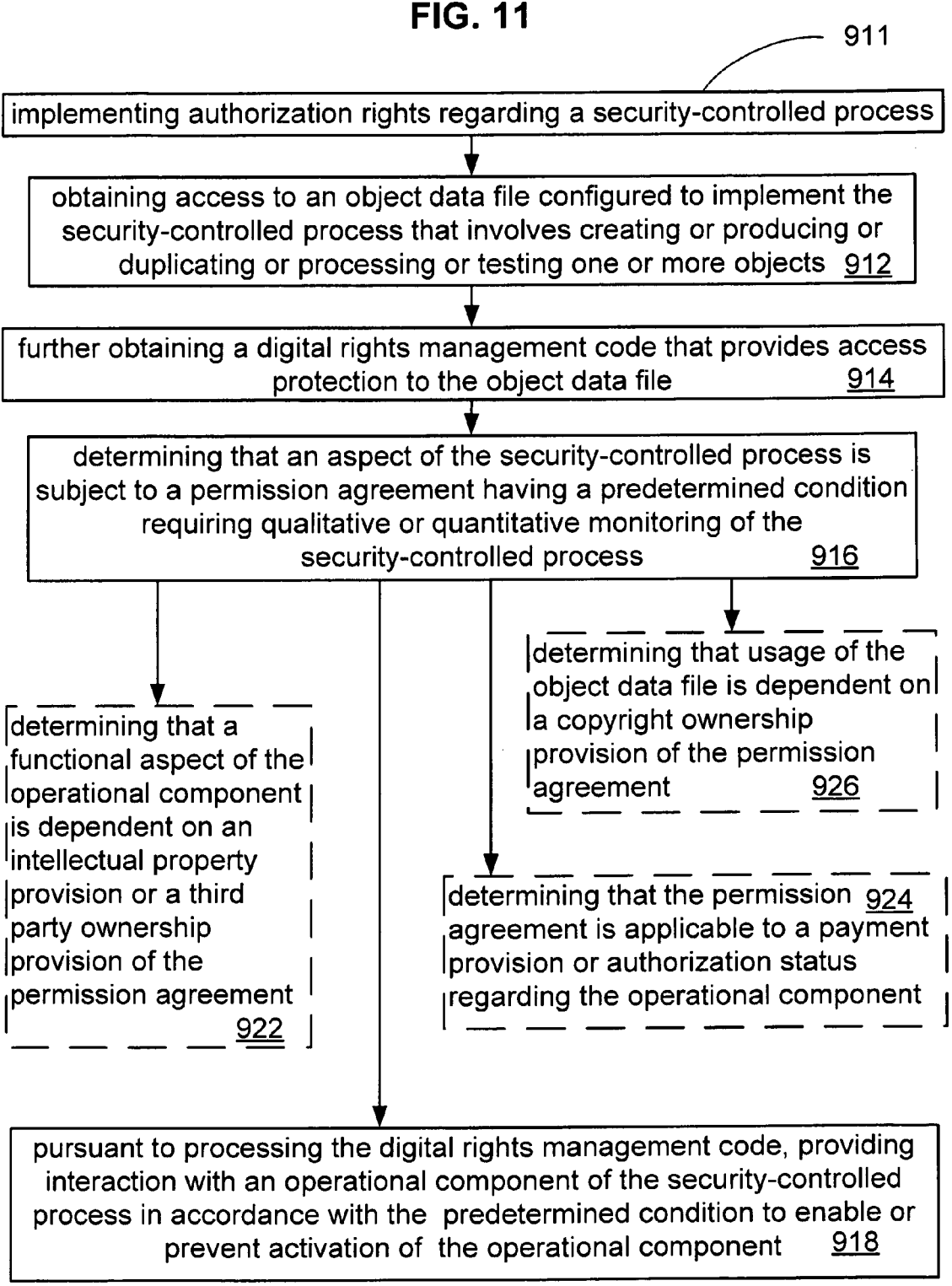

Referring now to FIG. 11, a flow diagram illustrates a method in accordance with various embodiments for implementing authorization rights regarding a security-controlled process (block 911). Another possible feature shown in block 912 may include obtaining access to an object data file configured to implement the security-controlled process that involves creating or producing or duplicating or processing or testing one or more objects. A further possible feature shown in block 914 may include further obtaining a digital rights management code that provides access protection to the object data file. An additional exemplary feature shown in block 916 may include determining that an aspect of the security-controlled process is subject to a permission agreement having a predetermined condition requiring qualitative or quantitative monitoring of the security-controlled process. In some instances an exemplary method feature shown in block 918 may include, pursuant to processing the digital rights management code, providing interaction with an operational component of the security-controlled process in accordance with the predetermined condition to enable or prevent activation of the operational component. (e.g., see verification module 1020 processing an object data file 1022 in conjunction with digital rights management codes 1023 to control an operational component 1030 based on a pre-condition provision of permission agreement records 1060.)

Additional optional method features illustrated in FIG. 11 that are shown in block 922 may include determining that a functional aspect of the operational component is dependent on an intellectual property provision or a third party ownership provision of the permission agreement (e.g., see verification module 1020 processing permission agreement records 1060 that include particular records 1066, 1067). Some exemplary method embodiments may provide further features shown in block 924 including determining that the permission agreement is applicable to a payment provision or an authorization status regarding the operational component. In some instances a further exemplary feature shown in block 926 may include determining that usage of the object data file is dependent on a copyright ownership provision of the permission agreement. (e.g., see verification module 1020 processing permission agreement records 1060 that includes particular records 1062, 1063, 1065.)

Referring now to FIG. 12, an exemplary embodiment of a security control system 1010 is illustrated. More particularly, FIG. 12 illustrates a verification module 1020 operatively coupled for interaction with one or more operational components 1030 in accordance with the predetermined conditions that are accessible from permission agreement records 1060. An exemplary illustrated embodiment for the verification module 1020 may include one or more accessible object data files 1022 that are protected and controlled by digital rights management codes 1023. Additional functional computerized processing elements may include processor 1024, controller 1025, memory 1026, one or more computer executable program applications 1027, and comparator module 1028.

In some embodiments the verification module 1020 may send and/or receive communications via transceiver 1040 and via input module 1050 that may have interconnection links with an external control system 1055 and with operational components 1030. In some instances some designated security control data may be temporarily stored and/or processed by a buffer 1042 associated with the transceiver 1040.

It will be understood that various types of security control information regarding predetermined conditions applicable to the operational components 1030 can be maintained in the permission agreement records 1060, including but not limited to exemplary topics such as payment status 1062, authorization status 1063, benchmark comparison 1064, copyright provision 1065, third party ownership provision 2066, and intellectual property provision 1067. Additional types of precondition records applicable to an operation component 1030 may include a temporal milestone 1072, time period restriction 1073, machine qualification 1074, operator qualification 1075, event occurrence 1076, and quality certification 1077. Of course, some records may not be pertinent for a specific security-controlled process involving an operational component 1030, and additional types of records may be desirable for some embodiments, depending on the circumstances.

As further illustrated in the exemplary embodiment features of FIG. 12, the various operational components 1030 may be used to provide output objects 650, and/or output data 652, and/or an output result 654 that are subject to the preconditions of one or more types of applicable permission agreement records 1060. Exemplary operation components 1030 may include a production device 677, testing device 685, creative tool 683, duplication unit 687, chemical process 689, customized manufacturing machine 697a, rapid prototyping device 698, robotic manufacturing line 699a, and the like.

As further illustrated in FIG. 12, exemplary system features may provide security control over a desired operational process by monitoring and/or controlling one or more operational components 1030. Possible monitoring and/or control techniques related to quality or quantity operational parameters may include a restricted operator interface 1031, a machine identifier 1032, process/product counter 1033, timer 1034, calibration monitor 1035, and temperature sensor 1036. Additional types of monitoring and/or controlling devices may include activation switch 1037 and disable switch 1038.

It will be understood that various functional aspects of a security control system embodiment may be implemented at distributed locations as well as at a central location with respect to a particular operation component, depending on the circumstances.

Figure 13:
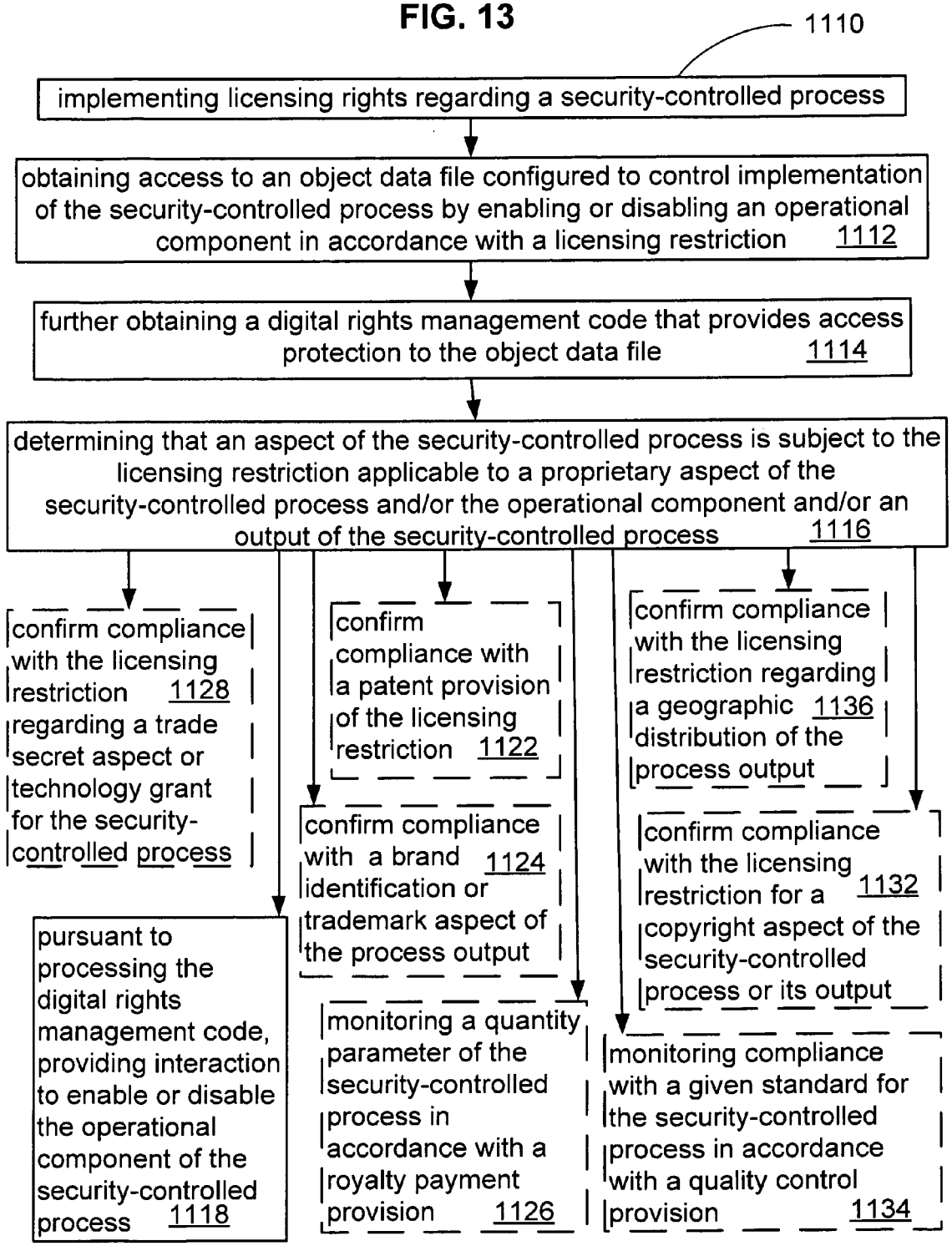
FIG. 13 illustrates an additional flow diagram of exemplary method features in accordance with a further embodiment of the present application.

Referring now to FIG. 13, a flow diagram illustrates a method in accordance with various embodiments for implementing licensing rights regarding a security-controlled process (block 1110). Another possible feature shown in block 1112 may include obtaining access to an object data file configured to control implementation of the security-controlled process by enabling or disabling an operational component in accordance with a licensing restriction. A possible feature shown in block 1114 may include further obtaining a digital rights management code that provides access protection to the object data file. (e.g., FIG. 14 illustrates verification module 1020 linked to licensing restriction records 1260 for utilizing comparator 1028 to process data received/sent via digital readout 1278 and/or via controller 1239 to/from an operational component 1230.)

Another exemplary method feature shown in block 1116 may include determining that an aspect of the security-controlled process is subject to the licensing restriction applicable to a proprietary aspect of the security-controlled process and/or the operational component and/or an output of the security-controlled process. The flow chart of FIG. 13 also illustrates a feature shown in block 1118 that includes pursuant to processing the digital rights management code, providing interaction to enable or disable the operational component of the security-controlled process. (e.g., see verification module 1020 linked to an activation switch 1037 or disable switch 1038 associated with an operational component 1230.)

Figure 14:
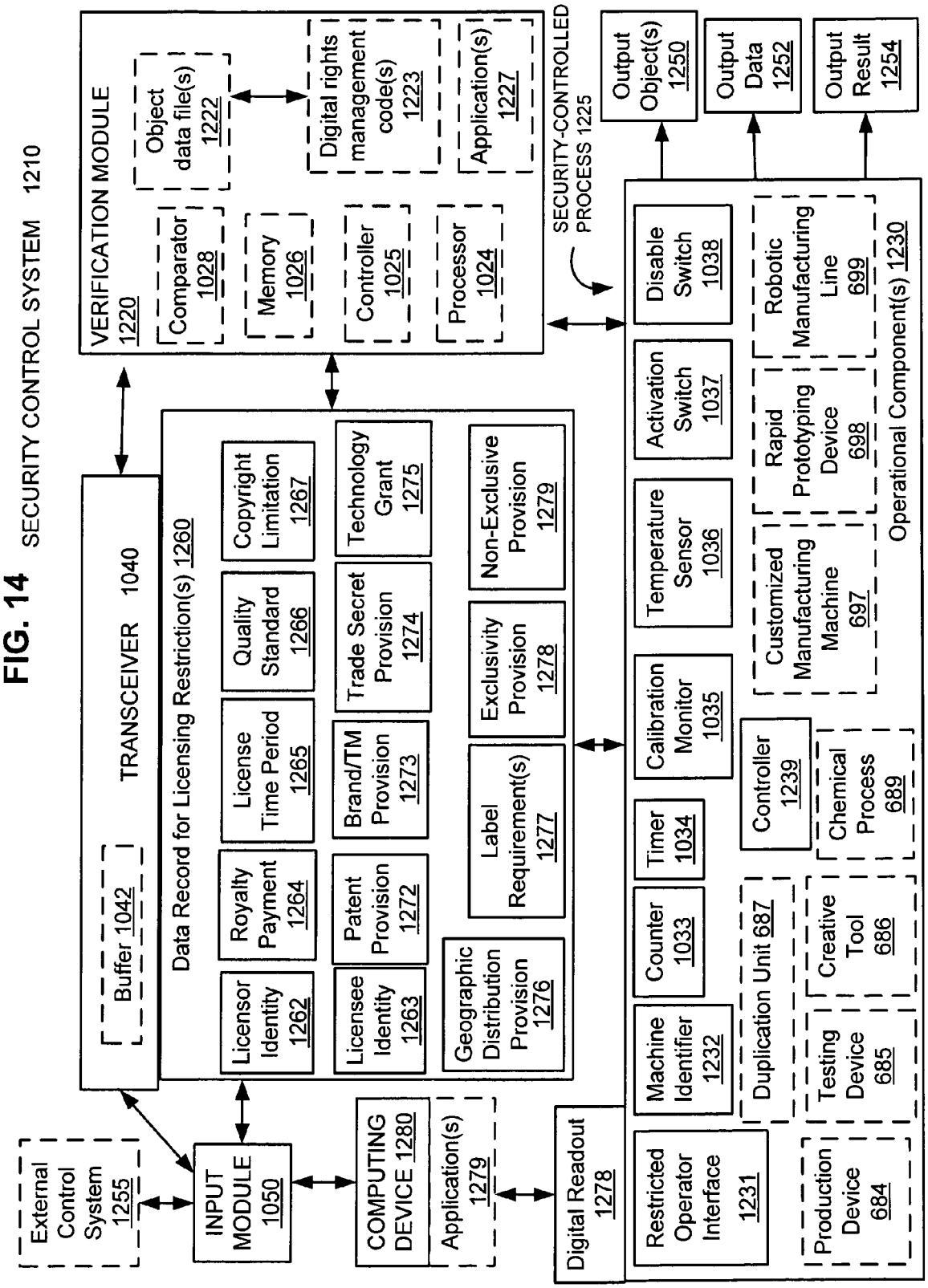
FIGS. 14-15 are block diagrams of additional exemplary system features that support the claimed subject matter of the present application.

Other optional exemplary method features may include block 1122 that provides confirming compliance with a patent provision of the licensing restriction, and in some instances may further include block 1124 that provides confirming compliance with a brand identification or trademark aspect of the process outputs (e.g., see 1250, 1252, 1254 in FIG. 14). See also the possible feature illustrated in block 1126 that includes monitoring a quantity parameter of the security-controlled process 1225 in accordance with a royalty payment provision. An additional implementation feature shown in block 1128 may provide confirming compliance with the licensing restriction regarding a trade secret aspect or technology grant for the security-controlled process 1225. (e.g., see FIG. 14 showing computing device 1280 linked with licensing restriction records 1260 and also with counter 1033, calibration monitor 1035, temperature sensor 1036 via digital readout 1278.)

Referring now to FIG. 14, an exemplary embodiment of a security control system 1210 applicable to a security-controlled process 1225 is illustrated. More particularly, FIG. 14 illustrates a verification module 1220 operatively coupled for interaction with one or more operational components 1230 in accordance with the predetermined conditions that are accessible from a data record for licensing restrictions 1260. An exemplary illustrated embodiment for the verification module 1220 may include one or more accessible object data files 1222 that are protected and controlled by digital rights management codes 1223. Additional functional computerized processing elements may include processor 1024, controller 1025, memory 1026, one or more computer executable program applications 1227, and comparator module 1028.

In some embodiments the verification module 1220 may send and/or receive communications via transceiver 1040 and via input module 1050 that may have interconnection links with an external control system 1255 and with operational components 1230. Additional communication links may provide an interconnection from input module 1050 to a computing device 1280 having one of more computer executable applications 1279 for processing monitor and/or control data provided via a digital readout 1278 associated with various operational components 1230. Depending on the type of security-controlled process involved, additional monitoring and/or control data may also be communicated via digital readout 1278 and/or via controller 1239 to/from other devices associated with the security-controlled process (e.g., see 1231, 1232, 1033-1038). In some instances some designated security control data may be temporarily stored and/or processed by a buffer 1042 associated with the transceiver 1040.

It will be understood that various types of security control information regarding predetermined conditions applicable to the operational components 1230 can be maintained in the licensing restriction records 1260 regarding a licensor identity 1262 and a licensee identity 1263. Additional exemplary topics may include but are not limited to royalty payment 1264, license time period 1265, quality standard 1266, and copyright limitation 1267. Additional exemplary types of licensing restriction records 1260 applicable to an operational component 1230 may include a patent provision 1272, brand identification or trademark provision 1273, trade secret provision 1274, and technology grant provision 1275. Further exemplary types of licensing restriction records 1260 may include a geographic distribution provision 1276, label requirements 1277, exclusivity provision 1278, and non-exclusive provision 1279.

It will be understood that the licensing restriction records 1260 are accessible to verification module 1220 (or in some instances accessible to computing device 1280) for processing in order to confirm compliance by the security-controlled process 1225 and/or compliance by the operational components 1230 and/or compliance by the outputs 1250, 1252, 1254. Of course, some of the licensing restriction records 1260 may not be pertinent for the specific security-controlled process 1225 involving certain operational components 1230, and additional types of records may be desirable for other embodiments, depending on the circumstances.

As further illustrated in the exemplary embodiment features of FIG. 14, the various operational components 1030 may be used to provide output objects 1250, and/or output data 1252, and/or an output result 1254 that are subject to the pre-conditions of one or more types of applicable licensing restriction records 1260. Exemplary operation components 1230 may include a production device 677, testing device 685, creative tool 683, duplication unit 687, chemical process 689, customized manufacturing machine 697*a*, rapid prototyping device 698, robotic manufacturing line 699*a*, and the like.

As further illustrated in FIG. 14, exemplary system features may provide security control over a desired operational process by monitoring and/or controlling one or more operational components 1230. Possible monitoring and/or control techniques related to quality or quantity operational parameters may include a restricted operator interface 1231, a machine identifier 1232, process/product counter 1033, timer 1034, calibration monitor 1035, and temperature sensor 1036. Additional types of monitoring and/or controlling devices may include activation switch 1037 and disable switch 1038.

Figure 15:
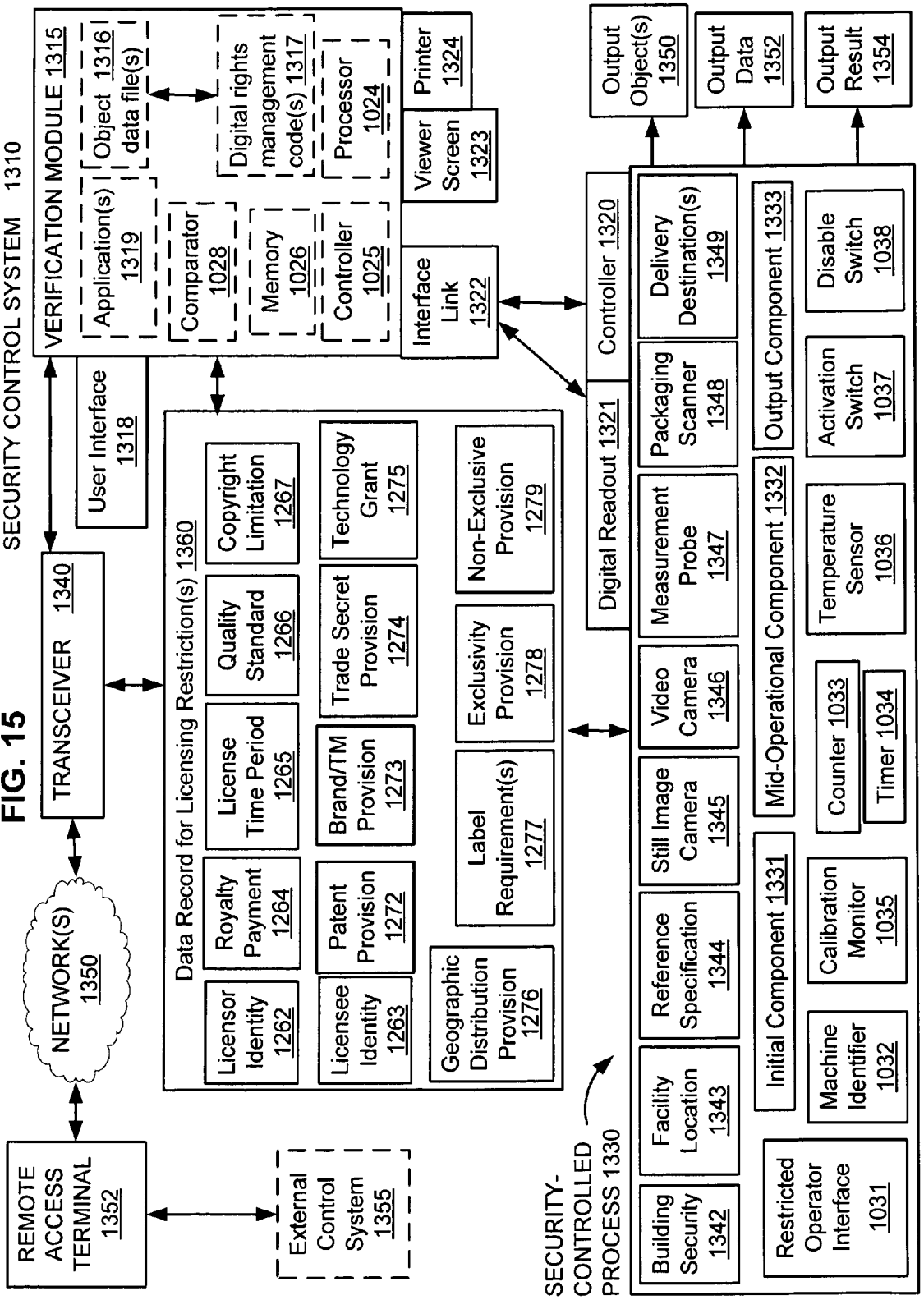

Referring now to FIG. 15, additional exemplary embodiment features for a security control system 1310 applicable to a security-controlled process 1330 are illustrated. More particularly, FIG. 15 illustrates a verification module 1315 operatively coupled for interaction with the security-controlled process 1330 that may include one of more operational components such as initial component 1331, mid-operational component 1332, and output component 1333. Such operational components 1331, 1332, 1333 may be separately or collectively monitored and/or controlled in accordance with the predetermined conditions that are accessible from a data record for licensing restrictions 1360.

An exemplary illustrated embodiment for the verification module 1315 shown in FIG. 15 may include one or more accessible object data files 1316 that are protected and controlled by digital rights management codes 1317. Additional functional computerized processing elements may include processor 1024, controller 1025, memory 1026, comparator module 1028, as well as one or more computer executable program applications 1319. The verification module 1315 may in some instances further include user interface 1318, viewer screen 1323 and printer 1324. In some exemplary implementations the verification module 1315 may send and/or receive communications via transceiver 1340 through one or more networks 1350 to a remote access terminal 1352 that is linked with an external control system 1355. Other communication links may provide an interconnection from verification module 1315 via interface link 1322 in order to process monitor and/or control data received from the security-controlled process 1330 via controller 1320 and/or digital readout 1321'.

Depending on the type of security-controlled process 1330 involved, specific types of monitor and/or control data parameters may sent by wired or wireless communication channels via digital readout 1321 and/or controller 1320 to/from previously described data source devices (e.g., see 1031-1038) as well as to/from other possible data sources such as building security apparatus 1342, facility location 1343, reference specification 1344, still image camera 1345, video camera 1346, measurement probe 1347, packaging scanner 1348, delivery destinations 1349.

It will be understood that the exemplary embodiment features of FIG. 15 may provide various types of security control information to protect proprietary aspects of the security-controlled process 1330 involving the operational components 1331, 1332, 1333 as well as outputs 1350, 1352, 1354. Exemplary information that is maintained in the licensing restriction records 1360 may include a licensor identity 1262 and a licensee identity 1263. The licensing restriction records 1360 shown in FIG. 15 may also include but are not limited to provisions relating to a royalty payment 1264, license time period 1265, quality standard 1266, and copyright limitation 1267. Additional exemplary types of licensing restriction records 1360 applicable to the security-controlled process 1330 as well as operational components 1331, 1332, 1333 and outputs 1350, 1352, 1354 may include a patent provision 1272, brand identification or trademark provision 1273, trade secret provision 1274, and technology grant provision 1275. Further exemplary types of licensing restriction records 1360 may include a geographic distribution provision 1276, label requirements 1277, exclusivity provision 1278, and non-exclusive provision 1279.

Such licensing restriction records 1360 are accessible to verification module 1315 for processing in order to confirm compliance by the security-controlled process 1330 and/or compliance by the operational components 1332 and/or compliance by the outputs 1350, 1352, 1354. Of course, it will be understood that some of the exemplary licensing restriction records 1360 may be very pertinent for the specific security-controlled process 1330 involving operational components 1331, 1332, 1333. However additional types of licensing restriction records for other embodiments may be required or desirable, and perhaps some topics may be deleted, depending on the circumstances.

As further illustrated in the exemplary embodiment features of FIG. 15, the various operational components 1331, 1332, 1333 may be used to provide output objects 1350, and/or output data 1352, and/or an output result 1354 that are subject to the applicable provision of the licensing restriction records 1360. Exemplary operation components 1331, 1332, 1333 may include a production device 677, testing device 685, creative tool 683, duplication unit 687, chemical process 689, customized manufacturing machine 697*a*, rapid prototyping device 698, robotic manufacturing line 699*a*, and the like (see illustrated exemplary embodiments in FIGS. 4, 6A, 6B, 12, 14)

As further illustrated in FIG. 15, exemplary system features may provide security control over a desired operational process and/or its outputs 1350, 1352, 1354 by monitoring and/or controlling one or more operational components 1331, 1332, 1333 via controller 1320 and/or digital readout 1321. Possible monitoring and/or control techniques related to quality or quantity operational parameters may include a restricted operator interface 1031, a machine identifier 1032, process/product counter 1033, timer 1034, calibration monitor 1035, and temperature sensor 1036. Additional types of monitoring and/or controlling devices operatively coupled between verification module 1315 and operational components 1331, 1332, 1333 and configured to provide outputs 1350, 1352, 1354 may include activation switch 1037 and disable switch 1038 as well as building security apparatus 1342, facility location 1343, reference specification 1344, still image camera 1345, video camera 1346, measurement probe 1347, packaging scanner 1348, and delivery destination data 1349. Such examples are provided for illustration only and are not intended to be limiting.

Figure 16:
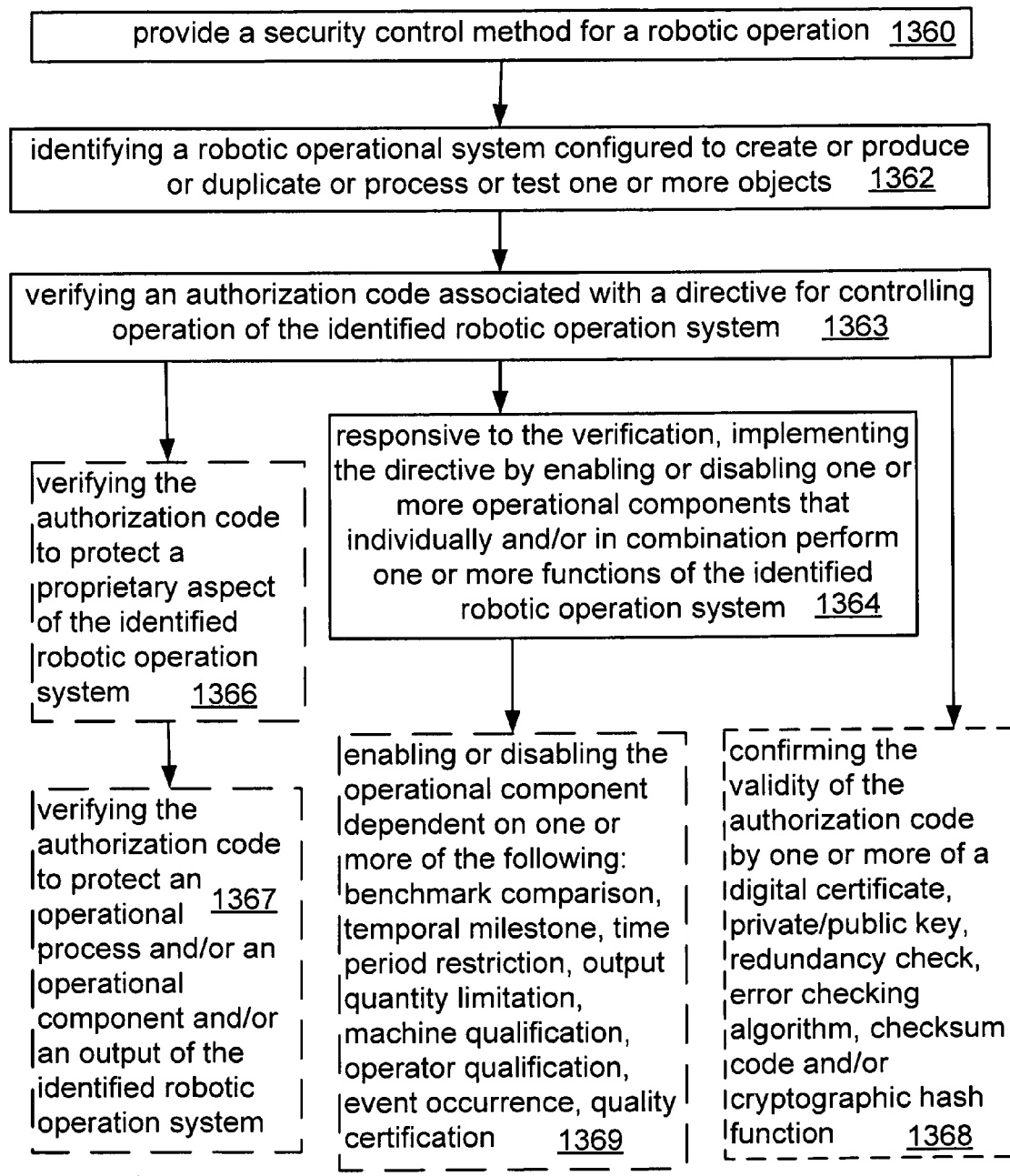
FIG. 16 illustrates another flow diagram of exemplary method features in accordance with an embodiment of the present application.

Referring now to the flow chart diagram of FIG. 16, an exemplary embodiment may provide a security control method for a robotic operation as depicted in block 1360. Other possible aspects may include identifying a robotic operational system configured to create or produce or duplicate or process or test one or more objects as depicted in block 1362, verifying an authorization code associated with a directive for controlling operation of the identified robotic operation system as depicted in block 1363. Responsive to the verification, a further feature may include implementing the directive by enabling or disabling one or more operational components that individually and/or in combination perform one or more functions of the identified robotic operation system as depicted in block 1364.

Other possible implementation aspects may include verifying the authorization code to protect a proprietary aspect of the identified robotic operation system as depicted in block 1366. Exemplary types of protection may include verifying the authorization code to protect an operation process and/or an operation component and/or an output of an identified robotic operation system (see block 1367). It will be understood that proprietary outputs of a robotic operation system that may be protected include output objects, and/or output data, and/or a tangible operational result.

As illustrated in FIG. 16, a further exemplary process feature may include confirming the validity of the authorization code by one or more of a digital certificate, private/public key, redundancy check, error checking algorithm, checksum code and/or cryptographic hash function (see block 1368). Yet another possible process feature as depicted in block 1369 may include enabling or disabling the operational component dependent on one or more of the following: benchmark comparison, temporal milestone, time period restriction, output quantity limitation, machine qualification, operator qualification, event occurrence and/or quality certification.

As disclosed herein, the exemplary system, apparatus and computer program embodiments shown in FIGS. 1-2, 4, 6A-6B, 8, 12 and 14-15 along with other components, devices know-how, skill and techniques that are known in the art have the capability of implementing and practicing the methods and processes shown in FIGS. 3A-3D, 5A-5C, 7A-7D, 9A-9D, 10-11, 13 and 16. However, it is to be further understood by those skilled in the art that other systems, apparatus and technology may be used to implement and practice such methods and processes.

In view of the foregoing, it will be understood that an exemplary security system for implementing compliance with a predetermined condition such as a licensing restriction regarding a robotic operational task may provide a digital rights management code that is configured to control a particular proprietary aspect. Such a proprietary aspect may include an operational process and/or an operational component and/or an output of the robotic operation task. Additional possible system features disclosed include a verification module configured to monitor a functional parameter of a robotic operational task, wherein the verification module is operably coupled to the digital rights management code and operably coupled to the operational component. Further exemplary disclosed system aspects may include an object data file associated with the digital right management code, wherein the object data file is configured to activate or disable the operational component based on confirmation from the verification module regarding compliance with a predetermined condition such as a licensing restriction.

As disclosed herein, exemplary security-controlled operational functions provided by a security system may include communication links configured to provide one or more of the following functional parameters accessible to a verification module: building security apparatus, facility identity location, reference specification, delivery destination, restricted operator interface, machine identifier.

It will be further understood that the exemplary security-controlled operational functions for a security system disclosed herein may include one or more of the following types of devices operatively coupled between a verification module (or in some instances another computing device) and one or more operational components: counter, timer, calibration monitor, temperature sensor, activation switch, disable switch, still image camera, video camera, measurement probe, packaging scanner.

It will also be understood that the various methods and systems disclosed herein include exemplary implementations for a security-activated operational component involved in creating or producing or duplicating or processing or testing one or more objects. Possible embodiments include but are not limited to obtaining access to an object data file configured to implement various functional operations regarding the one or more objects; verifying validity of an authorization code associated with the object data file; and controlling operation of the operational component based on operational monitoring data processed by a verification module in accordance with a permission agreement and/or a licensing restriction.

It will be further understood that possible embodiments my further include but are not limited to verifying an authorization code to control a task of function of a robotic operation system, and responsive to the verification, enabling or disabling one or more operational components of the robotic operation system.

Those with skill in the computing arts will recognize that the disclosed embodiments have relevance to a wide variety of applications and architectures in addition to those described above. In addition, the functionality of the subject matter of the present application can be implemented in software, hardware, or a combination of software and hardware. The hardware portion can be implemented using specialized logic; the software portion can be stored in a memory or recording medium and executed by a suitable instruction execution system such as a microprocessor.

While the subject matter of the application has been shown and described with reference to particular embodiments thereof, it will be understood by those skilled in the art that the foregoing and other changes in form and detail may be made therein without departing from the spirit and scope of the subject matter of the application, including but not limited to additional, less or modified elements and/or additional, less or modified blocks performed in the same or a different order.

Those having skill in the art will recognize that the state of the art has progressed to the point where there is little distinction left between hardware and software implementations of aspects of systems. The use of hardware or software is generally (but not always, in that in certain contexts the choice between hardware and software can become significant) a design choice representing cost vs. efficiency tradeoffs. Those having skill in the art will appreciate that there are various vehicles by which processes and/or systems and/or other technologies described herein can be effected (e.g., hardware, software, and/or firmware), and that the preferred vehicle will vary with the context in which the processes and/or systems and/or other technologies are deployed. For example, if an implementer determines that speed and accuracy are paramount, the implementer may opt for a mainly hardware and/or firmware vehicle; alternatively, if flexibility is paramount, the implementer may opt for a mainly software implementation; or, yet again alternatively, the implementer may opt for some combination of hardware, software, and/or firmware. Hence, there are several possible vehicles by which the processes and/or devices and/or other technologies described herein may be effected, none of which is inherently superior to the other in that any vehicle to be utilized is a choice dependent upon the context in which the vehicle will be deployed and the specific concerns (e.g., speed, flexibility, or predictability) of the implementer, any of which may vary. Those skilled in the art will recognize that optical aspects of implementations will typically employ optically-oriented hardware, software, and or firmware.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples can be implemented, individually and/or collectively, by a wide range of hardware, software, firmware, or virtually any combination thereof. In one embodiment, several portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments disclosed herein, in whole or in part, can be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and or firmware would be well within the skill of one of skilled in the art in light of this disclosure. In addition, those skilled in the art will appreciate that the mechanisms of the subject matter described herein are capable of being distributed as a program product in a variety of forms, and that an illustrative embodiment of the subject matter described herein applies regardless of the particular type of signal bearing medium used to actually carry out the distribution. Examples of a signal bearing medium include, but are not limited to, the following: a recordable type medium such as a floppy disk, a hard disk drive, a Compact Disc (CD), a Digital Video Disk (DVD), a digital tape, a computer memory, etc.; and a transmission type medium such as a digital and/or an analog communication medium (e.g., a fiber optic cable, a waveguide, a wired communications link, a wireless communication link, etc.)

The herein described subject matter sometimes illustrates different components contained within, or connected with, different other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled", to each other to achieve the desired functionality, Specific examples of operably couplable include but are not limited to physically mateable and/or physically interacting components and/or wirelessly interactable and/or wirelessly interacting components and/or logically interacting and/or logically interactable components.

Those skilled in the art will recognize that it is common within the art to implement devices and/or processes and/or systems in the fashion(s) set forth herein, and thereafter use engineering and/or business practices to integrate such implemented devices and/or processes and/or systems into more comprehensive devices and/or processes and/or systems. That is, at least a portion of the devices and/or processes and/or systems described herein can be integrated into comprehensive devices and/or processes and/or systems via a reasonable amount of experimentation. Those having skill in the art will recognize that examples of such comprehensive devices and/or processes and/or systems might include, as appropriate to context and application, all or part of devices and/or processes and/or systems of (a) an air conveyance (e.g., an airplane, rocket, hovercraft, helicopter, etc.), (b) a ground conveyance (e.g., a car, truck, locomotive, tank, armored personnel carrier, etc.), (c) a building (e.g., a home, warehouse, office, etc.), (d) an appliance (e.g., a refrigerator, a washing machine, a dryer, etc.), (e) a communications system (e.g., a networked system, a telephone system, a Voice over IP system, etc.), (f) a business entity (e.g., an Internet Service Provider (ISP) entity such as Comcast Cable, Quest, Southwestern Bell, etc.); or (g) a wired/wireless services entity such as Sprint, Cingular, Nextel, etc.), etc.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skilled in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general, such a construction is intended in the sense one having skills in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

The invention claimed is:

1. A robotic operational system comprising:
   a robotic device configured for at least one of producing, duplicating, processing or testing one or more objects;
   a controller coupled to the robotic device, the controller configured for:
      receiving a directive for controlling operation of the robotic device to perform the at least one of producing, duplicating, processing or testing one or more objects; and
      controlling the robotic device to perform the at least one of producing, duplicating, processing or testing one or more objects according to the directive;
   a verification module coupled to the robotic device, the verification module configured for:
      receiving an authorization protecting a proprietary aspect of the robotic operational system associated with the directive for controlling operation of the robotic device;
      verifying the authorization protecting a proprietary aspect associated with the directive for controlling operation of the robotic device; and
      enabling or disabling operation of the robotic device responsive to verifying the authorization.

2. The robotic operational system of claim 1, wherein the receiving an authorization associated with the directive includes:
   receiving the authorization via an application configured to identify a user associated with the directive.

3. The robotic operational system of claim 2, wherein the receiving the authorization via an application configured to identify a user associated with the directive includes:
   receiving the authorization via an application applying a user credential to provide the authorization.

4. The robotic operational system of claim 2, wherein the receiving the authorization via an application configured to identify a user associated with the directive includes:
   receiving the authorization from a security device in communication with the robotic operational system, the security device providing one or more permissions to operate the robotic device.

5. The robotic operational system of claim 1, wherein the verifying the authorization includes:

comparing the authorization to a stored list of valid authorization codes accessible to the robotic operational system.

6. The robotic operational system of claim 1, wherein the verifying the authorization includes:
verifying a digital rights management code that provides access protection to a directive associated with an object data file.

7. The robotic operational system of claim 1, wherein the verifying the authorization includes:
verifying that the authorization is associated with one or more license-governed agreements relating to protection of the one or more objects that are produced or duplicated or processed or tested by the robotic device.

8. The robotic operational system of claim 1, wherein the verifying the authorization includes:
verifying an authorization associated with a licensing status for the one or more objects and/or an object data file, wherein the licensing status is indicative of one or more of a royalty status, an expiration date pertaining to a license, and/or a number of manufacturing runs permitted according to a license.

9. The robotic operational system of claim 1, wherein the verifying the authorization includes:
verifying a payment status and/or an authorization status under a reification agreement.

10. The robotic operational system of claim 1, wherein the controlling the robotic device to perform the at least one of producing, duplicating, processing or testing one or more objects according to the directive includes:
controlling the robotic device to perform reification using one or more of a metal, ABS (Acrylonitrile/butadiene/styrene), ABSi (ABS with high impact strength), ABS M-30 (Acrylonitrile/butadiene/styrene), PC (Polycarbonate), PC-ISO (Polycarbonate-ISO), PC/ABS (Polycarbonate/ABS Blend), PPSF (Polyphenylsulfone), clear and/or colored resin.

11. The robotic operational system of claim 1, wherein the controlling the robotic device to perform the at least one of producing, duplicating, processing or testing one or more objects according to the directive includes:
controlling the robotic device to perform reification using one or more of at least partially robotic rapid prototyping, at least partially robotic three-dimensional printing, at least partially robotic two-dimensional printing, at least partially robotic freeform fabrication, at least partially robotic solid freeform fabrication, and at least partially robotic stereolithography.

12. The robotic operational system of claim 1, wherein the controlling the robotic device to perform the at least one of producing, duplicating, processing or testing one or more objects according to the directive includes:
controlling the robotic device to perform reification using one or more of one or more of stereolithography (SLA), selective laser sintering (SLS), computer numerical control (CNC), and fused deposition modeling (FDM) if the authorization code meets one or more predetermined conditions.

13. The robotic operational system of claim 1, wherein the controlling the robotic device to perform the at least one of producing, duplicating, processing or testing one or more objects according to the directive includes:
controlling the robotic device to perform reification using one or more of at least partially robotic three-dimensional manufacturing using one or more of metal, wood, ice, stone, glass, nuclear materials, pharmaceuticals, edible substances, sand, ceramic materials, aluminum, silicon, carbides, silicon nitrides, silicon carbides, metal/ceramic combinations including aluminum/silicon nitride, aluminum/silicon carbide, aluminum/zirconia and aluminum/aluminum nitride including materials alterable by friction, heating and cooling if the authorization code meets one or more predetermined conditions.

14. The robotic operational system of claim 1, wherein the controlling the robotic device to perform the at least one of producing, duplicating, processing or testing one or more objects according to the directive includes:
controls controlling the robotic device to perform reification using one or more of at least partially robotic two-dimensional manufacturing using one or more of skin, textiles, edible substances, paper, silicon printing if the authorization code meets one or more predetermined conditions.

15. The robotic operational system of claim 1, wherein the controlling the robotic device to perform the at least one of producing, duplicating, processing or testing one or more objects according to the directive includes:
controlling the robotic device to perform reification using one or more of at least partially robotic subtractive manufacturing, including enabling or preventing drilling, milling, turning, laser cutting, waterjet cutting, plasma cutting, wire electrical discharge cutting, cold, warm and hot forging metal fabrication, computer numerical controlled fabrication machine, and/or an additive manufacturing and/or an injection molding if the authorization code meets one or more predetermined conditions.

16. The robotic operational system of claim 1, wherein the verifying the authorization includes:
verifying if the authorization meets one or more predetermined conditions.

17. The robotic operational system of claim 16, wherein the verifying if the authorization meets one or more predetermined conditions includes:
verifying if the authorization meets at least one of a benchmark comparison, a temporal machine qualification, an operation qualification, an event occurrence, and/or a quality certification.

18. The robotic operational system of claim 1, wherein the controlling the robotic device to perform the at least one of producing, duplicating, processing or testing one or more objects according to the directive includes:
controlling the robotic device to perform one or more of a chemical process, a product packaging, an injection molding unit, a subtraction machine, an additive manufacturing unit, a two-dimensional production machine, a three-dimensional production machine, a stamping machine, an extruder, a melting machine, a die-casting machine, a solidifying machine, a manufacturing machine, a rapid prototyping machine, a production device.

19. The robotic operational system of claim 1, wherein receiving a directive for controlling operation of a robotic device for at least one of producing or duplicating or processing or testing one or more objects includes:
receiving an input including the directive.

20. A robotic operation system comprising:
at least one computing device programmed for:
receiving a directive for controlling operation of a robotic device for at least one of producing or duplicating or processing or testing one or more objects;

receiving an authorization protecting a proprietary aspect associated with the directive for controlling operation of the robotic device;

verifying the authorization protecting a proprietary aspect associated with the directive for controlling operation of the robotic device;

enabling or disabling operation of the robotic device responsive to the verifying the authorization; and controlling operation of the robotic device according to the directive and responsive to the enabling or disabling.

21. The system of claim 20 wherein said verifying the authorization protecting a proprietary aspect includes
verifying an authorization protecting a proprietary operational process of the robotic operation system.

22. The system of claim 20 wherein said verifying the authorization protecting a proprietary aspect includes
verifying an authorization protecting a proprietary operational component of robotic operation system.

23. The system of claim 20 wherein said verifying the authorization protecting a proprietary aspect includes
verifying an authorization protecting a proprietary operational output of the robotic operation system.

24. The system of claim 20 wherein said verifying the authorization protecting a proprietary aspect includes
verifying an authorization protecting a proprietary output object of the identified robotic operation system.

25. The system of claim 20 wherein said verifying the authorization protecting a proprietary aspect includes
verifying an authorization protecting proprietary output data of the identified robotic operation system.

26. The system of claim 20 wherein said verifying the authorization protecting a proprietary aspect includes
verifying an authorization protecting a proprietary tangible operational result of the identified robotic operation system.

27. The system of claim 20 wherein said verifying the authorization protecting a proprietary aspect includes
confirming the validity of an authorization code by one or more of a digital certificate, private/public key, redundancy check, error checking algorithm, checksum code and/or cryptographic hash function.

28. The system of claim 20 wherein the enabling or disabling operation of the robotic device responsive to the verifying the authorization:
enabling or disabling the robotic device responsive to at least one of: benchmark comparison, temporal milestone, time period restriction, output quantity limitation, machine qualification, operator qualification, event occurrence and/or quality certification.

29. A non-transitory computer program product comprising a computer-readable medium instructions that program at least one computing device for:
receiving a directive for controlling operation of a robotic device for at least one of producing or duplicating or processing or testing one or more objects;
receiving an authorization protecting a proprietary aspect associated with the directive for controlling operation of the robotic device;
verifying the authorization protecting a proprietary aspect;
enabling or disabling operation of the robotic device responsive to the verifying the authorization; and
controlling operation of the robotic device according to the directive and responsive to the enabling or disabling.

30. The non-transitory computer program product of claim 29, wherein the controlling operational of a robotic device includes:
monitoring at least one robotic operational task; and
responsive to the monitoring, determining compliance with an applicable predetermined condition.

31. The non-transitory computer program product of claim 30, wherein the determining compliance with the applicable predetermined condition includes:
determining compliance with a qualitative or quantitative aspect of the robotic operational task.

32. The non-transitory computer program product of claim 30, wherein the determining compliance with the applicable predetermined condition includes:
determining compliance with the predetermined condition applicable to a security-controlled process and/or operational component and/or output of the robotic operational task.

33. The method of claim 20, wherein the proprietary aspect of the robotic operation system includes:
a licensing restriction associated with the robotic operation system.

34. The method of claim 33, wherein the licensing restriction associated with the robotic operation system includes at least one of:
a royalty payment associated with the robotic operation system,
a license time period associated with the robotic operation system,
a quality standard associated with the robotic operation system,
a copyright limitation associated with the robotic operation system,
a trade secret provision associated with the robotic operation system,
a technology grant provision associated with the robotic operation system,
a geographic distribution provision associated with the robotic operation system,
a label requirement associated with the robotic operation system,
an exclusivity provision associated with the robotic operation system and/or
a non-exclusive provision associated with the robotic operation system.

35. The robotic operational system of claim 1, wherein the verifying the authorization protecting a proprietary aspect associated with the directive for controlling operation of the robotic device includes:
verifying a digital rights management code associated with an object data file specifying a configuration of the one or more objects that are at least one of produced, duplicated, processed or tested by the robotic device.

* * * * *

UNITED STATES PATENT AND TRADEMARK OFFICE
CERTIFICATE OF CORRECTION

PATENT NO. : 9,071,436 B2  Page 1 of 1
APPLICATION NO. : 12/321365
DATED : June 30, 2015
INVENTOR(S) : Jung et al.

It is certified that error appears in the above-identified patent and that said Letters Patent is hereby corrected as shown below:

In the claims

Column 42, Line 12, Claim 14 delete "controls controlling the robotic device to perform reification. . ." and replace with --controlling the robotic device to perform reification. . .--

Column 44, Line 7, Claim 30 delete "wherein the controlling operational of a robotic device" and replace with --wherein the controlling operation of a robotic device--

Signed and Sealed this
Twenty-fourth Day of November, 2015

Michelle K. Lee
*Director of the United States Patent and Trademark Office*